(12) United States Patent
Wang et al.

(10) Patent No.: US 12,739,848 B2
(45) Date of Patent: Sep. 15, 2026

(54) METHOD AND DEVICES FOR SIGNAL TRANSMISSION

(71) Applicant: Samsung Electronics Co., Ltd., Gyeonggi-do (KR)

(72) Inventors: Yi Wang, Beijing (CN); Sa Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 370 days.

(21) Appl. No.: 18/261,393

(22) PCT Filed: Jan. 13, 2022

(86) PCT No.: PCT/KR2022/000641
§ 371 (c)(1),
(2) Date: Jul. 13, 2023

(87) PCT Pub. No.: WO2022/154516
PCT Pub. Date: Jul. 21, 2022

(65) Prior Publication Data

US 2024/0080856 A1 Mar. 7, 2024

(30) Foreign Application Priority Data

Jan. 13, 2021 (CN) ......................... 202110042718.7
Mar. 26, 2021 (CN) ......................... 202110328672.5
(Continued)

(51) Int. Cl.
*H04W 72/232* (2023.01)
*H04L 1/1829* (2023.01)
*H04W 72/1273* (2023.01)

(52) U.S. Cl.
CPC ......... *H04W 72/232* (2023.01); *H04L 1/1861* (2013.01); *H04W 72/1273* (2013.01)

(58) Field of Classification Search
CPC ........... H04W 72/232; H04W 72/1273; H04W 72/23; H04W 72/0446; H04L 1/1861;
(Continued)

(56) References Cited

U.S. PATENT DOCUMENTS

2019/0268803 A1 8/2019 He et al.
2019/0306841 A1 10/2019 Huang et al.
(Continued)

OTHER PUBLICATIONS

PCT/ISA/210 Search Report dated May 2, 2022, issued on PCT/KR2022/000641, pp. 3.
(Continued)

*Primary Examiner* — Sharmin Chowdhury
(74) *Attorney, Agent, or Firm* — The Farrell Law Firm, P.C.

(57) ABSTRACT

The present disclosure discloses a method and device for signal transmission. According to an aspect of the present disclosure, a method for receiving one or more physical downlink shared channel (PDSCH), includes: receiving, by a user equipment (UE), a physical downlink control channel (PDCCH), wherein the received PDCCH includes downlink control information (DCI) for scheduling one or more PDSCHs; receiving, by the UE, one or more PDSCHs according to the received DCI; determining and transmitting, by the UE, a hybrid automatic repeat request acknowledgement (HARQ-ACK) codebook for one or more PDSCHs according to the received PDSCH and PDCCH.

13 Claims, 18 Drawing Sheets

(30) Foreign Application Priority Data

May 8, 2021 (CN) ........................ 202110501307.X
Aug. 5, 2021 (CN) ........................ 202110898423.X

(58) Field of Classification Search
CPC ... H04L 1/1819; H04L 1/1614; H04L 1/1822; H04L 1/1893; H04L 1/1896; H04L 1/1854; H04L 5/0044; H04L 5/0055; H04L 5/0094; H04L 1/1812
See application file for complete search history.

(56) References Cited

U.S. PATENT DOCUMENTS

2020/0120701 A1 4/2020 Peng et al.
2020/0162207 A1 5/2020 Hwang et al.
2020/0337077 A1 10/2020 Yoshimura et al.
2022/0210820 A1* 6/2022 Tian ...................... H04L 5/0044
2023/0156736 A1* 5/2023 He ...................... H04W 72/232 370/329
2023/0353292 A1* 11/2023 Wu ...................... H04L 1/1854
2023/0397183 A1* 12/2023 Kittichokechai ..... H04L 5/0082
2024/0015747 A1* 1/2024 Gao .................. H04W 72/1268
2024/0073887 A1* 2/2024 Bae .................. H04W 72/1268

OTHER PUBLICATIONS

PCT/ISA/237 Written Opinion dated May 2, 2022, issued on PCT/KR2022/000641, pp. 4.
3GPP TS 38.211 V16.3.0 (Sep. 2020), pp. 133.
Spreadtrum Communications, "Discussion on Necessity and Support of Physical Layer Feedback Enhancements", R1-2009148, 3GPP TSG RAN WG1 #103-e, Oct. 26-Nov. 13, 2020, 5 pp.
European Search Report dated May 14, 2024 issued in counterpart application No. 22739711.4-1206, 7 pages.
NEC, "Enhancements on URLLC HARQ-ARK Feedback", R1-2005760, 3GPP TSG RAN WG1 #102-e, Aug. 17-28, 2020, 6 pages.
Korean Office Action dated Jul. 9, 2026 issued in counterpart application No. 10-2023-7023926, 11 pages.

* cited by examiner

FIG. 6

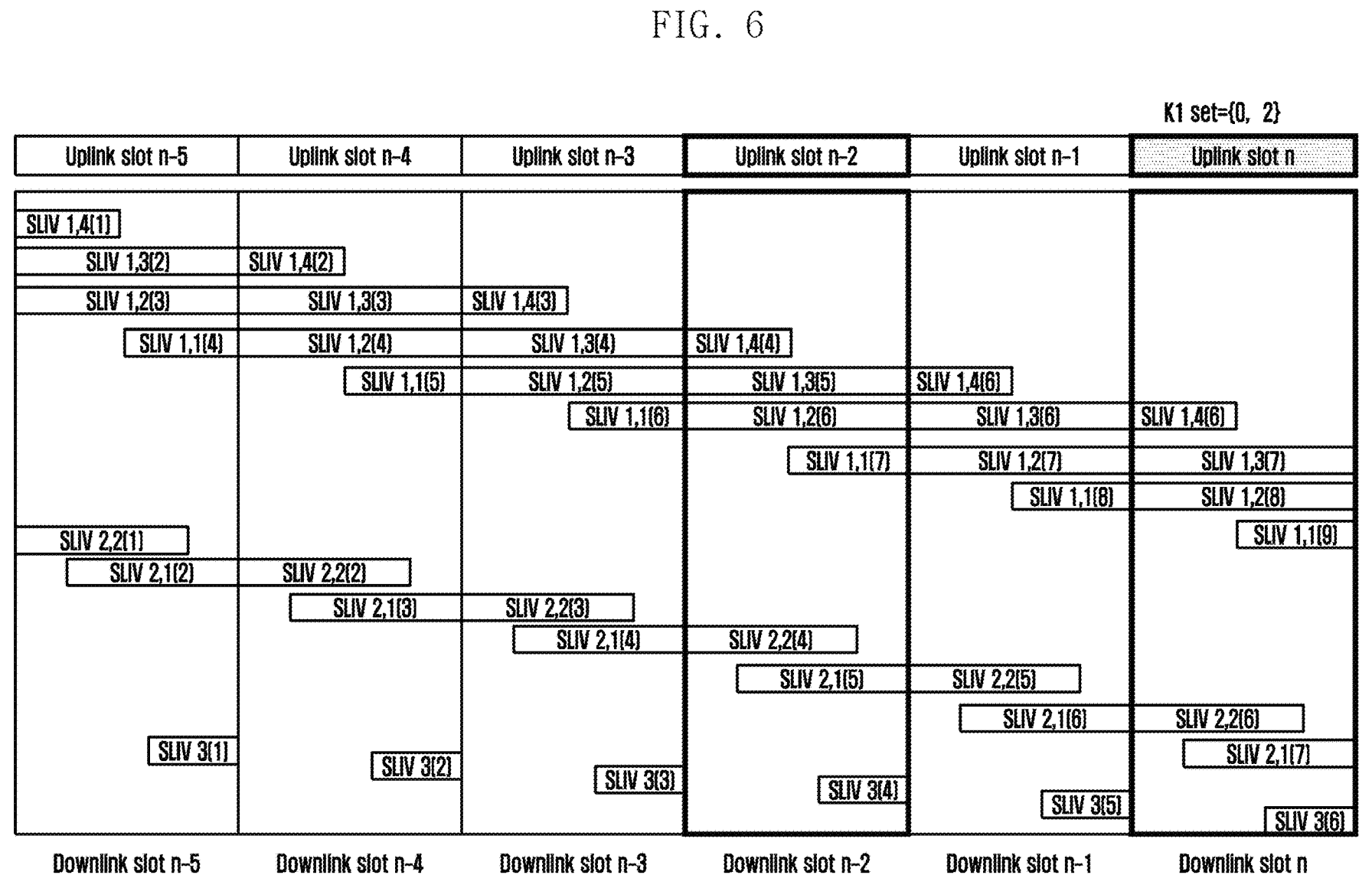

K1 set={0, 2}

Uplink slot n-5
Uplink slot n-4
Uplink slot n-3
Uplink slot n-2
Uplink slot n-1
Uplink slot n SLIV 1,4[1]
SLIV 1,3[2]
SLIV 1,2[3]
SLIV 1,1[4]
SLIV 2,2[1]
SLIV 2,1[2]
SLIV 3[1]
SLIV 1,4[2]
SLIV 1,3[3]
SLIV 1,2[4]
SLIV 1,1[5]
SLIV 2,2[2]
SLIV 2,1[3]
SLIV 3[2]
SLIV 1,4[3]
SLIV 1,3[4]
SLIV 1,2[5]
SLIV 1,1[6]
SLIV 2,2[3]
SLIV 2,1[4]
SLIV 3[3]
SLIV 1,4[4]
SLIV 1,3[5]
SLIV 1,2[6]
SLIV 1,1[7]
SLIV 2,2[4]
SLIV 2,1[5]
SLIV 3[4]
SLIV 1,4[6]
SLIV 1,3[6]
SLIV 1,2[7]
SLIV 1,1[8]
SLIV 2,2[5]
SLIV 2,1[6]
SLIV 3[5]
SLIV 1,4[6]
SLIV 1,3[7]
SLIV 1,2[8]
SLIV 1,1[9]
SLIV 2,2[6]
SLIV 2,1[7]
SLIV 3[6]

Downlink slot n-5
Downlink slot n-4
Downlink slot n-3
Downlink slot n-2
Downlink slot n-1
Downlink slot n

FIG. 7

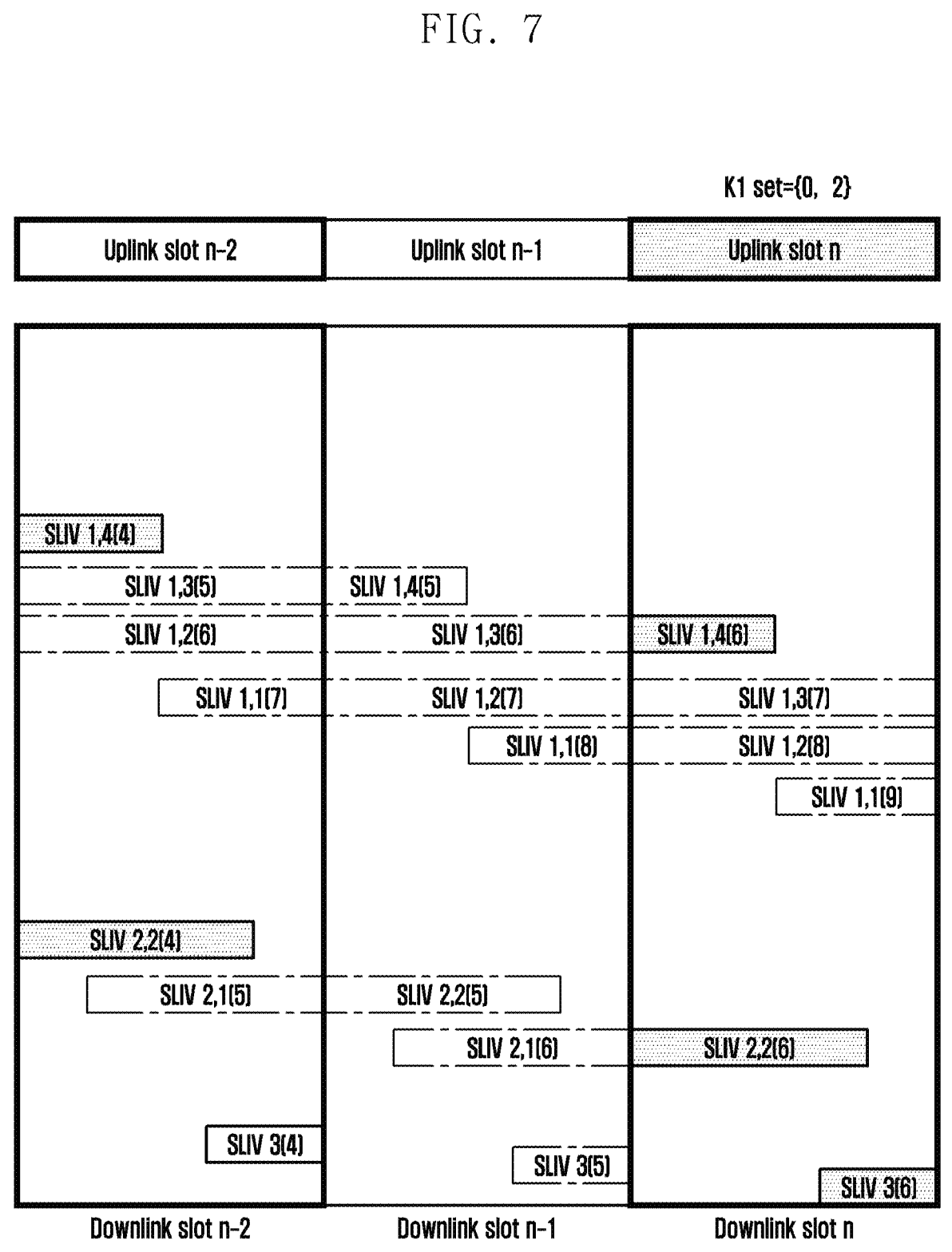

K1 set={0, 2}

Uplink slot n-2
Uplink slot n-1
Uplink slot n

SLIV 1,4(4)
SLIV 1,3(5)
SLIV 1,4(5)
SLIV 1,2(6)
SLIV 1,3(6)
SLIV 1,4(6)
SLIV 1,1(7)
SLIV 1,2(7)
SLIV 1,3(7)
SLIV 1,1(8)
SLIV 1,2(8)
SLIV 1,1(9)
SLIV 2,2(4)
SLIV 2,1(5)
SLIV 2,2(5)
SLIV 2,1(6)
SLIV 2,2(6)
SLIV 3(4)
SLIV 3(5)
SLIV 3(6)

Downlink slot n-2
Downlink slot n-1
Downlink slot n

Figure 9:
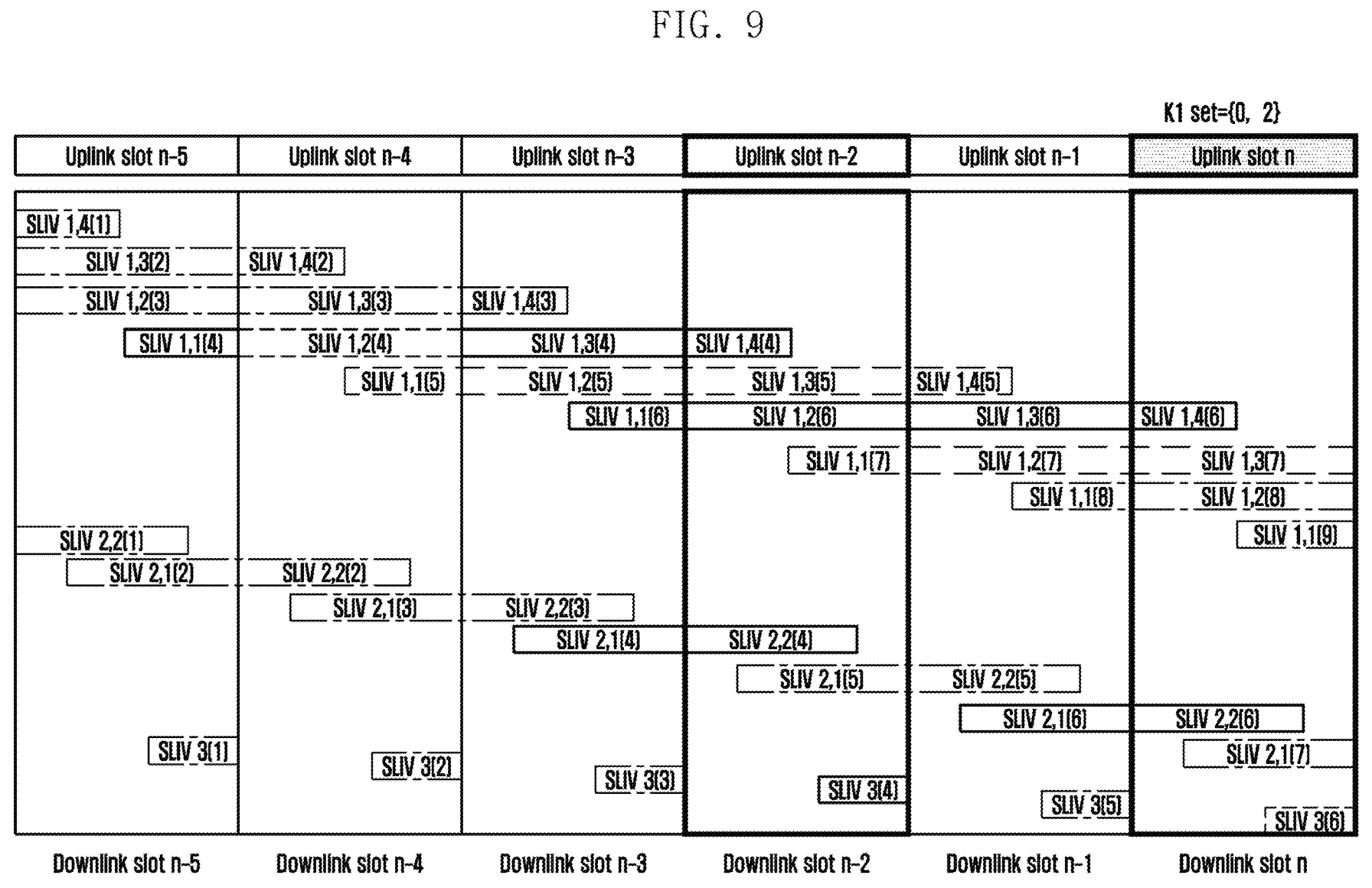

K1 set={0, 2}

Uplink slot n-5
Uplink slot n-4
Uplink slot n-3
Uplink slot n-2
Uplink slot n-1
Uplink slot n SLIV 1,4[1]
SLIV 1,3[2]
SLIV 1,2[3]
SLIV 1,1[4]
SLIV 2,2[1]
SLIV 2,1[2]
SLIV 3[1]
SLIV 1,4[2]
SLIV 1,3[3]
SLIV 1,2[4]
SLIV 1,1[5]
SLIV 2,2[2]
SLIV 2,1[3]
SLIV 3[2]
SLIV 1,4[3]
SLIV 1,3[4]
SLIV 1,2[5]
SLIV 1,1[6]
SLIV 2,2[3]
SLIV 2,1[4]
SLIV 3[3]
SLIV 1,4[4]
SLIV 1,3[5]
SLIV 1,2[6]
SLIV 1,1[7]
SLIV 2,2[4]
SLIV 2,1[5]
SLIV 3[4]
SLIV 1,4[5]
SLIV 1,3[6]
SLIV 1,2[7]
SLIV 1,1[8]
SLIV 2,2[5]
SLIV 2,1[6]
SLIV 3[5]
SLIV 1,4[6]
SLIV 1,3[7]
SLIV 1,2[8]
SLIV 1,1[9]
SLIV 2,2[6]
SLIV 2,1[7]
SLIV 3[6]

Downlink slot n-5
Downlink slot n-4
Downlink slot n-3
Downlink slot n-2
Downlink slot n-1
Downlink slot n

Figure 12:
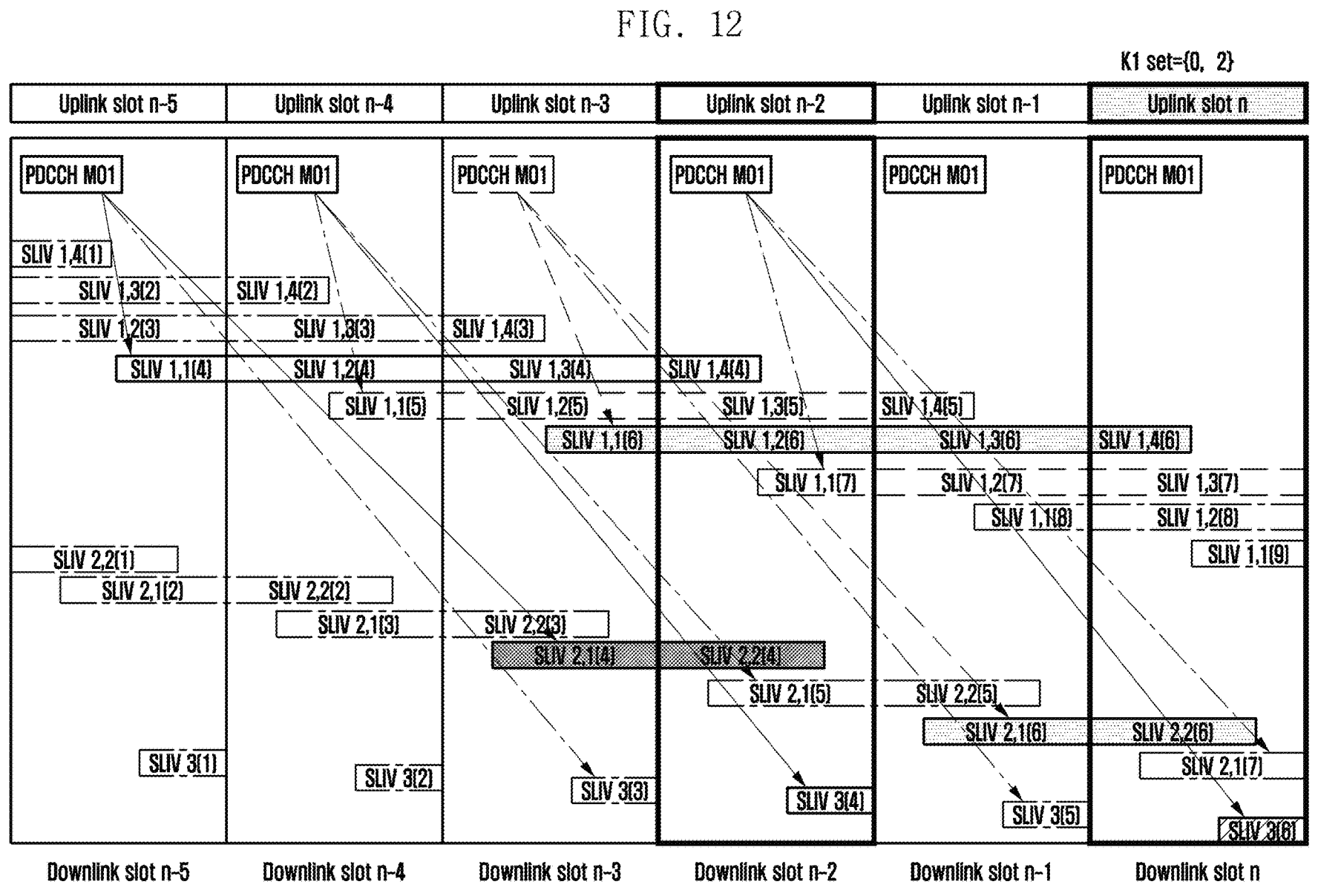

K1 set={0, 2}

Uplink slot n-5
Uplink slot n-4
Uplink slot n-3
Uplink slot n-2
Uplink slot n-1
Uplink slot n

PDCCH MO1
PDCCH MO1
PDCCH MO1
PDCCH MO1
PDCCH MO1
PDCCH MO1

SLIV 1,4[1]
SLIV 1,3[2]
SLIV 1,2[3]
SLIV 1,1[4]
SLIV 2,2[1]
SLIV 2,1[2]
SLIV 3[1]

SLIV 1,4[2]
SLIV 1,3[3]
SLIV 1,2[4]
SLIV 1,1[5]
SLIV 2,2[2]
SLIV 2,1[3]
SLIV 3[2]

SLIV 1,4[3]
SLIV 1,3[4]
SLIV 1,2[5]
SLIV 1,1[6]
SLIV 2,2[3]
SLIV 2,1[4]
SLIV 3[3]

SLIV 1,4[4]
SLIV 1,3[5]
SLIV 1,2[6]
SLIV 1,1[7]
SLIV 2,2[4]
SLIV 2,1[5]
SLIV 3[4]

SLIV 1,4[5]
SLIV 1,3[6]
SLIV 1,2[7]
SLIV 1,1[8]
SLIV 2,2[5]
SLIV 2,1[6]
SLIV 3[5]

SLIV 1,4[6]
SLIV 1,3[7]
SLIV 1,2[8]
SLIV 1,1[9]
SLIV 2,2[6]
SLIV 2,1[7]
SLIV 3[6]

Downlink slot n-5
Downlink slot n-4
Downlink slot n-3
Downlink slot n-2
Downlink slot n-1
Downlink slot n

FIG. 13

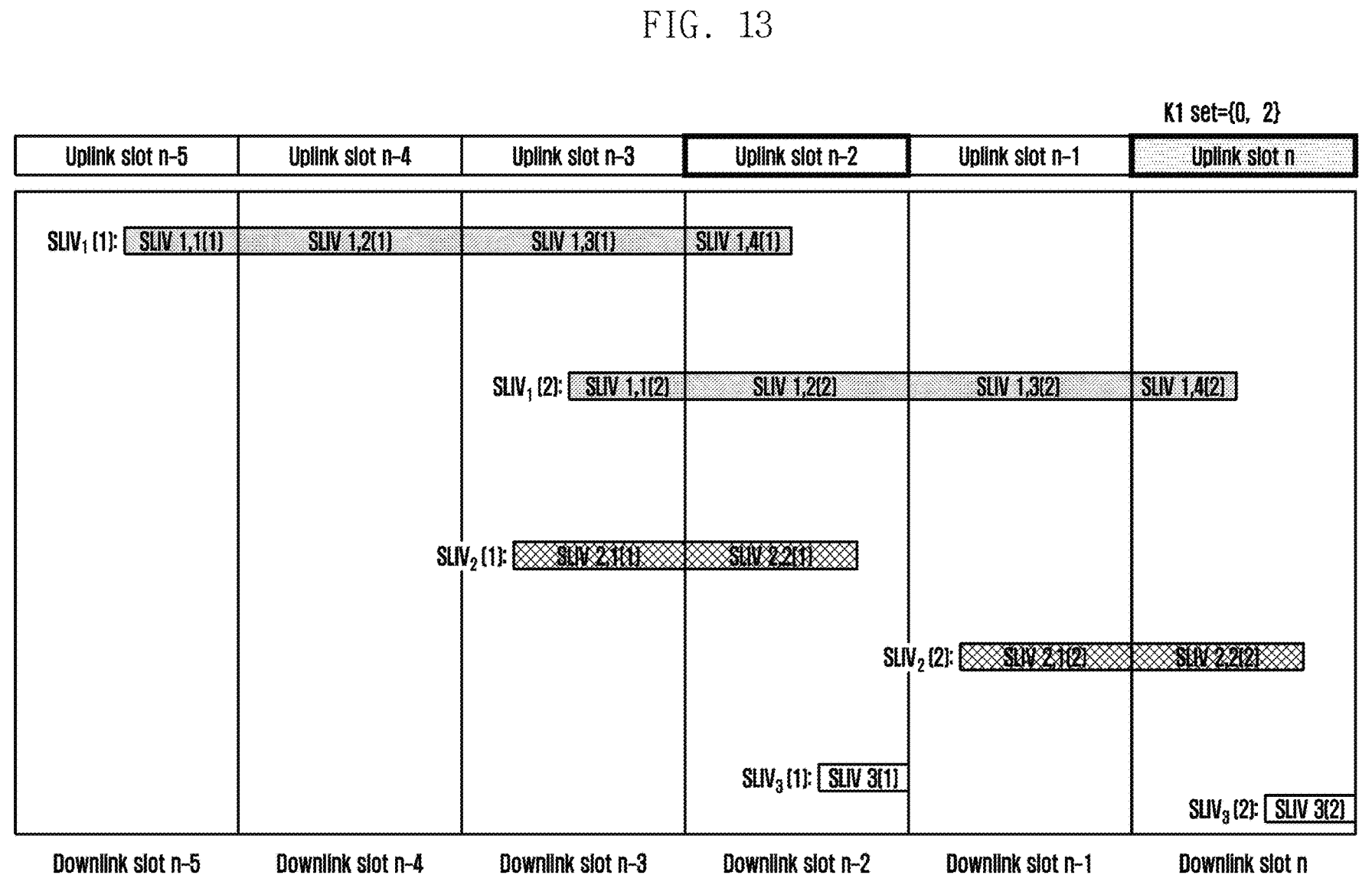

K1 set={0, 2}

Uplink slot n-5
Uplink slot n-4
Uplink slot n-3
Uplink slot n-2
Uplink slot n-1
Uplink slot n $SLIV_1$ {1}: SLIV 1,1{1} SLIV 1,2{1} SLIV 1,3{1} SLIV 1,4{1}

$SLIV_1$ {2}: SLIV 1,1{2} SLIV 1,2{2} SLIV 1,3{2} SLIV 1,4{2}

$SLIV_2$ {1}: SLIV 2,1{1} SLIV 2,2{1}

$SLIV_2$ {2}: SLIV 2,1{2} SLIV 2,2{2}

$SLIV_3$ {1}: SLIV 3{1}

$SLIV_3$ {2}: SLIV 3{2}

Downlink slot n-5
Downlink slot n-4
Downlink slot n-3
Downlink slot n-2
Downlink slot n-1
Downlink slot n

FIG. 14

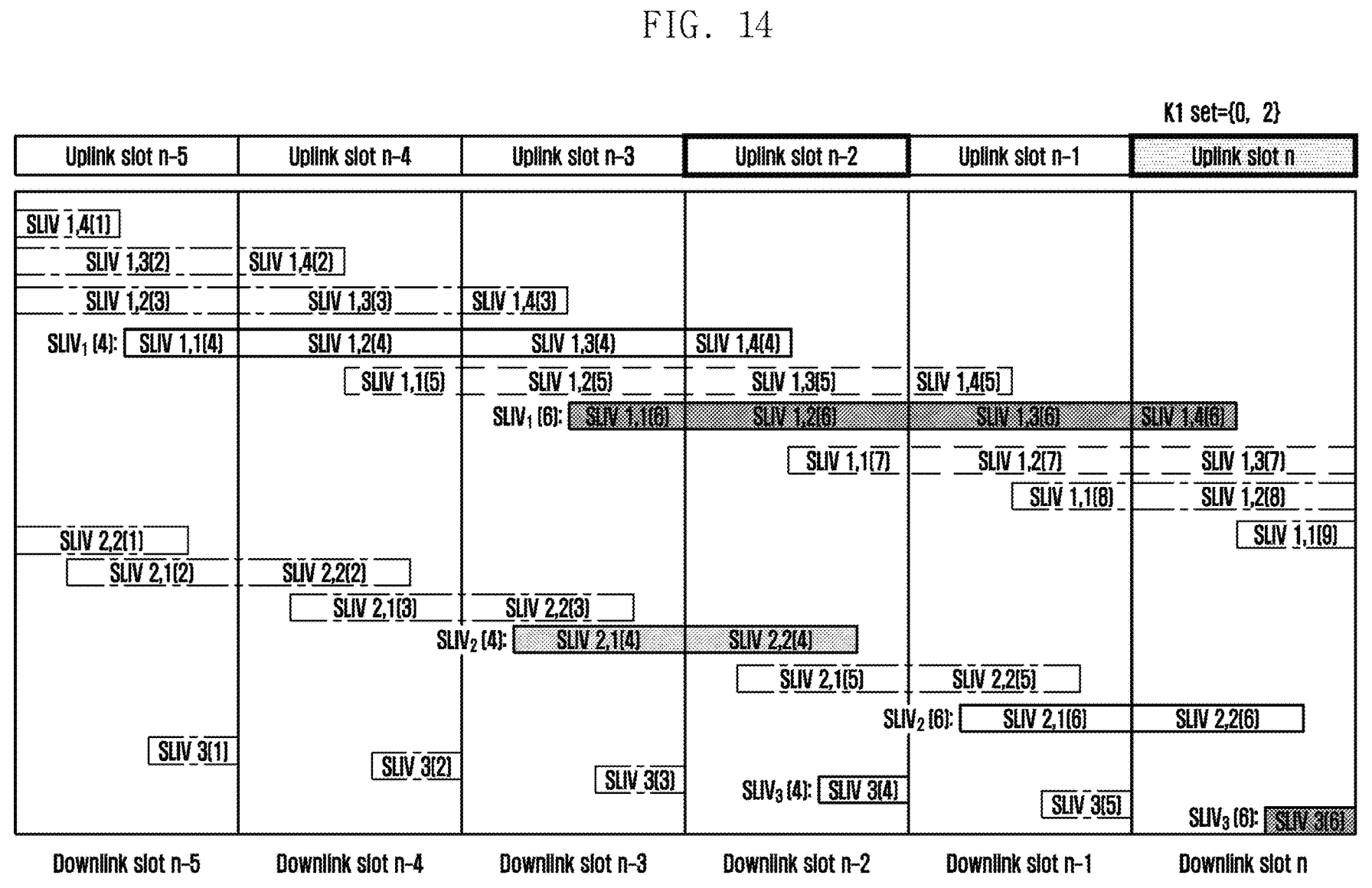

K1 set={0, 2}

Uplink slot n-5
Uplink slot n-4
Uplink slot n-3
Uplink slot n-2
Uplink slot n-1
Uplink slot n SLIV 1,4[1]
SLIV 1,3[2]
SLIV 1,2[3]
$SLIV_1$ [4]: SLIV 1,1[4]
SLIV 2,2[1]
SLIV 2,1[2]
SLIV 3[1]
SLIV 1,4[2]
SLIV 1,3[3]
SLIV 1,2[4]
SLIV 1,1[5]
SLIV 2,2[2]
SLIV 2,1[3]
SLIV 3[2]
SLIV 1,4[3]
SLIV 1,3[4]
SLIV 1,2[5]
$SLIV_1$ [6]: SLIV 1,1[6]
SLIV 2,2[3]
$SLIV_2$ [4]: SLIV 2,1[4]
SLIV 3[3]
SLIV 1,4[4]
SLIV 1,3[5]
SLIV 1,2[6]
SLIV 1,1[7]
SLIV 2,2[4]
SLIV 2,1[5]
$SLIV_3$ [4]: SLIV 3[4]
SLIV 1,4[5]
SLIV 1,3[6]
SLIV 1,2[7]
SLIV 1,1[8]
SLIV 2,2[5]
$SLIV_2$ [6]: SLIV 2,1[6]
SLIV 3[5]
SLIV 1,4[6]
SLIV 1,3[7]
SLIV 1,2[8]
SLIV 1,1[9]
SLIV 2,2[6]
$SLIV_3$ [6]: SLIV 3[6]

Downlink slot n-5
Downlink slot n-4
Downlink slot n-3
Downlink slot n-2
Downlink slot n-1
Downlink slot n

FIG. 15

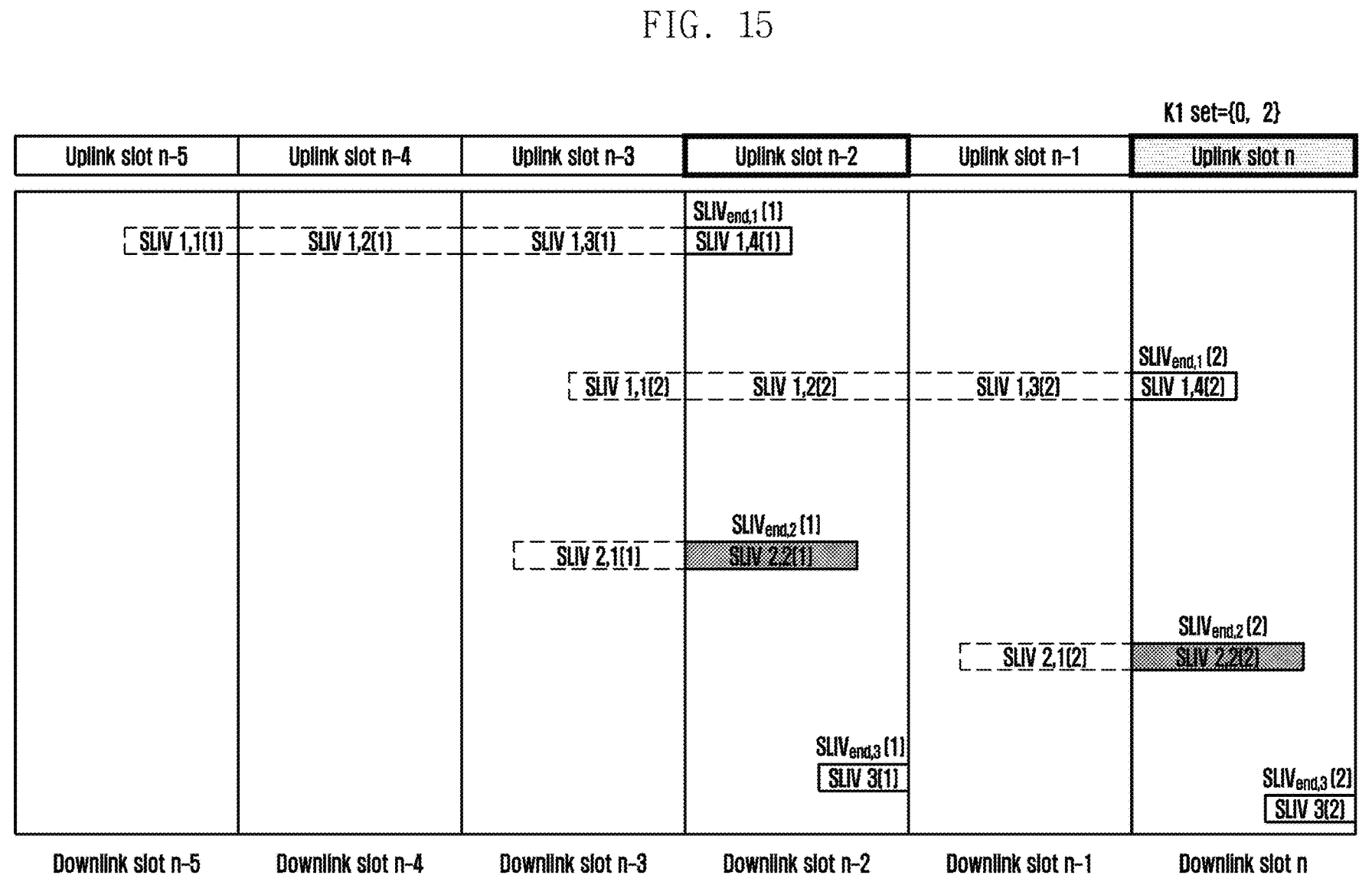

K1 set={0, 2}

Uplink slot n-5
Uplink slot n-4
Uplink slot n-3
Uplink slot n-2
Uplink slot n-1
Uplink slot n SLIV 1,1[1]
SLIV 1,2[1]
SLIV 1,3[1]
$SLIV_{end,1}$ [1]
SLIV 1,4[1]
SLIV 1,1[2]
SLIV 1,2[2]
SLIV 1,3[2]
$SLIV_{end,1}$ [2]
SLIV 1,4[2]
SLIV 2,1[1]
$SLIV_{end,2}$ [1]
SLIV 2,2[1]
SLIV 2,1[2]
$SLIV_{end,2}$ [2]
SLIV 2,2[2]
$SLIV_{end,3}$ [1]
SLIV 3[1]
$SLIV_{end,3}$ [2]
SLIV 3[2]

Downlink slot n-5
Downlink slot n-4
Downlink slot n-3
Downlink slot n-2
Downlink slot n-1
Downlink slot n

FIG. 16

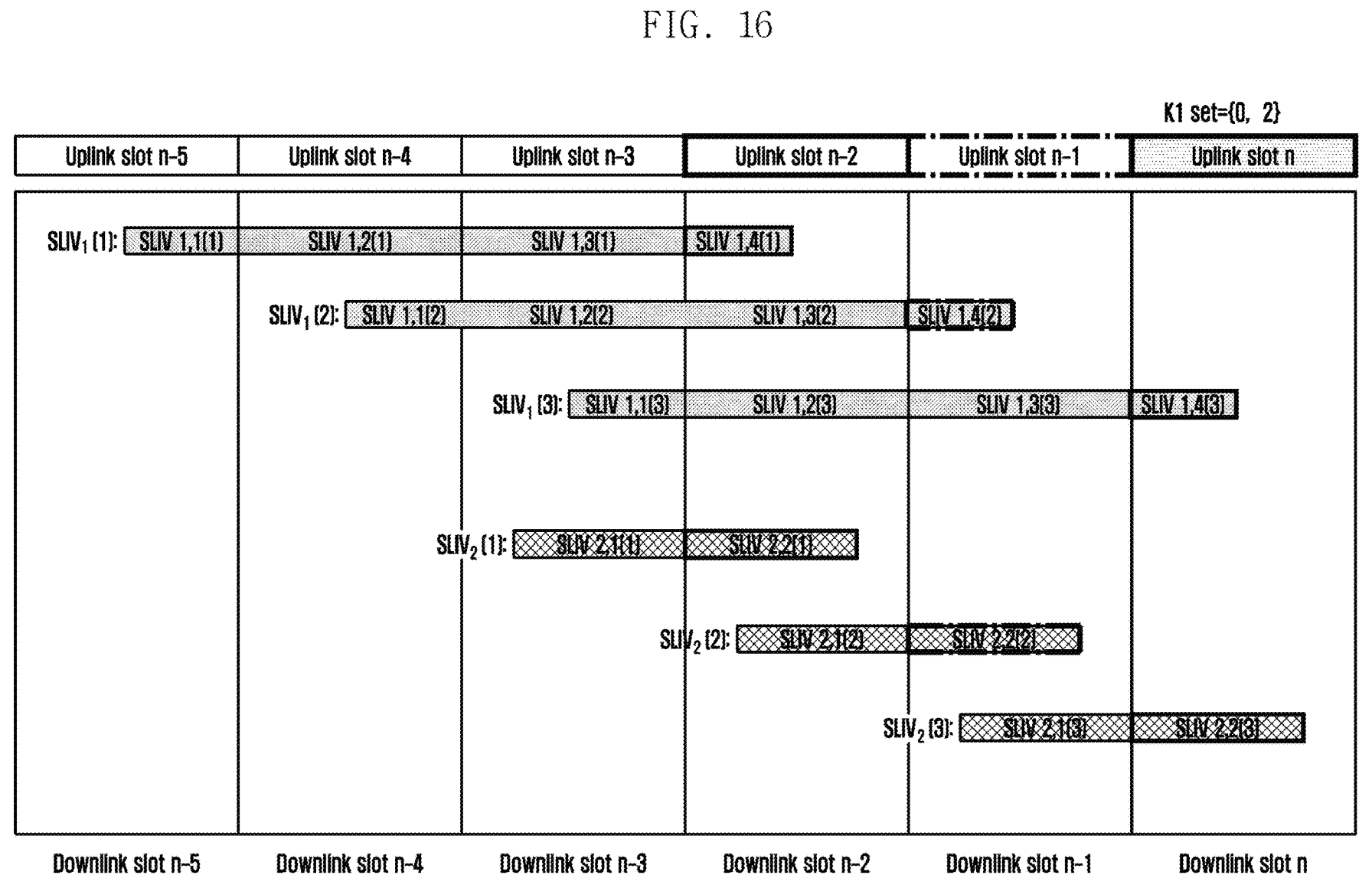

K1 set={0, 2}

Uplink slot n-5
Uplink slot n-4
Uplink slot n-3
Uplink slot n-2
Uplink slot n-1
Uplink slot n $SLIV_1$ (1): SLIV 1,1(1) SLIV 1,2(1) SLIV 1,3(1) SLIV 1,4(1)

$SLIV_1$ (2): SLIV 1,1(2) SLIV 1,2(2) SLIV 1,3(2) SLIV 1,4(2)

$SLIV_1$ (3): SLIV 1,1(3) SLIV 1,2(3) SLIV 1,3(3) SLIV 1,4(3)

$SLIV_2$ (1): SLIV 2,1(1) SLIV 2,2(1)

$SLIV_2$ (2): SLIV 2,1(2) SLIV 2,2(2)

$SLIV_2$ (3): SLIV 2,1(3) SLIV 2,2(3)

Downlink slot n-5
Downlink slot n-4
Downlink slot n-3
Downlink slot n-2
Downlink slot n-1
Downlink slot n

METHOD AND DEVICES FOR SIGNAL TRANSMISSION

PRIORITY

This application is a National Phase Entry of PCT International Application No. PCT/KR2022/000641, which was filed on Jan. 13, 2022, and claims priority to Chinese Patent Application Nos. 202110042718.7, 202110328672.5, 202110501307.X, and 202110898423.X, which were filed on Jan. 13, 2021, Mar. 26, 2021, May 8, 2021, and Aug. 5, 2021, respectively, the entire content of each of which is incorporated herein by reference.

TECHNICAL FIELD

The disclosure relates to the field of wireless communication technology, and more specifically, to methods and devices for signal transmission.

BACKGROUND ART

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

DISCLOSURE OF INVENTION

Technical Problem

The present disclosure provides a method for receiving one or more PDSCHs and transmitting HARQ-ACK codebook for the one or more PDSCHs.

Solution to Problem

According to an aspect of the present disclosure, there is provided a method for receiving one or more physical downlink shared channel (PDSCH), the method includes: receiving, by a user equipment (UE), a physical downlink control channel (PDCCH), wherein the received PDCCH includes downlink control information (DCI) for scheduling one or more PDSCHs; receiving, by the UE, one or more PDSCHs according to the received DCI; determining and transmitting, by the UE, a hybrid automatic repeat request acknowledgement (HARQ-ACK) codebook for one or more PDSCHs according to the received PDSCH and PDCCH.

Optionally, in case that the HARQ-ACK of Np PDSCHs scheduled by a DCI may correspond to one or more uplink time units, the UE determines one or more feedback time delays K1 based on an explicit or implicit indication; and determines one or more uplink time units for feeding back one or more HARQ-ACK according to one or more K1s.

Optionally, the DCI further includes information used to indicate the HARQ process ID of the PDSCH; optionally, the HARQ process ID of the PDSCH indicated in the DCI is determined according to the order of valid PDSCHs.

Optionally, the DCI further includes new data indication (NDI) and redundancy version (RV) information for indicating PDSCH. Optionally, the DCI indicates the NDI and RV of each PDSCH of the Np PDSCHs; or the DCI indicates the NDI and RV of each PDSCH of the Np1 valid PDSCHs among the Np PDSCHs.

Optionally, the bit field lengths of NDI and RV in DCI are determined according to the maximum value of the number of valid Start and Length Indicator Values (SLIVs) indicated by each row in the PDSCH TDRA table T; or, the bit field lengths of NDI and RV in DCI are determined according to the maximum value of the number of SLIVs indicated by each row in the PDSCH TDRA table T.

Optionally, determining and transmitting, by the UE, a hybrid automatic repeat request acknowledgement (HARQ-ACK) codebook for one or more PDSCHs according to the received PDSCH and PDCCH includes: the UE determines the candidate PDSCH receiving position for placing each HARQ-ACK bit in the semi-static HARQ-ACK codebook according to at least one of the following information: a first time offset set K; a second time offset set K'; a set of PDSCH time domain resource allocation TDRA table T; whether the SLIVs overlap.

Optionally, on one carrier, if the UE receives at most 1 PDSCH in a slot/sub-slot, or at most 1 PDSCH for feeding back HARQ-ACK in the same HARQ-ACK codebook or HARQ-ACK sub-codebook, then whether the SLIVs overlap is determined by the determination that whether each SLIV in the set of slots/sub-slots $n_{pdsch}$ where the candidate PDSCH receiving position is located is an overlap in the slot or sub-slot.

Optionally, the first time offset set K is determined according to the set of time offsets K1 indicated by the DCI format.

Optionally, the second time offset set K' is a set of time offsets K1 a set of time offsets K1 which is determined based on a set of time offsets K1' indicated according to the DCI format and the PDSCH TDRA table T.

Optionally, for a row in the PDSCH TDRA table T, in case where the number of PDSCHs Np>0, the time offset K1' corresponding to each PDSCH is determined according to the position where the ending symbol is located and the time offset K1 for each PDSCH of the Np PDSCHs scheduled in the row.

Optionally, for an uplink slot/sub-slot n, the set of slots/sub-slots $n_{pdsch}$ where the candidate PDSCH receiving position is located is determined according to the first time offset set K and/or the second time offset set K'.

Optionally, for an uplink slot/sub-slot n, the set of slots/sub-slots $n_{pdsch}$ where the candidate PDSCH receiving position is located is determined according to the maximum value and/or minimum value the first time offset set K and/or the second time offset set K'.

Optionally, in a slot/sub-slot $n_{pdsch}$ where the candidate PDSCH receiving position is located or in the set of slots/sub-slots $n_{pdsch}$ where the candidate PDSCH receiving position is located, the candidate PDSCH receiving position is determined according to the valid SLIV in PDSCH TDRA Table T in the slot/sub-slot.

Optionally, the valid SLIV is determined according to at least one of the following methods: whether the SLIV is valid is determined according to the PDCCH monitoring occasion/PDCCH candidate position and the slot parameter K0 in the PDSCH TDRA table T; whether the SLIV is valid is determined according to the multiple PDSCHs or the single PDSCH in a row of the PDSCH TDRA table T; whether the SLIV is valid is determined according to whether the slot/sub-slot where the ending symbol of the last PDSCH is located is in the set of slots/sub-slots $n_{pdsch}$ of the candidate PDSCH receiving position; whether the SLIV is valid is determined according to the uplink and downlink configuration.

Optionally, for the i-th row in the PDSCH TDRA table T, if Np>0, the SLIVs according to Np PDSCHs are used to determine the candidate PDSCH receiving position, respectively.

Optionally, for the i-th row in the PDSCH TDRA table T, if Np>0, the SLIVs according to Np PDSCHs are collectively used as one $SLIV_{ri}$ to determine the candidate PDSCH receiving position.

Optionally, if multiple $SLIV_{ri}$s overlap, the candidate PDSCH receiving position unit is determined according to one of the multiple $SLIV_{ri}$s, wherein the candidate PDSCH receiving position unit includes one or more candidate PDSCH receiving positions.

Optionally, the number of candidate PDSCH receiving positions included in the candidate PDSCH receiving position unit corresponding to a $SLIV_{ri}$ is determined according to at least one of the following methods: the number of candidate PDSCH receiving positions included in the candidate PDSCH receiving position unit corresponding to the $SLIV_{ri}$ is determined according to the number of PDSCHs included in the $SLIV_{ri}$; the number of candidate PDSCH receiving positions included in the candidate PDSCH receiving position unit corresponding to the $SLIV_{ri}$ is determined according to the maximum value of the number of PDSCHs included in each SLIVri corresponding to the same candidate PDSCH receiving position unit of the SLIVri; the number of candidate PDSCH receiving positions included in the candidate PDSCH receiving position unit corresponding to the $SLIV_{ri}$ is determined according to the maximum value of the number of PDSCHs included in each of the $SLIV_{ri}$; the number of candidate PDSCH receiving positions included in the candidate PDSCH receiving position unit corresponding to the $SLIV_{ri}$ is determined is 1.

Optionally, the number of HARQ-ACK bits corresponding to a candidate PDSCH receiving position is determined according to at least one of the following methods: the number of HARQ-ACK bits corresponding to the candidate PDSCH receiving position is determined by the number of HARQ-ACK bits corresponding to a PDSCH; the number of HARQ-ACK bits corresponding to the candidate PDSCH receiving position is determined by the number of HARQ-ACK bits of the Nq PDSCHs corresponding to the PDSCH receiving position, wherein Nq is determined by the number of PDSCHs included in the $SLIV_{ri}$ of the PDSCH receiving $SLIV_{ri}$, or Nq is determined by the maximum value of the number of PDSCHs included in each SLIV of the PDSCH receiving position, or Nq is determined by the maximum value of the number of PDSCHs included in each of the $SLIV_{ri}$.

Optionally, the number of candidate PDSCH receiving positions included in the candidate PDSCH receiving position unit corresponding to a $SLIV_{ri}$ is determined based on the configuration of the CBG, wherein if a carrier is configured with CBG based transmission, the number of candidate PDSCH receiving positions included in the candidate PDSCH receiving position unit corresponding to the $SLIV_{ri}$ of the carrier is 1, and the number of HARQ-ACK bits corresponding to the candidate PDSCH receiving position is determined by the maximum value of number of CBGs corresponding to a PDSCH; and wherein, if the carrier is not configured for CBG based transmission, the number of candidate PDSCH receiving positions included in the candidate PDSCH receiving position unit corresponding to the $SLIV_{ri}$ of the carrier is determined by the maximum value of the number of PDSCHs included in each SLIVri corresponding to the same candidate PDSCH receiving position unit of the SLIVri, and the number of HARQ-ACK bits corresponding to the candidate PDSCH receiving position is determined by the maximum value of number of TBs corresponding to one PDSCH.

Optionally, the number of HARQ-ACK bits corresponding to the candidate PDSCH receiving position is determined according to at least one of the following methods: if a carrier is configured with the CBG based transmission, the number of HARQ-ACK bits corresponding to one PDSCH receiving position is determined by the maximum value of number of CBGs corresponding to a PDSCH; and if a carrier is not configured with CBG based transmission, the number of HARQ-ACK bits corresponding to one PDSCH receiving position is determined by the maximum value of number of TB corresponding to one PDSCH.

Optionally, the HARQ-ACK codebook includes a first sub-codebook and/or a second sub-codebook.

Optionally, the first sub-codebook includes HARQ-ACK of a PDSCH or a PDCCH of at least one of the following types: HARQ-ACK of a PDSCH, if the PDSCH is a semi-static scheduled SPS PDSCH; HARQ-ACK of a PDCCH, if the PDCCH is the PDCCH that indicates a SPS PDSCH release, or the PDCCH that indicates secondary cell (Scell) dormancy; HARQ-ACK of a PDCCH, if the PDCCH indicates the transmission configuration indicator (TCI) update information or the downlink/uplink beam information, and the PDCCH does not schedule a PDSCH; HARQ-ACK of a PDSCH, if the reception of the PDSCH is a TB based PDSCH reception, and the PDSCH is scheduled by a PDCCH which schedules one PDSCH.

Optionally, the second sub-codebook includes HARQ-ACK of a PDSCH or a PDCCH of at least one of the following types: HARQ-ACK of a PDSCH, if the PDSCH is scheduled by a PDCCH which schedules Np PDSCHs, wherein Np>X and X are positive integers; HARQ-ACK of a PDSCH, if the reception of the PDSCH is the CBG based PDSCH reception; HARQ-ACK of a PDSCH and HARQ-ACK of the PDCCH which schedules the PDSCH, if the PDCCH includes scheduling information of the scheduled PDSCHs, and the PDCCH is a PDCCH that requires HARQ-ACK feedback for the PDCCH.

Optionally, the total number of bits of the second sub-codebook is the downlink assignment indicator $DAI_{g2}$*N2, wherein $DAI_{g2}$ is the downlink assignment indicator DAI in the PDCCH corresponding to the sub-codebook; and the parameter N2 is configured by a higher layer, or is determined by the maximum number of CBGs corresponding to one PDSCH, or determined by the maximum number of PDSCHs which can be scheduled by one PDCCH, or determined by the maximum number of TBs that can be scheduled by a PDCCH, or determined by the maximum number of CBGs corresponding to one PDSCH and the maximum number of PDSCHs which can be scheduled by one PDCCH, or determined by the maximum number of CBGs corresponding to one PDSCH and the maximum number of TBs which can be scheduled by one PDCCH.

Optionally, the DAI counting rules for DCIs belonging to the same HARQ-ACK sub-codebook are the same. Optionally, the DAI counting rules for DCIs belonging to the same HARQ-ACK codebook are the same. Optionally, the DAI counting rules for DCIs scheduling Np PDSCHs are the same, wherein Np>1.

Optionally, the UE determines the determination method of the HARQ-ACK sub-codebook through CBG based configuration, or determines the determination method of the HARQ-ACK sub-codebook through the configuration from the base station.

Optionally, the DCI for scheduling PDSCHs is further used to trigger the transmission of the Type-3 HARQ-ACK codebook. The Type-3 HARQ-ACK codebook includes the HARQ-ACK information of PDSCHs for part or all of the HARQ process.

Optionally, if one DCI schedules Np PDSCHs and triggers the transmission of the Type-3 HARQ-ACK codebook, the time difference from the first symbol of the PUCCH resource determined according to the K1 indicated by the DCI to the ending symbol of the Np1-th PDSCH scheduled by the DCI is greater than or equal to the first threshold, and/or the time difference from the first symbol of the PUCCH resource determined according to the K1 indicated by the DCI to the ending symbol of the Np2-th PDSCH scheduled by the DCI is less than the first threshold, wherein Np1 and Np2 are less than or equal to Np.

Preferably, the first threshold is the PDSCH processing time Tproc,1.

Preferably, the UE provides the valid HARQ-ACK for the first to Np1-th PDSCHs in the Type-3 HARQ-ACK codebook.

Preferably, the UE feeds back a predefined HARQ-ACK value for the Np2-th PDSCH~the Np-th PDSCH in the Type-3 HARQ-ACK codebook, wherein the predefined HARQ-ACK value is NACK.

According to another aspect of the present disclosure, there is a provided user equipment including: a transceiver to transmit/receive signals to/from a base station; and a controller to control the overall operation of the user equipment, wherein the user equipment is configured to perform the above method.

Advantageous Effects of Invention

According to an embodiment of the present disclosure, user equipment may receive one or more PDSCHs and feed back HARQ-ACK codebook for the one or more PDSCHs.

Further, according to an embodiment of the present disclosure, user equipment may determine a candidate PDSCH receiving position for placing each HARQ-ACK bit in the HARQ-ACK codebook.

BRIEF DESCRIPTION OF DRAWINGS

The above and additional aspects and advantages of the present disclosure will become more apparent and readily understood, from the following description with reference to the accompanying drawings hereinafter, in which:

FIG. 6 shows a PDSCH TDRA table T according to an exemplary embodiment of the present disclosure;

FIG. 7 shows a PDSCH TDRA table T according to an exemplary embodiment of the present disclosure;

FIG. 8 shows a PDSCH TDRA table T according to an exemplary embodiment of the present disclosure;

FIG. 9 shows a PDSCH TDRA table T according to an exemplary embodiment of the present disclosure;

FIG. 11 shows a PDSCH TDRA table T according to an exemplary embodiment of the present disclosure;

FIG. 12 shows a PDSCH TDRA table T according to an exemplary embodiment of the present disclosure;

FIG. 13 shows a PDSCH TDRA table T according to an exemplary embodiment of the present disclosure;

FIG. 14 shows a PDSCH TDRA table T according to an exemplary embodiment of the present disclosure;

FIG. 15 shows a PDSCH TDRA table T according to an exemplary embodiment of the present disclosure;

FIG. 16 shows a PDSCH TDRA table T according to an exemplary embodiment of the present disclosure.

MODE FOR THE INVENTION

The following description with reference to the accompanying drawings is provided to facilitate a comprehensive understanding of various embodiments of the present disclosure defined by the claims and their equivalents. The description includes various specific details to facilitate understanding but should only be regarded as exemplary. Therefore, those of ordinary skill in the art will recognize that various changes and modifications can be made to the various embodiments described herein without departing from the scope and spirit of the present disclosure. In addition, for clarity and conciseness, descriptions of well-known functions and structures may be omitted.

The terms and expressions used in the following specification and claims are not limited to their dictionary meanings, but are merely used by the inventor to enable a clear and consistent understanding of the present disclosure. Therefore, it should be apparent to those skilled in the art that the following descriptions of various embodiments of the present disclosure are provided for illustrative purposes only and not for the purpose of limiting the present disclosure as defined by the appended claims and their equivalents.

It should be understood that the singular form of "a", "an" and "the" include plural references unless the context clearly indicates otherwise. Thus, for example, reference to "a component surface" includes reference to one or more such surfaces.

The term "includes" or "may include" refers to the presence of the correspondingly disclosed functions, operations or components that can be used in various embodiments of the present disclosure, and does not limit the presence of one or more additional functions, operations or features. In addition, the term "comprising" or "having" can be construed to denote certain characteristics, numbers, steps, operations, constituent elements, components, or combinations thereof, but should not be construed as excluding the possibility of the presence of one more other characteristics, numbers, steps, operation, constituent elements, components, or combination thereof.

The term "or" used in various embodiments of the present disclosure includes any listed terms and all combinations thereof. For example, "A or B" may include A, may include B, or may include both A and B.

Unless defined differently, all terms (including technical or scientific terms) used in the present disclosure have the same meaning as understood by those skilled in the art that in the present disclosure belongs to. The general terms as defined in the dictionary are interpreted as having a meaning consistent with the context in the related technical field, and should not be interpreted ideally or excessively formally unless explicitly defined as such in the present disclosure.

Figure 1:
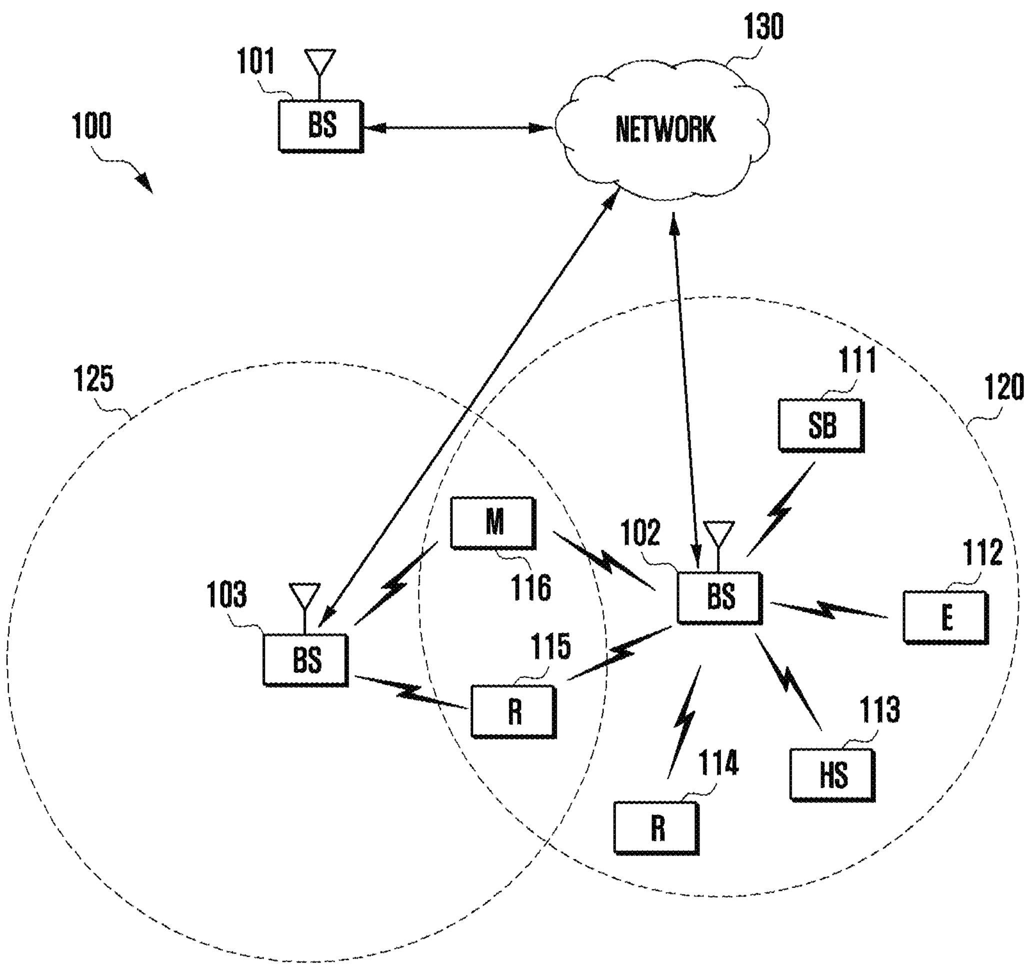
FIG. 1 shows an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in the patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in the patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
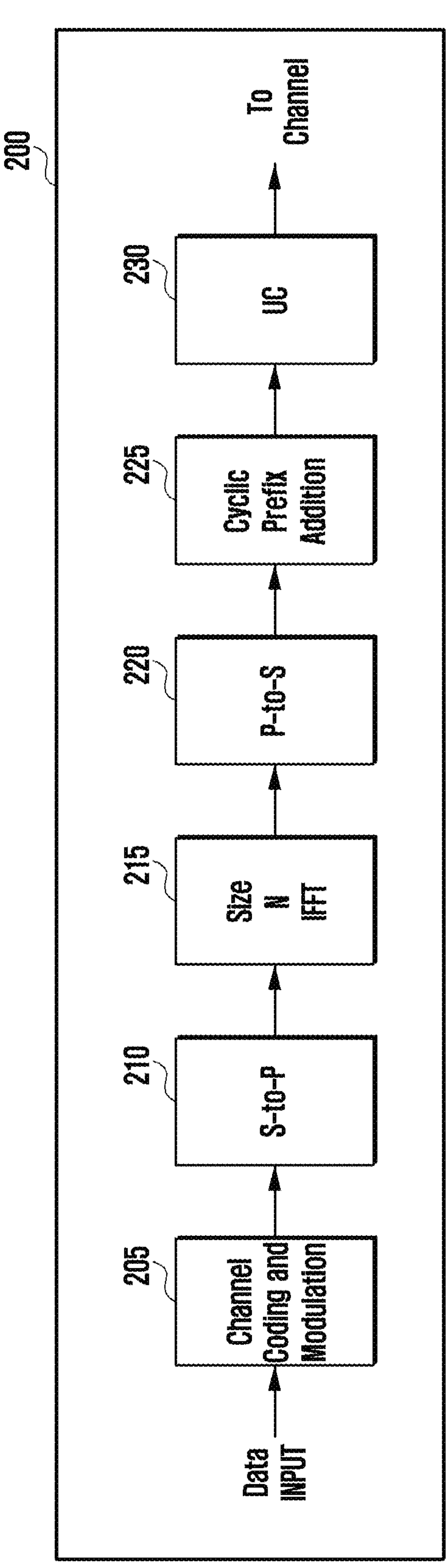
FIG. 2*a* shows an example wireless transmission path and reception path according to embodiments of the present disclosure.
Figure 2B:
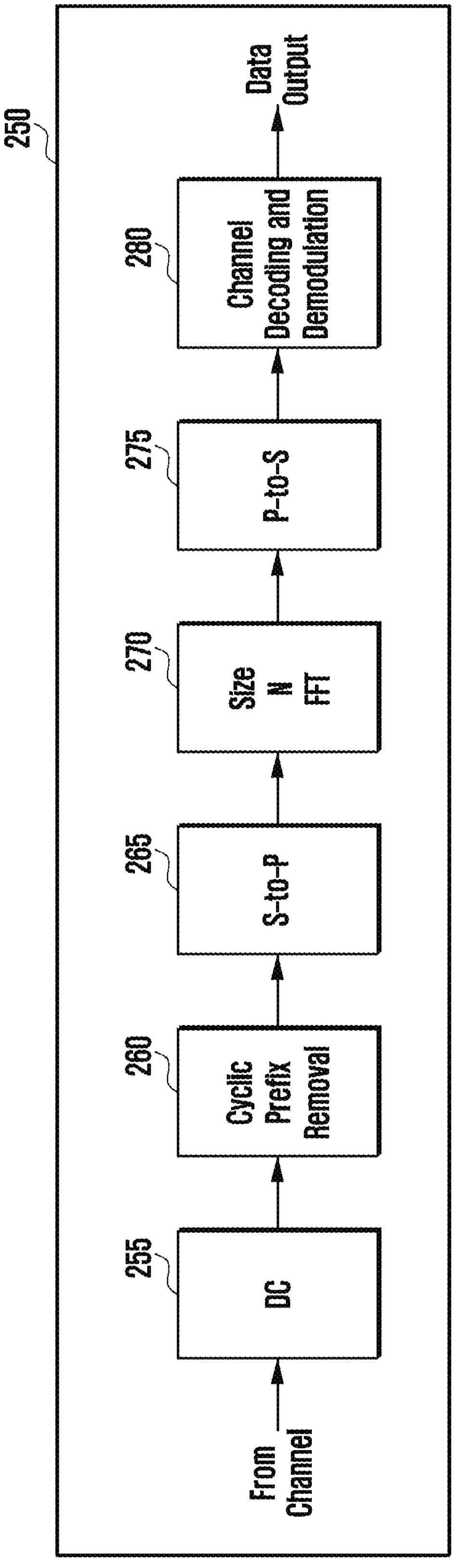
FIG. 2*b* shows an example wireless transmission path and reception path according to embodiments of the present disclosure.

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. **2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215** may be implemented as configurable software algorithms, in which the value of the size N may be modified according to the implementation.

Furthermore, although described as using FFT and IFFT, the is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. **2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b*** are intended to illustrate examples of types of transmission and reception paths that can be used in a wireless network. Any other suitable architecture can be used to support wireless communication in a wireless network.

Figure 3A:
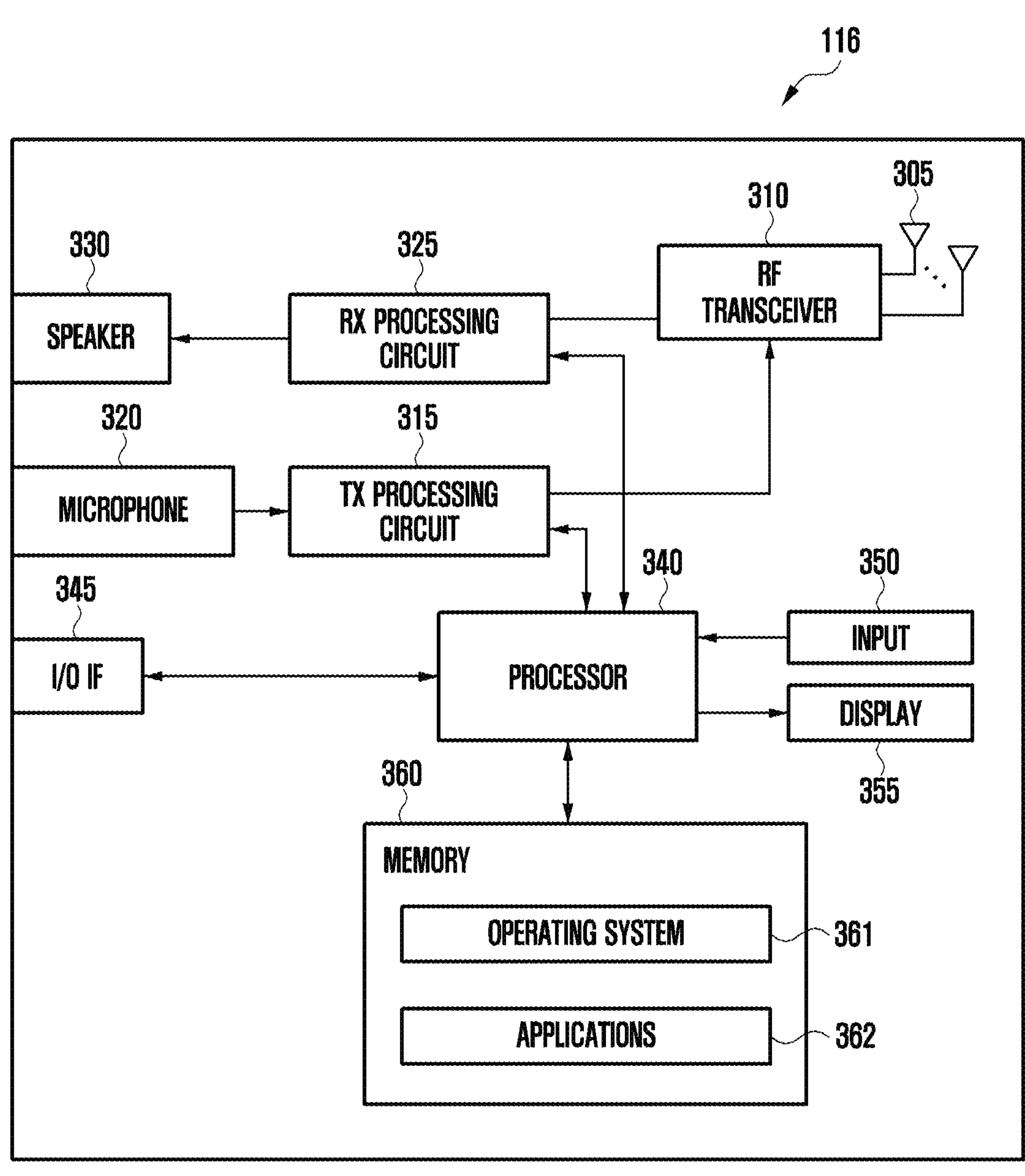
FIG. 3*a* shows an example user equipment according to an embodiment of the present disclosure.

FIG. **3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a*** does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between the accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
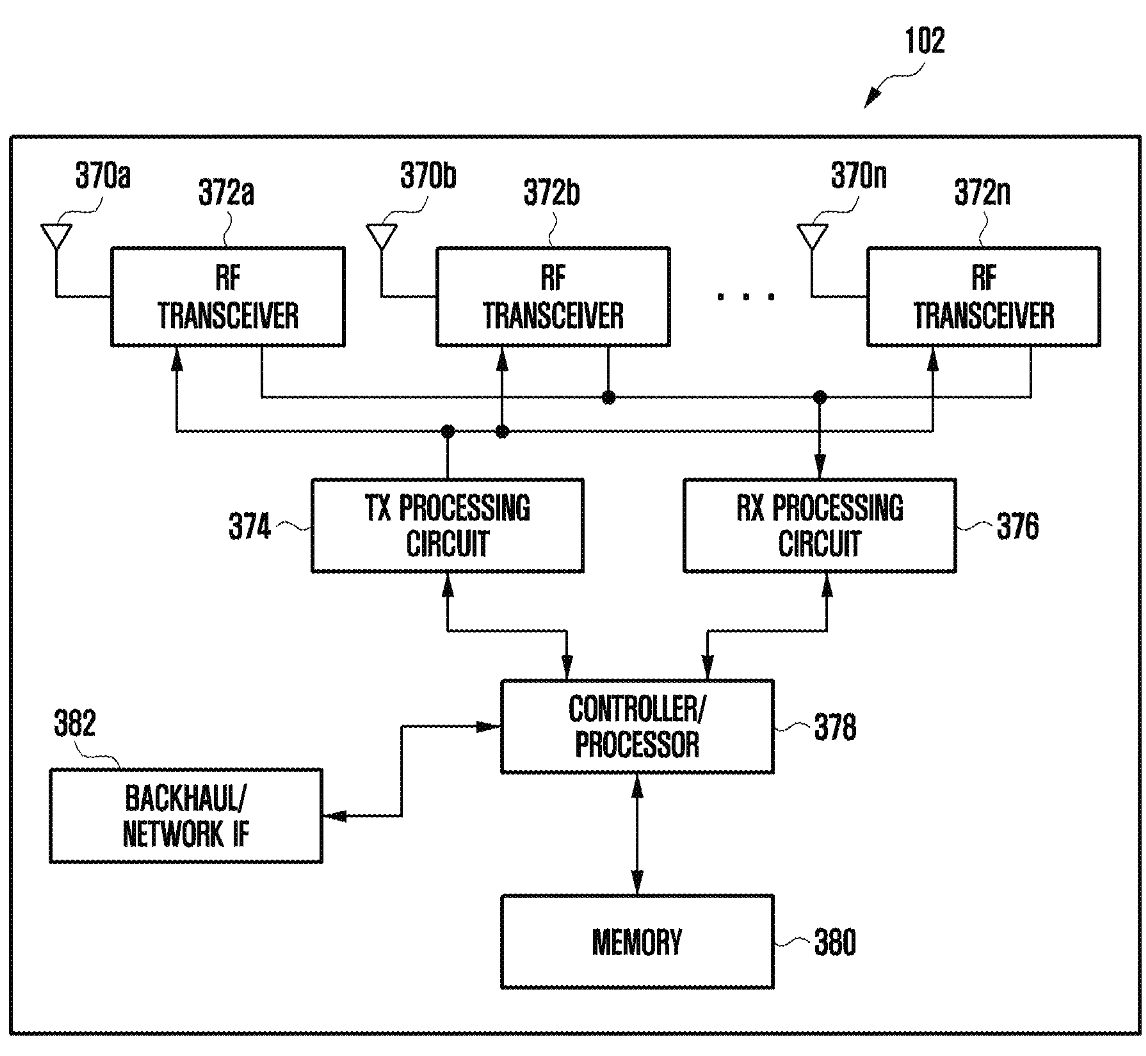
FIG. 3*b* shows an example base station according to an embodiment of the present disclosure.

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that gNB 101 and gNB 103 can include the same or similar structures as gNB 102.

As shown in FIG. 3*b*, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below with reference to the accompanying drawings.

The text and drawings are provided as examples only to help readers understand the present disclosure. They are not intended and should not be construed as limiting the scope of the present disclosure in any way. Although certain embodiments and examples have been provided, based on the content disclosed herein, it is apparent to those skilled in the art that changes can be made to the illustrated embodiments and examples without departing from the scope of the present disclosure.

In a wireless communication system, before the UE receives the PDSCH, it needs to receive the PDCCH and obtain the scheduling information of the PDSCH; after receiving the PDSCH according to the scheduling information, UE needs to report the HARQ-ACK information to the base station. In addition, the UE may also report other uplink control information to the base station. The UE can carry HARQ-ACK information or other uplink control information through PUCCH.

Embodiment One

Figure 4:
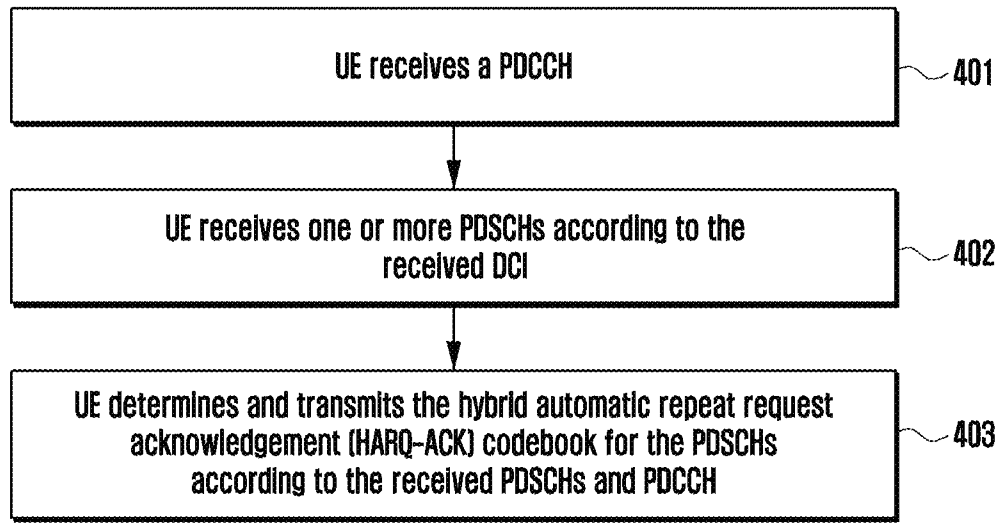
FIG. 4 shows a flowchart of a method for transmitting one or more PDSCHs according to an aspect of the present disclosure.

FIG. 4 shows a flowchart of a method for transmitting one or more PDSCHs according to an aspect of the present disclosure. The method includes:

In step 401: UE receives a PDCCH. The received PDCCH may include a DCI for scheduling one or more PDSCHs.

In step 402: the UE receives one or more PDSCHs according to the received DCI.

In step 403: the UE determines and transmits the hybrid automatic repeat request acknowledgement (HARQ-ACK) codebook for the PDSCHs according to the received PDSCHs and PDCCH.

Preferably, the HARQ-ACK codebook is a semi-static HARQ-ACK codebook, which is also referred to as Type-1 HARQ-ACK codebook.

The DCI in step 401 may schedule 1 PDSCH or Np PDSCHs, wherein Np>1. The DCI may include information about HARQ-ACK timing. The HARQ-ACK timing information is the time delay from PDSCH to HARQ-ACK feedback, denoted as K1.

The HARQ-ACK of Np PDSCHs scheduled by one DCI may correspond to the same uplink time unit. Then, only one HARQ-ACK timing information bit field is needed in DCI. The last PDSCH among the Np PDSCHs scheduled according to the DCI is a time reference, and the uplink time unit where the HARQ-ACK is transmitted is determined according to K1. Preferably, the uplink time unit is an uplink slot or sub-slot.

The HARQ-ACK of Np PDSCHs scheduled by one DCI may correspond to one or more uplink time units. According to one implementation, there are multiple HARQ-ACK timing information bit fields in the DCI, or there is only one HARQ-ACK timing information bit field in the DCI, but the bit field may indicate multiple K1s. For the convenience of description, the method is referred to as explicitly indicating multiple K1s. According to another implementation, there is only one HARQ-ACK timing information bit field in the DCI and the bit field only indicates one K1, and additional K1s are configured by the base station or predefined by the standard as the second, . . . , Nk1-th K1; or there is only one HARQ-ACK timing information bit field in the DCI and the bit field only indicates one K1, and Nk1 K1s are determined according to the indicated K1, and the value of each K1 is the same as the value of the indicated K1. For the convenience of description, the method is referred to as implicitly indicating multiple K1s. The UE determines one or more K1s based on an explicit or implicit manner; and determines one or more uplink time units for feeding back HARQ-ACK according to one or more K1s and the last PDSCH among the PDSCHs corresponding to each K1; or, the UE determines one or more uplink time units for feeding back HARQ-ACK according to multiple K1s and the last PDSCH of Np PDSCHs, or the UE determines one or more uplink time units for feeding back HARQ-ACK according to one K1 and multiple PDSCHs among Np PDSCHs, respectively. Implicitly or explicitly indicating one or more K1 in one DCI can achieve a flexible, reasonable compromise of PUCCH resource allocation, HARQ-ACK feedback time delay, and DCI overhead.

For the case of multiple K1s, the UE determines the correspondence between each PDSCH of the Np PDSCHs scheduled by the DCI and each K1 according to predefined rules. The predefined rules are at least one of the followings:

If the HARQ-ACK timing information bit field in the DCI explicitly indicates Nk1 K1s, wherein Nk1 is equal to Np. Then, the Np PDSCHs scheduled by the DCI correspond to Nk1 K1s on a one-to-one basis. The values of Nk1 K1s can be the same or different.

If the HARQ-ACK timing information bit field in the DCI explicitly indicates Nk1 K1s, then among the Np PDSCHs scheduled by the DCI, every P PDSCHs correspond to the same K1, that is, the HARQ-ACKs of the P PDSCHs are fed back in the same PUCCH. The time resource of the PUCCH is determined by the last PDSCH of the P PDSCHs and the corresponding K1. Wherein, P=floor (Np/Nk1), or P=ceil (Np/Nk1), or P=(Np/Nk1).

For example, the HARQ-ACK timing information bit field indicates K1=2,3, Nk1=2, Np=8, P=8/2=4. Then the 1st~4th PDSCHs correspond to the first PUCCH, the time resource of the PUCCH is determined by the 4th PDSCH and the first K1 (K1=2); and the 5th-8th PDSCHs correspond to the second PUCCH, the time resource of the PUCCH is determined by the 8th PDSCH and the second K1 (K1=3).

If the HARQ-ACK timing information bit field in the DCI explicitly indicates Nk1 K1s, the Np PDSCHs scheduled by the DCI correspond to Nk2 K1s, wherein Nk2≤Nk1. The value of Nk2 is determined according to the comparison result of Np and the predefined threshold M1. Preferably, the standard predefines the maximum value of Nk1 or Nk2. For example, the standard pre-defined maximum value of Nk2 is 2. If Np>M1, then Nk2=2, otherwise Nk2=1. When Nk2<Nk1, Nk2 K1s are the first Nk2 K1s among Nk1 K1s. If Np>M1, the first P PDSCHs correspond to the first K1, and the last Np-P PDSCHs correspond to the second K1, wherein P=floor (Np/Nk1), or P=ceil (Np/Nk1). The PUCCH resources corresponding to the first P PDSCHs are determined by the P-th PDSCH and the first K1, and the PUCCH resources corresponding to the last Np-P PDSCHs are determined by the Np-th PDSCH and the second K1. If Np=M1, Np PDSCHs correspond to the first K1.

For example, the HARQ-ACK timing information bit field indicates K1=2,3, Nk1=2, Np=8, M1=4, P=8/2=4. Np>M1, therefore Nk2=2. The 1st-4th PDSCHs correspond to the first PUCCH, the time resource of the PUCCH is determined by the 4th PDSCH and the first K1 (K1=2); and the 5th-8th PDSCHs correspond to the second PUCCH, the time resource of the PUCCH is determined by the 8th PDSCH and the second K1 (K1=3). For another example, the HARQ-ACK timing information bit field indicates K1=2,3, Nk1=2, Np=4, and M1=4. Np=M1, therefore Nk2=1. Thus, 8 PDSCHs correspond to the same PUCCH, and the value of K1 is the first one of the 2 K1s. Then, the time resource of the PUCCH is determined by the 8th PDSCH and the 1st K1 (K1=2).

If the HARQ-ACK timing information bit field in the DCI explicitly indicates Nk1 K1s, the Np PDSCHs scheduled by the DCI correspond to Nk2 K1s, wherein Nk2≤Nk1. When Nk2<Nk1, Nk2 K1s are the first Nk2 K1s among Nk1 K1s. The value of Nk2 is determined according to the time interval from the PDSCH scheduled by the DCI to the PUCCH determined according to K1. For example, if among the Np PDSCHs scheduled by the DCI, there is at least one PDSCH, the time interval from which to the PUCCH determined according to the first K1 is less than the predefined threshold, then Nk2=2, and the HARQ-ACK of the PDSCH, the time interval from which is greater than or equal to the predefined threshold, is carried by the PUCCH determined according to the first K1, while the HARQ-ACK of the PDSCH, the time interval from which is less than the predefined threshold, is carried by the PUCCH determined according to the second K1. If among the Np PDSCHs scheduled by the DCI, there is no one PDSCH, the time interval from which to the PUCCH determined according to the first K1 is less than the predefined threshold, then Nk2=1, that is, the HARQ-ACK of all PDSCHs is carried by the PUCCH determined according to the first K1. Preferably, the predefined threshold is PDSCH processing time Tproc,1. Preferably, the predefined threshold is configured by the base station. Preferably, the time resource of the PUCCH is determined by the last PDSCH scheduled by the DCI and K1. For example, the threshold is 2 slots. One DCI schedules 8 PDSCHs, which are located in slots n~n+8, K1=1,3. Then, the time resource of PUCCH is located in slot n+9. For the 8th PDSCH, the interval between the ending symbol of the PDSCH and the starting point of the time resource of the PUCCH is less than 2 slots, and the intervals between the ending symbols of the 1st-7th PDSCH and the starting point of the time resource of the PUCCH are greater than or equal to 2 slots, then the HARQ-ACK of 1st~7th PDSCH transmits PUCCH in slot n+9, while the HARQ-ACK of PDSCH 8 is determined according to the value of the second K1, and the PUCCH is transmitted in slot n+11.

If the HARQ-ACK timing information bit field in the DCI implicitly indicates Nk1 K1s, the Np PDSCHs scheduled by the DCI correspond to Nk2 K1s, wherein Nk2≤Nk1. As mentioned above, the value of Nk2 is determined according to the comparison result of Np and the predefined threshold M1, or the value of Nk2 is determined according to whether there is at least one PDSCH among the Np PDSCHs, the time interval from which to the PUCCH determined according to K1 is less than the predefined threshold.

For example, M1=4, Np=8. The HARQ-ACK timing information bit field indicates K1=3. The K1 predefined for the second PUCCH equals to 1. Since Np>M1, the 8 PDSCHs scheduled by the DCI correspond to Nk2 K1s, respectively, wherein NK2=2. The 1st~4th PDSCHs correspond to the first PUCCH, the time resource of the PUCCH is determined by the 4th PDSCH and the K1 indicated by the DCI (K1=3); and the 5th~8th PDSCHs correspond to the second PUCCH, the time resource of the PUCCH is determined by the 8th PDSCH and the K1 (K1=1) predefined for the second PUCCH.

Preferably, K1 is K1 with a specific value or an inapplicable value K1, that is, the base station does not indicate a specific value of K1.

If one DCI schedules Np PDSCHs, wherein part of the PDSCHs correspond to a specific value of K1, and another part of the PDSCHs correspond to an inapplicable value K1, it can be understood that the two types of PDSCH correspond to different PUCCHs. For PDSCHs corresponding to the specific value of K1, the time resource of PUCCH is determined according to the PDSCH and value of K1; and for PDSCHs corresponding to the inapplicable value K1, another DCI indicating a specific value of K1 is needed to determine the time resources of the PDSCHs. For example, if the first DCI provides an inapplicable value K1, there is a second DCI after the first DCI, and the second DCI provides a specific value of K1, then the PUCCH time resource of the HARQ-ACK of the PDSCH corresponding to the inapplicable value K1 scheduled by the first DCI is determined by the PUCCH time resource which is determined by the specific value of K1 of the second DCI, that is, the same PUCCH time resource is used.

Preferably, if a DCI provides both a specific value of K1 and an inapplicable value K1, the time resource location of the PDSCH corresponding to inapplicable value K1 cannot be earlier than the time resource location of the PDSCH corresponding to the specific value of K1. For example, in slot n, DCI1 schedules Np=8 PDSCHs, the HARQ-ACK timing information bit field indicates that one K1=2, and another K1 is inapplicable value K1. According to one rule described above, it is determined that PDSCH 1~4 correspond to K1=2, and PDSCHs 5~8 correspond to an inapplicable value K1. The ending symbol of PDSCH 4 is located in slot n1, and HARQ-ACK of PDSCH 1~4 is located in slot n1+2. In slot n+1, DCI schedules M=2 PDSCHs (PDSCH 9, 10), and one HARQ-ACK timing information bit field indicates K1=1. The ending symbol of PDSCH 10 is located in slot n2 (n2>n1), then PUCCH2 of HARQ-ACK of PDSCHs 9~10 is located in slot n2+1, and HARQ-ACK of PDSCH 5~8 is also transmitted in PUCCH2.

Preferably, the value of K1 can be a positive integer, 0, or a negative integer. For example, if the time resource of PUCCH is determined according to the ending position of the last PDSCH scheduled by the DCI and K1, K1<0 can be used to support that the HARQ-ACK of pervious one or more PDSCHs scheduled by the DCI can be fed back before the end of the last PDSCH. For example, if the time resource of the PUCCH is determined according to the ending position of the last PDSCH corresponding to one PUCCH scheduled by the DCI and K1, then K1≥0.

The DCI further includes the time resource allocation information (i.e., time domain resource allocation information) of Np PDSCHs. Generally, the base station configures the PDSCH time domain resource allocation (TDRA) table T for the UE to determine the possible time resources of the PDSCHs. A row in Table T may indicate time resource information of one or more PDSCHs. The time resource information includes at least one of the starting symbol and the number of symbols (also referred to as Start and Length Indicator Value, SLIV) of the PDSCH, the located slot (k0), and the PDSCH mapping type. For example, the base station configures the time dimension resource allocation list of PDSCH (corresponding to the PDSCH TDRA table T), for example, through PDSCH-TimeDomainResourceAllocationList (time domain resource allocation list). The PDSCH-TimeDomainResourceAllocationList includes Ntdra elements, and each element corresponds to a row of the PDSCH TDRA table T. That is, the PDSCH TDRA table T includes Ntdra rows. One element in PDSCH-TimeDomainResourceAllocationList may include {SLIV, PDSCH mapping type and k0} of one or more PDSCHs. Correspondingly, a row of the PDSCH TDRA table T may include {SLIV, PDSCH mapping type and k0} of one or more PDSCHs.

Preferably, the number of PDSCHs, Np, included in an element in the PDSCH-TimeDomainResourceAllocation-List cannot exceed Nmax. Preferably, when the number of PDSCHs included in an element in the PDSCH-TimeDomainResourceAllocationList is greater than 1, the SLIV and PDSCH mapping type of each PDSCH in the element are indicated separately, but only k0 of the first PDSCH is indicated, and the slots where other PDSCHs locate are calculated according to the predefined rules. For example, if each PDSCH is defined to be continuous in time, then, according to the slot where the first PDSCH locates and the SLIV of other PDSCHs, the slots where other PDSCHs locate can be calculated. Preferably, when the number of PDSCHs included in an element in the PDSCH-TimeDomainResourceAllocationList is greater than 1, the {SLIV, PDSCH mapping type and k0} of each PDSCH in the element are indicated separately. The DCI indicates the time resources of the Np PDSCHs scheduled by the DCI by indicating a row index of the PDSCH TDRA table T.

Preferably, for the same scheduled cell of the same UE, if the DCI carried by PDCCH1 schedules Np1 PDSCHs, the DCI carried by PDCCH2 schedules Np2 PDSCHs, and the ending symbol of PDCCH2 is later than the ending symbol of PDCCH1, then, the UE does not expect that the starting point of any PDSCH of the Np2 PDSCHs is earlier than the ending symbol of any PDSCH of the Np1 PDSCHs. The starting point of the first PDSCH of Np2 PDSCHs cannot be earlier than the ending symbol of the last PDSCH of Np1 PDSCHs. With the restriction, the UE can process all the PDSCHs scheduled by PDCCH1 and then process the PDSCHs scheduled by PDCCH2, thereby reducing the processing complexity of the UE.

Preferably, for the same scheduled cell of the same UE, if the DCI carried by PDCCH1 schedules Np1 PDSCHs, the DCI carried by PDCCH2 schedules Np2 PDSCHs, and the ending symbol of PDCCH2 is later than the ending symbol of PDCCH1, then, the UE does not expect the starting point of the i-th PDSCH of the Np2 PDSCHs is earlier than the ending symbol of the i-th PDSCH of the Np1 PDSCHs. The starting point of the i-th PDSCH of the Np2 PDSCHs cannot be earlier than the ending symbol of the i-th PDSCH of the Np1 PDSCHs, but the starting point of the i-th PDSCH of the Np2 PDSCHs may be earlier than the ending symbol of the (i+1)-th PDSCH of the Np1 PDSCHs. In the way, the time delay of the PDSCH scheduled by PDCCH2 can be shortened.

Preferably, for the same scheduled cell of the same UE, if the base station configures that one PDCCH can schedule Np>1 PDSCHs, the UE does not expect to receive more than 1 unicast PDSCH in the same downlink slot/sub-slot; or, the UE does not expect to receive more than 1 PDSCH that requires HARQ-ACK feedback in the same downlink slot/sub-slot; or the UE does not expect to receive more than 1 PDSCH that requires HARQ-ACK feedback in the same HARQ-ACK codebook in the same downlink slot/sub-slot; or the UE does not expect to receive more than 1 unicast PDSCH that requires HARQ-ACK feedback in the same HARQ-ACK codebook in the same downlink slot/sub-slot.

The DCI further includes the HARQ process information of the PDSCH. According to one implementation, the HARQ process ID of the first PDSCH of the Np PDSCHs is indicated in the DCI, and the HARQ process IDs of the other Np−1 PDSCHs are sequentially increased by 1 on the basis. Preferably, if there are Np1 valid PDSCHs among the Np PDSCHs and Np-Np1 invalid PDSCHs, the HARQ process ID is determined only according to the order of the Np1 valid PDSCHs. Wherein, whether one PDSCH is valid depends on whether the time resource of the PDSCH conflicts with the semi-statically configured uplink and downlink symbols, for example, if there is at least one of the symbols of a PDSCH is determined as uplink symbol according to tdd-UL-DL-ConfigurationCommon, or tdd-UL-DL-ConfigurationDedicated, the PDSCH is an invalid PDSCH.

For example, one DCI schedules 4 PDSCHs, wherein PDSCH 1, 2, and 4 are valid PDSCHs; and the symbols of PDSCH3 include semi-static uplink symbols, then PDSCH 3 is an invalid PDSCH. DCI indicates HARQ process ID=3, then HARQ process ID of PDSCH 1=3, HARQ process ID of PDSCH 2=4, and HARQ process ID of PDSCH 4=5. For example, one DCI schedules 4 PDSCHs, wherein PDSCH 2, PDSCH 4 are valid PDSCHs, and PDSCH 1, PDSCH 3 are invalid PDSCHs. DCI indicates HARQ process ID=3, then HARQ process ID of PDSCH 2=3, and HARQ process ID of PDSCH 4=4. Preferably, the HARQ process ID is determined according to the order of Np PDSCHs. For example, one DCI schedules 4 PDSCHs, wherein PDSCH 1, 2, 4 are valid PDSCHs, and PDSCH 3 is an invalid PDSCH. DCI indicates HARQ process ID=3, then HARQ process ID of PDSCH 1=3, HARQ process ID of PDSCH 2=4, and HARQ process ID of PDSCH 4=6.

The DCI further includes new data indication (NDI) and redundancy version (RV) information of PDSCHs. According to one implementation, the NDI and RV of each PDSCH of the Np PDSCHs are indicated in the DCI. Preferably, if among the Np PDSCHs, there are Np1 valid PDSCHs and Np-Np1 invalid PDSCHs, the DCI indicates the NDI and RV of each PDSCH in the Np1 valid PDSCHs.

Preferably, the bit field length of the NDI and RV in the DCI is determined according to the maximum value of the number of valid SLIVs indicated by each row in the PDSCH TDRA table T. DCI overhead can be saved through the way. For example, there are 4 rows in Table T, and the total number of SLIVs indicated by each row is 4, 8, 8, 1, respectively. Wherein, the total number of valid SLIVs of each row determined according to whether it conflicts with the semi-statically configured uplink and downlink symbols is 4, 6, 6, and 1, respectively. Then the number of bits of NDI and RV in the DCI is determined according to the maximum value 6 of the total number of valid SLIVs.

Preferably, the bit field lengths of NDI and RV in the DCI are determined according to the maximum value of the number of SLIVs indicated by each row in the PDSCH TDRA table T. Although the DCI overhead is slightly larger in the way, the DCI size does not change with the uplink and downlink configuration, and it is relatively simple for the UE to implement. For example, there are 4 rows in Table T, and the total number of SLIVs indicated by each row is 4, 8, 8, 1, respectively. The number of bits of NDI and RV in the DCI is determined according to the maximum value 8 of the total number of SLIVs indicated in Table T, the bits of NDI and RV of the valid SLIV occupy the first Np1 bit positions in the 8 SLIVs, and the remaining bit positions are padding bits.

Preferably, if one DCI include information for code block group CBG based transmission, for example, CBGTI and CBGFI, the bit field is only applicable to the situation that the DCI schedules one PDSCH. If DCI schedules Np>1 PDSCHs, DCI does not include CBG based transmission information, or the bit field of CBG based transmission information is not applicable. During HARQ-ACK feedback, if the DCI schedules one PDSCH and the one PDSCH is not an SPS PDSCH, the UE performs CBG granularity feedback on the PDSCH. If the DCI schedules Np>1

PDSCHs, the UE performs transport block (TB) granularity feedback on the PDSCH. Or, if the DCI schedules Np>1 PDSCHs, the UE performs CBG granularity feedback on the PDSCH.

Preferably, if one DCI indicates secondary cell (Scell) dormancy, or indicates a SPS PDSCH release, or triggers the third type of HARQ-ACK feedback (such as the Type-3 HARQ-ACK codebook described in TS 38.213 9.1.4) and does not schedule DL-SCH, the UE does not expect the row of the PDSCH TDRA table T indicated in the DCI to include time resource information of Np>1 PDSCHs.

Preferably, if one DCI indicates SPS PDSCH activation, the UE does not expect the row of the PDSCH TDRA table T indicated in the DCI to include time resource information of Np>1 PDSCHs. Preferably, if one DCI indicates the retransmission of a SPS PDSCH, the UE does not expect the row of the PDSCH TDRA table T indicated in the DCI to include time resource information of Np>1 PDSCHs. Preferably, if the CRC of a DCI is scrambled by CS-RNTI, the UE does not expect the row of the PDSCH TDRA table T indicated in the DCI to include time resource information of Np>1 PDSCHs.

Preferably, if one DCI indicates transmission configuration indicator (TCI) update information or downlink/uplink beam information, and the PDCCH does not schedule PDSCH, the UE does not expect the row of the PDSCH TDRA table T indicated in the DCI to include time resource information of Np>1 PDSCHs.

Preferably, if one DCI indicates SPS PDSCH activation, and if the row of the PDSCH TDRA table T indicated in the DCI includes time resource information of Np>1 PDSCHs, then Np PDSCHs belong to different SPS PDSCH configurations. Wherein, the SPS PDSCH configuration index of the first PDSCH is indicated in the DCI, and the SPS PDSCH configuration indexes of the other Np−1 PDSCHs are sequentially incremented.

Preferably, if one DCI indicates SPS PDSCH activation, the DCI only activates one SPS PDSCH configuration. If the row of the PDSCH TDRA table T indicated in the DCI includes time resource information of Np>1 PDSCHs, then according to the predefined rules, the time resource information of one PDSCH of the Np PDSCHs is selected, and the time resource information of SPS PDSCH configured by the one activated SPS PDSCH is determined. For example, the time resource information of an SPS PDSCH configured by one SPS PDSCH is determined according to the time resource information of the first PDSCH, or the time resource information of an SPS PDSCH configured by one SPS PDSCH is determined according to the time resource information of the Np-th PDSCH. In step 403, the UE determines the HARQ-ACK codebook for the PDSCH according to the received PDSCH and PDCCH. For the HARQ-ACK transmitted in an uplink time unit n, the UE needs to determine the corresponding candidate PDSCH receiving position for placing each HARQ-ACK bit in the HARQ-ACK codebook. Determining the candidate PDSCH receiving position for placing HARQ-ACK bit includes determining the slot/sub-slot $n_{pdsch}$ where the candidate PDSCH receiving position is located and the candidate PDSCH receiving position $M_{pdsch}$ in the slot/sub-slot. According to at least one of the following information, the UE determines the candidate PDSCH receiving position for placing each HARQ-ACK bit in the HARQ-ACK codebook, thereby determining the HARQ-ACK codebook. The present disclosure does not limit the sequence of determining the HARQ-ACK codebook based on the following information, and one or more of them may also be omitted. For example, (1) and (2) can be executed first, then (4) can be executed, and at last (3) can be executed; or (1) and (2) can be executed first, then (3) can be executed, and at last (4) can be executed. For another example, (1) can be executed first, then (3) can be executed, and at last (4) can be executed.

(1) Time Offset Set K.

The time offset set K is determined according to the set of time offsets K1 corresponding to the DCI format of the PDCCH that the UE needs to monitor.

When configuring the PUCCH, the base station may configure a set of K1, which includes Nk1 values, wherein Nk1≥1. If Nk1=0, the set of K1 is determined according to the default set, for example, the default set is {1, 2, 3, 4, 5, 6, 7, 8}. Through a specific bit field in the DCI, such as a PDSCH-to-HARQ_feedback timing indicator field, the base station indicates one or more values in the K1 set. Herein, PDSCH-to-HARQ_feedback timing indicator field and the HARQ-ACK timing information bit field have the same meaning and are used interchangeably. For different DCI formats, the base station can configure different sets of K1.

If the number (Nk1) of K1 corresponding to one value of the PDSCH-to-HARQ_feedback timing indicator field (for example, the field is 3 bits, the value is 0, 1, 2, . . . , 7 respectively) equals to 1, then all the PDSCHs scheduled by the DCI are fed back in one PUCCH.

If the number (Nk1) of K1 corresponding to one value of the PDSCH-to-HARQ_feedback timing indicator field (for example, the field is 3 bits, the value is 0, 1, 2, . . . , 7 respectively) is greater than 1, then the HARQ-ACK of the PDSCHs scheduled by the DCI are fed back in Nk2 PUCCHs respectively, wherein Nk1>Nk2.

Preferably, the set K is the union of the sets of K1 of each DCI format that the UE needs to monitor. For example, the UE needs to monitor the DCI format 1_1 and the DCI format 1_0 of the serving cell c, and the set K is the union of the K1 sets of the two DCI formats.

For an uplink slot/sub-slot n, the set of slots/sub-slots $n_{pdsch}$ where the candidate PDSCH receiving position is located can be determined according to the set K. For example, if set K={0, 2}, then the set of slots/sub-slots $n_{pdsch}$ where the candidate PDSCH receiving position corresponding to uplink slot/sub-slot n is located is slot/sub-slot {n,n−2}.

For an uplink slot/sub-slot n, the set of slots/sub-slots $n_{pdsch}$ where the candidate PDSCH receiving position is located can be determined according to the maximum and minimum values of the set K. For example, if set K={0, 2}, then the set of slots/sub-slots $n_{pdsch}$ where the candidate PDSCH receiving position corresponding to uplink slot/sub-slot n is located is slot/sub-slot {n, n−1,n−2}.

(2) the Time Offset Set K'.

The time offset set K' is a set of time offsets K1 which is determined based on a set of time offsets K1' indicated according to the DCI format and the PDSCH TDRA table T.

According to one implementation, the time offset set K' includes the time offset set K, that is, the set of time offset K1' includes the set of time offset K1; according to another implementation, the time offset set K' does not include the time offset set K, and the set of time offset K1' does not include the set of time offset K1.

Hereinafter, the case that time offset set K' does not include the time offset set K (that is, the set of time offset K1' does not include the set of time offset K1) is described as an example to avoid redundancy, but the embodiment of the disclosure is applicable to the case that the time offset set K' includes the time offset set K (that is, the set of time offset K1' includes the set of time offset K1).

For different DCI formats, the set of K1' may be different. Preferably, the set of K1' is the union of the sets of K1' of each DCI format that the UE needs to monitor. For different DCI, the PDSCH TDRA table T may be different.

For a row in the PDSCH TDRA table T, if Np>0, the K1' corresponding to each PDSCH is determined according to the position where the respective ending symbols of the Np PDSCHs scheduled in the row are located and K1. If multiple K1s may be used for Np PDSCHs, the K1' corresponding to each PDSCH is determined according to the position where the ending symbol of each PDSCH corresponding to each K1 is located. For example, if one DCI schedules Np=8 PDSCHs, which are located in 8 slots respectively, wherein the first 4 PDSCHs correspond to the first K1=2 and the last 4 PDSCHs correspond to the second K1=3. Then, K1' corresponding to PDSCH 1, 2, 3 is 5, 4, 3, and K1' corresponding to PDSCH5, 6, 7 is 6, 5, 4.

Specifically, assume that Np PDSCHs are scheduled in the row, namely $PDSCH_1$. $PDSCH_2$ . . . , $PDSCH_{Np}$ respectively. Assume that the slots/sub-slots where the ending symbols of each PDSCH are located are $n_1, n_2, \ldots, n_{Np}$, each slots/sub-slots may be the same or different. Then, K1' corresponding to each PDSCH is $K1'=K1+n_i-n_{Np}$.

Preferably, if at least one symbol one of a PDSCH is configured as an uplink symbol, for example, according to tdd-UL-DL-ConfigurationCommon, or tdd-UL-DL-ConfigurationDedicated configuration information, it is determined that at least one symbol one of a PDSCH is an uplink symbol, then K1' is not determined according to the PDSCH. For example, if Np=4, wherein for both $PDSCH_2$ and $PDSCH_3$, there is at least one symbol which is an uplink symbol, while both PDSCH, and $PDSCH_4$ are downlink symbols, then the corresponding K1' is calculated only according to $PDSCH_1$.

Figure 5:
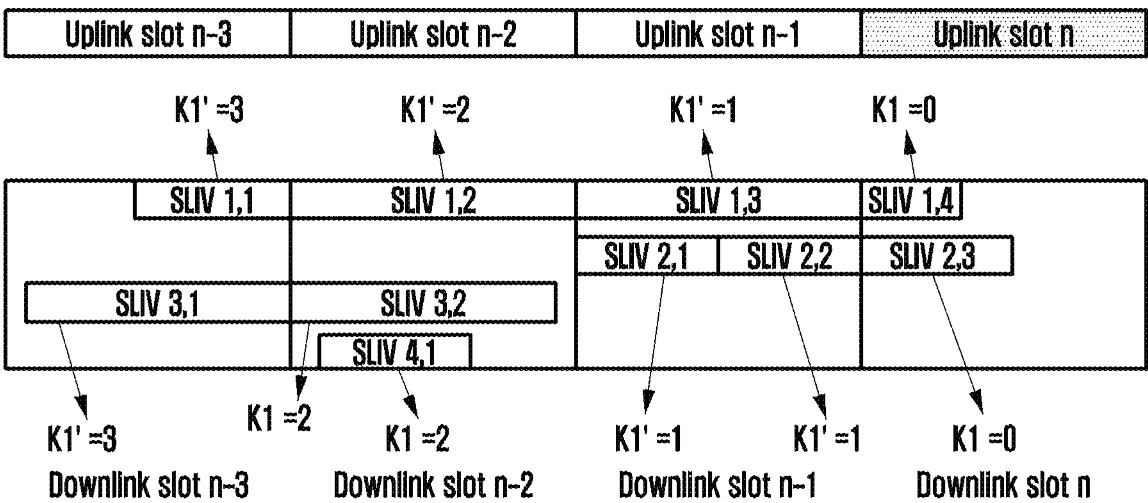
FIG. 5 shows a PDSCH TDRA table T according to an exemplary embodiment of the present disclosure.

FIG. 5 shows a PDSCH TDRA table T according to an exemplary embodiment of the present disclosure. As shown in FIG. 5, assume there are 4 rows in the PDSCH TDRA table T. The SLIV of each PDSCH in Table T is represented as SLIVi,j, wherein i represents the i-th row, and j represents the j-th PDSCH. Wherein, the first row include 4 PDSCHs, the time resource information of each PDSCH is represented by SLIV1,1, SLIV1,2, SLIV1,3, SLIV1,4, respectively; the second row includes 3 PDSCHs, the time resource information of each PDSCH is represented by SLIV2,1, SLIV2,2, SLIV2,3; the third row includes 2 PDSCHs, the time resource information of each PDSCH is represented by SLIV3,1, SLIV3,2; and the fourth row includes 1 PDSCH, time resource information of the PDSCH is represented by SLIV4,1. The K1 set is {0, 2}. When it is determined that the HARQ-ACK information is fed back in the uplink slot n, the slot n and the slot n−2 are determined according to K1. The K1' corresponding to each PDSCH in each row is determined according to the position of the ending symbol of the last PDSCH in each row in the table T being in slot n and slot n−2, respectively. Specifically, in the first row, K1 of the last PDSCH (SLIV1, 4) equals to 0 (corresponding to slot n), then K1' of the first, second, and third PDSCHs are K1'=1, 2, 3, respectively; in the second rows, K1 of the last PDSCH (SLIV2, 3) equals to 0 (corresponding to slot n), then K1' of the first and second PDSCHs are K1'=1, 1, respectively; and in the third row, the K1 of last PDSCH (SLIV3, 2) equals to 2 (corresponding to slot n−2), then K1' of the first PDSCH is K1'=3. Then, the set of K1' is {2, 3}. As mentioned above, the embodiment is for the case that the set K' does not include the set K (that is, the set of the time offset K1' does not include the set of the time offset K1), so for example, the first row of the set of K1' is {1,2,3}, which does not include K1=0. For the case where the set K' includes the set K (that is, the set of the time offset K1' includes the set of the time offset K1), for example, the first row of the set of K1' is {0, 1, 2, 3} accordingly, which includes 0.

For an uplink slot/sub-slot n, the set of slots/sub-slots n . . . where the candidate PDSCH receiving position is located can be determined according to the set K'. For example, if set K'={1, 2, 3}, then the set of slots/sub-slots $n_{pdsch}$ where the candidate PDSCH receiving position corresponding to uplink slot/sub-slot n is located is slot/sub-slot {n−1, n−2, n−3}. Or, if set K'={1, 3}, then the set of slots/sub-slots $n_{pdsch}$ where the candidate PDSCH receiving position corresponding to uplink slot/sub-slot n is located is slot/sub-slot {n−1, n−3}.

For an uplink slot/sub-slot n, the set of slots/sub-slots $n_{pdsch}$ where the candidate PDSCH receiving position is located can be determined according to the maximum and minimum values of the set K'. For example, if set K'={1, 3}, then the set of slots/sub-slots $n_{pdsch}$ where the candidate PDSCH receiving position corresponding to uplink slot/sub-slot n is located is slot/sub-slot {n−1, n−2, n−3}.

For an uplink slot/sub-slot n, the set of slots/sub-slots $n_{pdsch}$ where the candidate PDSCH receiving position is located can be determined according to the set K' and the set K. For example, if set K'={1, 2, 3}, set K={0, 2}, then the set of slots/sub-slots $n_{pdsch}$ where the candidate PDSCH receiving position corresponding to the uplink slot/sub-slot n is located is slot/sub-slot {n,n−1,n−2,n−3}. Or, if set K'={2,3}, set K={0,2}, then the set of slots/sub-slots $n_{pdsch}$ where the candidate PDSCH receiving position corresponding to the uplink slot/sub-slot n is located is the slot/sub-slot {n,n−2,n−3}. As mentioned above, the embodiment is for the case that the set K' does not include the set K, so the UE determines the set of slots/sub-slots $n_{pdsch}$ where the candidate PDSCH receiving position is located according to the set K' and the set K. For the case where the set K' includes the set K, that is, the set K'={0, 1, 2, 3}, then the UE can determine the set of slots/sub-slots $n_{pdsch}$ where the candidate PDSCH receiving position is located according to the set K'.

For an uplink slot/sub-slot n, the set of slots/sub-slots $n_{pdsch}$ where the candidate PDSCH receiving position is located can be determined according to the maximum and/or minimum values of the set K' and the set K. For example, if set K'={2,3} and set K={0,2}, then the set of slots/sub-slots $n_{pdsch}$ where the candidate PDSCH receiving position corresponding to the uplink slot/sub-slot n is located is the slot/sub-slot {n, n−1, n−2, n−3}.

Preferably, when the uplink subcarrier spacing and the downlink subcarrier spacing are different, or when the PUCCH transmission is based on the uplink sub-slot and PDSCH transmission is based on downlink slot, the set of slots/sub-slots $n_{pdsch}$ where the candidate PDSCH receiving position is located is determined according to the set K' and the set K, and according to the relationship between the length of the uplink time unit (uplink slot or sub-slot) for transmitting PUCCH and the length of the downlink time unit for receiving the PDSCH. For example, if the uplink subcarrier spacing SCS=15 KHz and the downlink subcarrier spacing SCS=30 KHz, then one uplink slot includes 2 downlink slots. If set K'={2,3}, and set K={0,2}, then the set of the slots/sub-slots $n_{pdsch}$ where the candidate PDSCH receiving position corresponding to uplink slot n is located is 2 downlink slots included in uplink slot n, 2 downlink slots included in uplink slot n−1, 2 downlink slots included in uplink slot n−2, 2 downlink slots corresponding to uplink slot n−3, that is, a total of 8 downlink slots.

(3) Set of PDSCH TDRA Table T

In a slot/sub-slot $n_{pdsch}$ where the candidate PDSCH receiving position is located, the candidate PDSCH receiving position $M_{pdsch}$ can be determined according to the valid SLIV in the PDSCH TDRA table T in the slot/sub-slot.

In the set of slots/sub-slots $n_{pdsch}$ where the candidate PDSCH receiving position is located, the candidate PDSCH receiving position Mpdsch can be determined according to the valid SLIV in the PDSCH TDRA table T in the set.

A valid SLIV can be determined according to at least one of the following methods:

(3.1) According to the PDCCH monitoring occasion/PDCCH candidate position and the parameter K0 in the PDSCH TDRA table T, it is determined whether the SLIV is valid. Specifically, the slot $n_{pdsch}$ is determined according to the parameter K0 in the PDSCH TDRA table T, and the slot/sub-slot where the starting symbol of the first PDSCH in the i-th row of the PDSCH TDRA table T is located. According to the configuration of the PDCCH search space, it is determined whether there is at least one candidate position available for the PDCCH in the slot $n_{pdsch}$. Preferably, according to the configuration of the PDCCH search space and the TDD uplink and downlink configuration, it is determined whether there is at least one candidate position available for the PDCCH in the slot $n_{pdsch}$. If there is no such PDCCH candidate position, it is determined that all the SLIVs in the i-th row of the PDSCH TDRA table T are invalid, or it is determined that the i-th row can be deleted from the PDSCH TDRA table T, otherwise, it is determined that the SLIV in the i-th row of the PDSCH TDRA table T is valid. In the disclosure, the invalidation of SLIV and the deletion of SLIV from PDSCH TDRA can be used interchangeably. The candidate position available for the PDCCH refers to that each symbol of the candidate position of the PDCCH is a downlink symbol or a flexible symbol. Whether the symbol is a downlink symbol or a flexible symbol can be determined according to tdd-UL-DL-ConfigurationCommon or tdd-UL-DL-ConfigurationDedicated. If the base station is not configured with tdd-UL-DL-ConfigurationCommon or tdd-UL-DL-ConfigurationDedicated, the symbols can be treated as flexible symbols. For example, for the HARQ-ACK feedback of one uplink slot/sub-slot n, for the i-th row in the PDSCH TDRA table T, the last PDSCH is located in slot n-K and the starting symbol of the first PDSCH is located in slot n-K-L, then it is determined whether there is a valid candidate position of PDCCH in the slot $n_{pdsch}$=n−K−L−K0, wherein, K0 is the K0 applicable to the first PDSCH indicated in the i-th row in the PDSCH TDRA table T. When determining whether there is a valid candidate position of PDCCH in the slot $n_{pdsch}$, the group of PDSCHs can be scheduled according to the parameter K0. If there is a valid candidate position of PDCCH, it is determined that the SLIV of the row is invalid. For example, the i-th row in the PDSCH TDRA table T is deleted when the candidate PDSCH receiving position is calculated. Taking the second row in the PDSCH TDRA table T in FIG. 4 as example, the starting point of the first PDSCH is in the slot n−1, assuming K0=2, then the slot $n_{pdsch}$=n−3. If the base station configures the PDCCH monitoring occasion of the DCI corresponding to the PDSCH TDRA table in slot n−3, and the monitoring occasion includes at least one PDCCH candidate position which does not include uplink symbol or in which each symbol is downlink symbol or flexible symbol, the second row of the PDSCH TDRA table T is retained to determine the candidate PDSCH receiving position; otherwise, the second row of the PDSCH TDRA table T is deleted.

Preferably, the method is applicable to rows including Np>1, but not applicable to rows including Np=1.

(3.2) Preferably, the method is suitable for scenarios where SPS PDSCH is not configured. For example, for a downlink carrier, or for a downlink BWP, if the base station does not configure SPS PDSCH, then the candidate PDSCH receiving position/candidate PDSCH receiving position unit for the downlink carrier or downlink BWP can be determined according to the method (3.1). For a downlink carrier, or for a downlink BWP, if the base station configures SPS PDSCH, then the candidate PDSCH receiving position/candidate PDSCH receiving position unit for the downlink carrier or downlink BWP is determined not according to the method (3.1). It is determined whether the SLIV is valid according to multiple PDSCHs or a single PDSCH. It can be determined according to at least one of the following methods:

(3.2.1): When determining the candidate PDSCH receiving position in the current slot/sub-slot, the SLIV of each PDSCH is regarded as a candidate for the valid SLIV and constitutes a set of valid SLIV. When determining the candidate PDSCH receiving position in each slot/sub-slot, the same set of valid SLIVs is used. FIG. 6 shows a PDSCH TDRA table T according to an exemplary embodiment of the present disclosure. As shown in FIG. 6, assume that the PDSCH TDRA table T includes 3 rows, the first row includes 4 PDSCHs, and the SLIV is SLIV1,1, SLIV1,2, SLIV1,3, SLIV1,4, respectively; the second row includes 2 PDSCHs, and the SLIV is SLIV2,1, SLIV2,2, respectively; the third row includes 1 PDSCH, and the SLIV is SLIV3. Table T includes a total of 7 SLIVs. For the convenience of description, SLIVi,j(k) is used to represent the SLIV of each possible PDSCH in the figure, and k is used to distinguish the sequence of the starting point of the first PDSCH in the row where the SLIVi,j is located. For example, for the same i, j, it means that the larger the value of k, the larger the number of the slot index where the starting point is located. Then, when calculating the candidate PDSCH receiving position in the downlink slot $n_{pdsch}$ (slot n~n−5) of any candidate PDSCH receiving position, 7 SLIVs, that is, SLIV1,1, SLIV1,2, SLIV1,3 SLIV1,4, SLIV2,1, SLIV2,2 and SLIV3, need to be considered regardless of the value of k.

(3.2.2): When determining the candidate PDSCH receiving position in the current slot/sub-slot, only the SLIV of the last PDSCH of each row in the PDSCH TDRA table T is regarded as a valid SLIV candidate, and other SLIVs are determined as in-validation/deletion. FIG. 7 shows a PDSCH TDRA table T according to an exemplary embodiment of the present disclosure. FIG. 7 gives one example which is in combination of 3.2.1. Assume that the PDSCH TDRA table T includes 3 rows, the first row includes 4 PDSCHs, and the SLIV is SLIV1,1, SLIV1,2, SLIV1,3, SLIV1,4, respectively; the second row includes 2 PDSCHs, and the SLIV is SLIV2,1, SLIV2,2, respectively; the third row includes 1 PDSCH, and the SLIV is SLIV3. Table T includes a total of 7 SLIVs. For the convenience of description, SLIVi,j(k) is used to represent the SLIV of each possible PDSCH in the figure, and k is used to distinguish the sequence of the starting point of the first PDSCH in the row where the SLIVi,j is located. For example, for the same i, j, it means that the larger the value of k, the larger the number of the slot index where the starting point is located. Then, when calculating the candidate PDSCH receiving position in the downlink slot $n_{pdsch}$=n of the candidate PDSCH receiving position, only the SLIV 1, 4 of the last PDSCH in the first row, the SLIV 2, 2 of the last PDSCH in the second row and the SLIV3 of the last PDSCH in the third row are considered; when calculating the candidate PDSCH receiving position in the downlink slot $n_{pdsch}$=n−2 of the candidate PDSCH receiving position, only the SLIV 1, 4 of the last PDSCH in the first row, the SLIV 2, 2 of the last PDSCH in the second row and the SLIV3 of the last PDSCH in the third row are considered.

Preferably, when calculating the candidate PDSCH receiving position in the current slot/sub-slot, the candidate position of the valid SLIV is determined according to the SLIV and the K0 corresponding to each SLIV.

Preferably, when calculating the candidate PDSCH receiving position in the current slot/sub-slot, the candidate position of the valid SLIV is determined according to the SLIV, the K0 corresponding to each SLIV, and the PDCCH monitoring occasion/PDCCH candidate position.

(3.3) Whether the SLIV is valid is determined according to: in a row of the PDSCH TDRA table T where the SLIV is located, whether the slot/sub-slot where the last PDSCH ending symbol is located is in the set of the slot/sub-slot $n_{pdsch}$ where the candidate PDSCH receiving position determined according to the set K. Equivalently, whether the SLIV is valid is determined according to: in a row of the PDSCH TDRA table T where the SLIV is located, whether the slot/sub-slot where the last PDSCH ending symbol is located is in the set of the uplink slot/sub-slot $n_{pdsch}$ determined according to the set K, where $n_{pdsch}$=n−K1.

(3.4) If the HARQ-ACK of the PDSCH corresponding to the row where the SLIV is located may be fed back in the uplink slot/sub-slot n, that is, the slot/sub-slot where the ending symbol of the last PDSCH corresponding to the row (where the SLIV is located) is located is in the set of the slot/sub-slot $n_{pdsch}$ of the candidate PDSCH receiving position determined according to uplink slot/sub-slot n and set K, then the SLIV is valid; otherwise, the SLIV of all PDSCHs corresponding to the row where the SLIV is located is invalid.

Figure 8:
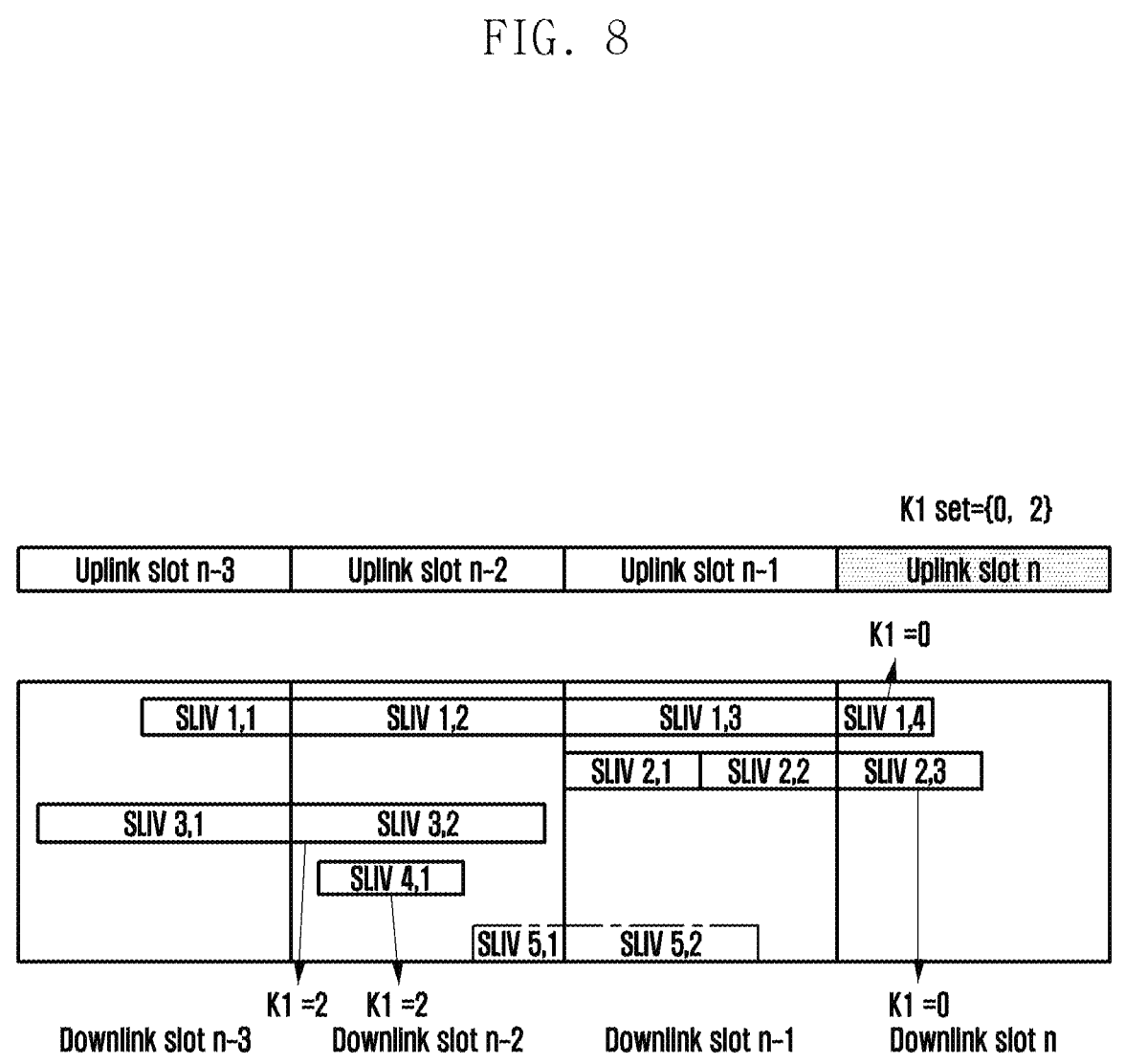

For example, for an uplink slot n, K1={0, 2}, the set of slot $n_{pdsch}$ of the candidate PDSCH receiving position determined according to the K1 set is slots n and n−2, the index of the slot where the ending symbol of the last PDSCH in the i-th row of the PDSCH TDRA table T is located is n−1; then, the HARQ-ACK of all PDSCHs in the row cannot be fed back in the uplink slot/sub-slot n. Therefore, even if there is one PDSCH in the i-th row of the table T which is located in slot n−2, when calculating the candidate PDSCH receiving position $M_{pdsch}$ in slot n−2, the SLIV of the PDSCH is considered as invalid. FIG. 8 shows a PDSCH TDRA table T according to an exemplary embodiment of the present disclosure. As shown in FIG. 8, the set of slots $n_{pdsch}$ of the candidate PDSCH receiving positions are slots n and n−2, the fifth row of Table T includes 2 PDSCHs, the time resource information of each PDSCH is represented by SLIV5, 1, SLIV5, 2 respectively. When calculating the candidate PDSCH receiving position in slot n−2 of the candidate PDSCH receiving position, the SLIV in the 5th row is invalid because SLIV5,2 is not located in slot n or slot n−2.

(3.5) whether the SLIV is valid is determined according to the uplink and downlink configuration, for example, tdd-UL-DL-ConfigurationCommon, or tdd-UL-DL-ConfigurationDedicated. For example, among the Np SLIVs of the i-th row in the PDSCH TDRA table T, if there is at least one symbol which is configured uplink symbol in each SLIV, then the i-th row in the PDSCH TDRA table T is deleted, that is, the each SLIV in the i-th row is invalid. Or, among the Np SLIVs in the i-th row, if there is at least one symbol which is configured uplink symbol in the j-th SLIV, then the j-th SLIV in the i-th row in the PDSCH TDRA table T is deleted, that is, the j-th SLIV in the i-th row is invalid and the other SLIVs are valid.

According to one implementation manner, when whether the SLIV is valid is determined jointly according to a plurality of conditions, the SLIV is valid if the determination result for each condition is valid, otherwise, the SLIV is invalid.

For example, in combination with conditions (3.2), (3.3) and (3.4), in each slot $n_{pdsch}$ of the candidate PDSCH receiving position, the following SLIV is determined as valid SLIV: for which all the symbol in the PDSCH TDRA table T are configured downlink symbols and/or flexible symbols, and the slot/sub-slot where the ending symbol of the last PDSCH is located is in the set of the slot/sub-slot $n_{pdsch}$ where the candidate PDSCH receiving position is located determined according to the set K. FIG. 9 shows a PDSCH TDRA table T according to an exemplary embodiment of the present disclosure. As shown in FIG. 9, K1 set={0, 2}, and the set of the slots $n_{pdsch}$ of the candidate PDSCH receiving positions determined according to the K1 set are slots n and n−2. The TDRA table T includes 3 rows, the first row includes 4 PDSCHs, and the SLIV is SLIV1,1, SLIV1,2, SLIV1,3, SLIV1,4, respectively; the second row includes 2 PDSCHs, and the SLIV is SLIV2,1, SLIV2, 2, respectively; the third row includes 1 PDSCH, and the SLIV is SLIV3. For the convenience of description, SLIVi,j(k) is used to represent the SLIV of each possible PDSCH in the figure, and k is used to distinguish the sequence of the starting point of the first PDSCH in the row where the SLIVi,j is located. For example, for the same i, j, it means that the larger the value of k, the larger the number of the slot index where the starting point is located. It can be seen from the figure that in one slot, for example, slot n−2, SLIVs of different PDSCHs in the same row may be present. Moreover, in one slot, although there are multiple possible SLIVs, only some SLIVs are valid. For example, in slot n−3, there are 7 SLIVs in total, that is SLIV1,4(3), SLIV1,3(4), SLIV1, 2(5), SLIV1,1(6), SLIV2,2(3), SLIV2,1(4), SLIV3(3) respectively, but only the ending symbols of the last PDSCH in the row where SLIV1,3(4) and SLIV2,1 (4) is located, that is, the ending symbol of SLIV1,4(4) and SLIV2,2(4) are in slot n−2. Assume that the last 4 symbols in slot n−4 are uplink symbols, the last symbol in slot n is uplink symbols, and other slots and symbols are downlink symbols. Then, among the symbols of SLIV1,2(4) and SLIV3(6), SLIV1,2 (4) and SLIV3(6) in which at least one symbol is the configured uplink symbol are invalid SLIV. The slot $n_{pdsch}$ set of the candidate PDSCH receiving position determined according to the union of the sets of K1 and K1' is slot n−5 to slot n. Then, in slot n−5, the valid SLIV is SLIV1,1; in slot n−3, the valid SLIV is SLIV1,1, SLIV1,3, and SLIV2,1; in slot n−2, the valid SLIV is SLIV1,2, SLIV1,4, SLIV2,2, and SLIV3; in slot n−1, the valid SLIV is SLIV1,3 and SLIV2,1; and in slot n, the valid SLIV is SLIV1,4 and SLIV2,2. In the figure, all valid SLIVs are represented by solid-line boxes.

Figure 10:
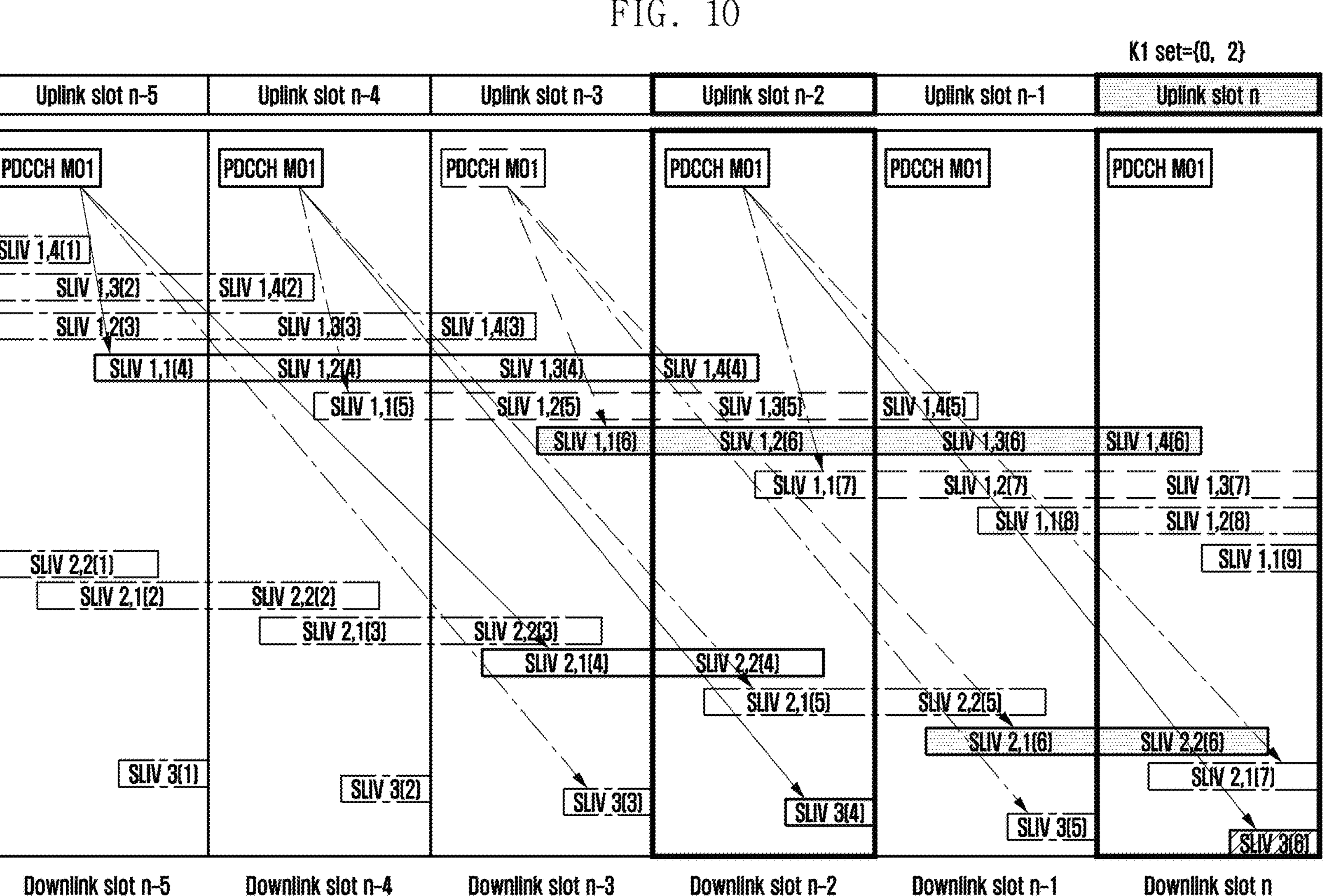
FIG. 10 shows a PDSCH TDRA table T according to an exemplary embodiment of the present disclosure.

For another example, in combination with the conditions (3.1) (3.2) (3.3) and (3.4), in each slot $n_{pdsch}$ of the candidate PDSCH receiving position, the following SLIV is determined as valid SLIV: for which all the symbol in the PDSCH TDRA table T are configured downlink symbols and/or flexible symbols, and the slot/sub-slot where the ending symbol of the last PDSCH is located is in the set of the slot/sub-slot $n_{pdsch}$ where the candidate PDSCH receiving position is located determined according to the set K, and the slot/sub-slot $n_{pdsch}$ determined according to K0 in Table T includes at least one valid PDCCH candidate position. FIG. 10 shows a PDSCH TDRA table T according to an exemplary embodiment of the present disclosure. As shown in FIG. 10, assume K1={0,2}, the PDSCH TDRA table T includes 3 rows, the first row includes 4 PDSCHs, and the SLIVs are SLIV1,1, SLIV1,2, SLIV1,3 SLIV1,4, respectively, and K0=0; the second row includes 2 PDSCHs, SLIVs are SLIV2,1, SLIV2,2, respectively, and K0=2; and the third row includes 1 PDSCH, SLIV is SLIV3, and K0=2. According to (3.2) and (3.3), in slot n−5, the valid SLIV is SLIV1,1; in slot n−4, the valid SLIV is SLIV1,2; and in slot n−3, the valid SLIV are SLIV1,1, SLIV1,3 and SLIV2,1; in slot n−2, the valid SLIVs are SLIV1,2, SLIV1,4, SLIV2,2, and SLIV3; in slot n−1, the valid SLIVs are SLIV1,3 and SLIV2, 1; and in slot n, the valid SLIVs are SLIV1, 4, SLIV2, 2 and SLIV3. In the figure, it is represented by a solid line box. In combination of (3.4), assume that the last symbol of slot n is an uplink symbol, and other slots and symbols are downlink symbols. Therefore, in slot n, SLIV3 is invalid SLIV, which is represented by the solid line box with the diagonal stripe pattern in the figure. In combination with (3.1), in the above valid SLIVs, the slot $n_{pdsch}$ is determined according to the SLIV of the first PDSCH and the K0 corresponding to the SLIV; and whether the valid SLIV is valid is determined according to whether there is a candidate PDCHC position in the slot $n_{pdsch}$. According to the slot where the starting points of SLIV1,1(4), SLIV2,1(4) and SLIV3(3) is located as well as K0=0, K0=2, the slot $n_{pdsch}$=n−5 is found; according to the slot where the starting point of SLIV3(4) is located as well as K0=2, the slot $n_{pdsch}$=n−4 is found; and according to the slot where the starting points of SLIV1,1(6) and SLIV2,1(6) is located as well as K0=0, K0=2, the slot $n_{pdsch}$=n−3 is found. Assuming that the PDCCH candidate position in slot n−3 includes an uplink symbol, there is no valid PDCCH candidate position in the slot. Therefore, the SLIVs of all PDSCHs in the rows where SLIV1,1(6) and SLIV2,1(6) corresponding to the PDCCH candidate position are located are invalid, that is, SLIV1,1(6)~SLIV1,4(6) and SLIV2,1(6)~SLIV2,2(6) are all invalid, and are represented by a solid line boxes with dots pattern in the figure. Then, in combination with (3.1), (3.2), (3.3) and (3.4), the SLIVs determined as valid are: in slot n−5, the valid SLIV is SLIV1,1; in slot n−4, the valid SLIV is SLIV1, 2; in slot n−3, the valid SLIVs are SLIV1,3 and SLIV2,1; and in slot n−2, the valid SLIVs are SLIV1,4, SLIV2,2, and SLIV3.

(4) Whether Each SLIV Overlaps

According to the pre-defined rules, rows or SLIVs with overlapped time resources in the PDSCH TDRA table T can to reduce HARQ-ACK feedback overhead. If one UE cannot simultaneously receive more than 1 PDSCH that needs to feed back HARQ-ACK in the same HARQ-ACK codebook or HARQ-ACK sub-codebook on the same time resource, the method can effectively reduce HARQ-ACK feedback overhead. For example, the total number of candidate PDSCH receiving positions of HARQ-ACK in a slot/sub-slot $n_{pdsch}$ that needs to be mapped is denoted as $M_{pdsch}$, 1) Initializing the candidate PDSCH receiving position count h to 0;
2) For the current TDRA table T, determining the minimum index value of the ending OFDM symbol of each PDSCH in each row, denoted as E;
3) For a row of the current TDRA table T, the starting OFDM symbol position of the PDSCH in the row is S, and S≤E then the PDSCH is mapped to the candidate PDSCH receiving position h; remove the SLIV in the row of the current TDRA table T; repeatedly executing 3) until all the elements of TDRA table T which satisfied S≤E are processed;
4) h=h+1. If the current TDRA table T is not empty, go to 2); otherwise, $M_{pdsch}$=h, the process ends.

Figure 11:
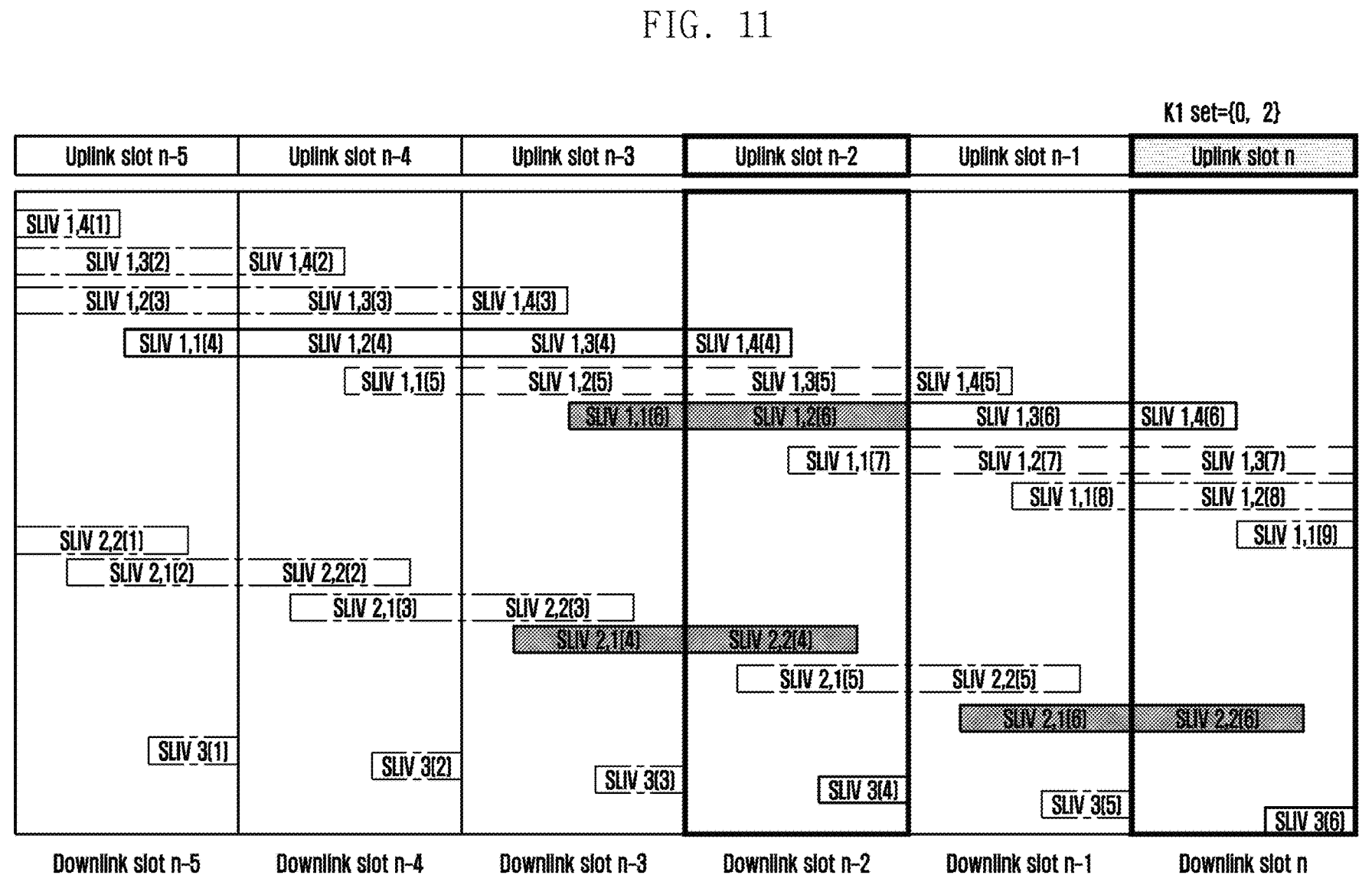

FIG. 11 shows a PDSCH TDRA table T according to an exemplary embodiment of the present disclosure. As shown in FIG. 11, the valid SLIVs are represented by a solid line boxes, the non-overlapping valid SLIVs used to determine the candidate PDSCH receiving position are represented by solid line boxes with a white background without filling, and the overlapping valid SLIVs are represented by solid line boxes filled with gray-scale. For example, in slot n−3, one candidate PDSCH receiving position is determined according to SLIV1,3(4), SLIV1,1(6) and SLIV2,1(4) overlap with SLIV1,3(4), so the three PDSCHs all correspond to the same candidate PDSCH receiving position. In slot n−2, two candidate PDSCH receiving positions are determined according to SLIV1, 4(4) and SLIV3(4) respectively, and the two SLIVs do not overlap. SLIV1,2(6) and SLIV2,2(4) overlap with SLIV1,4(4), and the three PDSCHs all correspond to the same candidate PDSCH receiving position, that is, the position of SLIV1,4(4).

FIG. 12 shows a PDSCH TDRA table T according to an exemplary embodiment of the present disclosure. As shown in FIG. 12, the valid SLIVs obtained according to (3.1)~(3.4) are represented by solid line boxes with a white background without filling and solid line boxes filled with gray-scale. The method of obtaining valid SLIV according to (3.1)~(3.4) has been described in conjunction with FIG. 10, and will not be repeated here. And according to the method described above, the valid SLIV that overlaps and the valid SLIV that does not overlap are found. The non-overlapping valid SLIV used to determine the receiving position of the candidate PDSCH is represented by a solid line box with white background, and the overlapping valid SLIV is represented by a solid line frame with black background. For example, in slot n−3, one candidate PDSCH receiving position is determined according to SLIV1,3(4), SLIV2,1(4) and SLIV1,3(4) overlap, so the two PDSCHs correspond to the same candidate PDSCH receiving position. In slot n−2, two candidate PDSCH receiving positions are determined according to SLIV1, 4(4) and SLIV3(4) respectively, and the two SLIVs do not overlap. SLIV2,2(4) overlaps with SLIV1,4(4), and the two PDSCHs correspond to the same candidate PDSCH receiving position, that is, the position of SLIV1,4(4).

According to one implementation, for the i-th row in the PDSCH TDRA table T, if Np>0, the SLIVs according to the Np PDSCHs are used to determine the candidate PDSCH receiving positions, respectively. Taking FIG. 5 as an example, the first row of the TDRA table T used to determine the receiving position of the candidate PDSCH includes SLIV1,1~1,4, the second row includes SLIV 2,1~2,3, the third row includes SLIV3,1~3,2, and the fourth row includes SLIV4,1. That is, they are processed separately as 10 SLIVs. For another example, in FIG. 13, K1=0, 2, and the set of slot $n_{pdsch}$ is determined according to the set K and the set K', which are slot n and slot n−5 to slot n. In each slot, it is separately determined whether each SLIV in one slot overlaps. In order to distinguish the SLIVri of different starting points, the different values of k of $SLIV_{ri}(k)$ are used for indication in the figure. In slot n−5, the valid SLIV is SLIV1,1(1); in slot n−4, the valid SLIV is SLIV1,2(1); in slot n−3, the valid SLIV is SLIV1,3(1), and SLIV1,3(1), SLIV1,1(2) and SLIV2,1(1) all correspond to the same SLIV; in slot n−2, the valid SLIV is SLIV1,4(1) and SLIV3(1), and SLIV1,4(1), SLIV1,2(2) and SLIV2,2(1) all correspond to the same SLIV, while SLIV3(1) corresponds to another SLIV. In slot n−1, the valid SLIV is SLIV1,3(2), and both SLIV1,3(2) and SLIV2,1(2) correspond to SLIV1, 3(2); and in slot n, the valid SLIV is SLIV1,4(2) and SLIV3(2), and both SLIV1,4(2) and SLIV2,2(2) correspond to the same SLIV, while SLIV3(2) corresponds to another SLIV. For another example, in FIG. 13, K1=0, 2, and the set of slot $n_{pdsch}$ is determined according to the set K, which is slot n and slot n−2. In slot n−2, the valid SLIV is SLIV1,4(1) and SLIV3(1), and SLIV1,4(1), SLIV1,2(2) and SLIV2,2(1) all correspond to the same SLIV, while SLIV3(1) corresponds to another SLIV. In slot n, the valid SLIV is SLIV1,4(2) and SLIV3(2), and both SLIV1,4(2) and SLIV2, 2(2) correspond to the same SLIV, while SLIV3(2) corresponds to another SLIV. According to another implementation, for the i-th row in the PDSCH TDRA table T, if Np>0, the number of PDSCHs located in a slot/sub-slot is Nps, then SLIVs of Nps PDSCHs in a slot/sub-slot are collectively used as a whole, to determine the candidate PDSCH receiving position in the slot/sub-slot. Taking FIG. 5 as an example, the first row of the TDRA table T used to determine the candidate PDSCH receiving position corresponds to 4 SLIVs, that is, SLIV1 to SLIV4, which correspond to SLIV1,1~1,4, respectively. The second row corresponds to two SLIVs, that is, SLIV5 and SLIV6; SLIV2,1 and SLIV 2,2 are connected to form SLIV5, and SLIV6 corresponds to SLIV2,3. The third row corresponds to two SLIVs, that is, SLIV7 and SLIV8, which correspond to SLIV3,1, SLIV3,2, respectively. The fourth row corresponds to the SLIV, that is, SLIV9, which corresponds to SLIV4,1. That is, it is processed according to 9 independent SLIV1-SLIV9.

According to another implementation, for the i-th row in the PDSCH TDRA table T, if Np>0, the SLIVs of Np PDSCHs are collectively used as one $SLIV_{ri}$ to determine the candidate PDSCH receiving position. In the set of the slot/sub-slot $n_{pdsch}$ of the candidate PDSCH receiving position, there may be multiple SLIVri, and the starting point of each SLIVri is in a different slot. FIG. 13 shows a PDSCH TDRA table T according to an exemplary embodiment of the present disclosure. For example, as shown in FIG. 13, the set of slot $n_{pdsch}$ of the candidate PDSCH receiving position corresponding to the HARQ-ACK feedback of the uplink slot n is slot n−5 to slot n. In order to distinguish the $SLIV_{ri}$ of different starting points, the different values of k of $SLIV_{ri}(k)$ are used for indication in the figure. In step 2), the TDRA table T includes the SLIVri(k) in the same row with different start/ending positions determined according to the K1 and the PDSCH TDRA table T. In slot n−5~slot n, the SLIVri(k) corresponding to the PDSCH that may feed back HARQ-ACK in uplink slot n are SLIV1(1), SLIV1(2), SLIV2(1), SLIV2(2)), SLIV3(1), SLIV3(2) respectively. When determining whether each SLIV overlaps, if $SLIV_{r1}$ (k1) and $SLIV_{r2}$(k2) overlap/partially overlap, the candidate PDSCH receiving position unit is determined according to $SLIV_{r1}$(k1). All SLIVs of $SLIV_{r2}$(k2) are deleted that is, SLIVr2, j(k2), j−1,2, . . . Np are deleted, and no longer participate in the determination of candidate PDSCH receiving position units. $SLIV_{r1}$(k1) and $SLIV_{r2}$(k2) correspond to the same candidate PDSCH receiving position unit.

Taking FIG. 13 as an example, if $SLIV_{ri}$(k1) is SLIV1(1) and $SLIV_{ri}$(k2) is SLIV2(2), since $SLIV_1$(1) and $SLIV_1$(2) partially overlap, the candidate PDSCH receiving position unit is determined according to $SLIV_1$(1), all SLIVs of $SLIV_1$(2) are deleted. In the same way, all SLIVs of $SLIV_2$ (1) are deleted.

For example, for the i-th row in the PDSCH TDRA table T, if Np>0, the SLIVs of Np PDSCHs are taken as a whole SLIVri to determine the candidate PDSCH receiving position. The set of slots $n_{pdsch}$ of candidate PDSCH receiving position is determined according to set K and set K'. In the set, whether each $SLIV_{ri}$(k) overlaps is determined, the valid SLIV that does not overlap in the set is determined, and thus the corresponding candidate PDSCH receiving position unit is determined, wherein the candidate PDSCH receiving position unit includes one or more candidate PDSCH receiving positions. Taking FIG. 13 as an example, the set K is K1={0,2}, the set K' is K1'={1,2,3,4,5}, and the set of slot $n_{pdsch}$ is slot n−5-slot n. The PDSCH TDRA table T includes 3 rows, that is, SLIV1, SLIV2, and SLIV3, respectively. According to K1=2, three SLIVs the ending symbol of which is located slot n−2 are determined: $SLIV_1$(1), $SLIV_2$ (1), $SLIV_3$(1); and according to K1=0, three SLIVs the ending symbol of which is located slot n are determined: $SLIV_1$(2), $SLIV_2$(2), $SLIV_3$(2), the 6 SLIVs consist of the TDRA table T, and then it is determined whether there are overlapping SLIVs. According to step 2), in table T, the minimum index value of the ending OFDM symbol of each $SLIV_{ri}$(k) in each row is determined, denoted as E; in step 3), for a row in the current TDRA table T, the starting OFDM symbol position of PDSCH in that row position is denoted as S, and S≤E, then the PDSCH is mapped to the candidate PDSCH receiving position h; remove the SLIV in the row of the current TDRA table T; repeatedly executing 3) until all the elements of TDRA table T which satisfied S E are processed; wherein, S and E may be located in different slots in the set of slots $n_{pdsch}$; in step 4), h=h+1. If the current TDRA table T is not empty, go to 2); otherwise, $M_{pdsch}$=h, the process ends.

On one carrier, if the UE receives at most 1 PDSCH in a slot/sub-slot, or at most 1 PDSCH that feeds back HARQ-ACK in the same HARQ-ACK codebook or HARQ-ACK sub-codebook, the step of determining whether each SLIV overlaps can be converted into determining whether each SLIV in the set of slot/sub-slot $n_{pdsch}$ where the candidate PDSCH receiving position is located overlaps in the slot or sub-slot. If there is overlap, the corresponding candidate PDSCH receiving position unit is determined only according to the slot where one valid SLIV is located. For example, the corresponding candidate PDSCH receiving position unit is determined according to the $SLIV_{ri}$(k) with the smallest slot index where the ending symbol is located in each $SLIV_{ri}$(k) being used as the valid SLIV. The number of candidate PDSCH receiving position units is determined according to the number of PDSCHs corresponding to the valid SLIV, or the number of slots/sub-slots occupied by the valid SLIV. Taking FIG. 13 as an example, the set of slot/sub-slot $n_{pdsch}$ where the candidate PDSCH receiving position is located is downlink slot n−5 to downlink slot n. Among them, $SLIV_1$(1), $SLIV_1$(2), $SLIV_2$(1) and $SLIV_3$(1) overlap in slot n−3 and/or slot n−2, $SLIV_1$(1) with the earliest ending position is retained as valid SLIV, while $SLIV_1$(2), $SLIV_2$(1) and $SLIV_3$ (1) are deleted. $SLIV_2$(2) and $SLIV_3$(2) overlap in slot n−1 and/or slot n, $SLIV_2$(2) with the earliest ending position is retained as a valid SLIV, while $SLIV_3$(2) is deleted. And, according to the slot n−5 to slot n where $SLIV_1$(1) and $SLIV_2$(2) are located, 6 candidate PDSCH receiving position units are determined respectively. In each receiving position unit, HARQ-ACK bit corresponding to one PDSCH is generated respectively. Or, the corresponding candidate PDSCH receiving position unit is determined according to the $SLIV_{ri}$(k) with the smallest slot index where the ending symbol is located and with largest number of corresponding slot/sub-slot in each $SLIV_{ri}$ (k) being used as the valid SLIV. Or, the corresponding candidate PDSCH receiving position unit is determined according to the $SLIV_{ri}(k)$ with the smallest slot index where the ending symbol is located and with largest number of corresponding PDSCH in each $SLIV_{ri}(k)$ being used as the valid SLIV. The number of candidate PDSCH receiving position units is determined according to the number of PDSCHs corresponding to the valid SLIV, or the number of slots/sub-slots corresponding to the valid SLIV. Taking FIG. 13 as an example, the set of slot/sub-slot $n_{pdsch}$ where the candidate PDSCH receiving position is located is downlink slot n−5 to downlink slot n. Among them, $SLIV_1(1)$, $SLIV_1(2)$, $SLIV_2(1)$ and $SLIV_3(1)$ overlap in slot n−3 and/or slot n−2. The slot index (n−2) where the ending symbols of $SLIV_1(1)$ and $SLIV_2(1)$ are located is smaller than the slot index (n) where the ending symbols of $SLIV_1(2)$ and $SLIV_2(2)$ are located, and $SLIV_1(1)$ occupies 4 slots, that is, slots n−5~n−2, $SLIV_1(2)$ occupies 2 slots, that is, slots n−3~n−2, then the $SLIV_1(1)$ with the smallest slot index where the ending symbol is located and with largest total number of occupied slot is selected as valid SLIV, in order to determine 4 candidate PDSCH reception location units. $SLIV_1(2)$, $SLIV_2(1)$ and $SLIV_3(1)$ are deleted. $SLIV_2(2)$ and $SLIV_3(2)$ overlap in slot n−1 and/or slot n, the ending positions of the two SLIVs are in the same slot, wherein $SLIV_2(2)$ occupies 2 slots, that is, slots n−1~n, $SLIV_3(2)$ occupies 1 slot, that is, slot n−2; then the $SLIV_2(2)$ with the smallest slot index where the ending symbol is located and with largest total number of occupied slot is selected as valid SLIV, in order to determine 2 candidate PDSCH reception location units. Therefore, there are a total of 6 candidate PDSCH reception location units. In each receiving position unit, one HARQ-ACK bit corresponding to the PDSCH is generated respectively. Preferably, the number of slots/sub-slots corresponding to the $SLIV_{ri}(k)$ is determined according to the total number of slots/sub-slots where each PDSCH of the SLIV is located. Preferably, the number of slots/sub-slots corresponding to the $SLIV_{ri}(k)$ is determined according to the difference between the slot/sub-slot index of the first PDSCH and the last PDSCH of the SLIV, for example, if the slot index where the first PDSCH is located is n1, and the slot index where the last PDSCH is located is n2, then the number of slots corresponding to the $SLIV_{ri}(k)$ is n2−n1+1. As will be readily seen, if each PDSCH corresponding to the $SLIV_{ri}(k)$ is not continuous in the slot, then n2−n1+1>the number of PDSCHs. Preferably, if one DCI schedules Np>i PDSCHs, the UE can receive at most 1 PDSCH in a slot/sub-slot, or at most 1 PDSCH that feeds back HARQ-ACK in the same HARQ-ACK codebook or HARQ-ACK sub-codebook. If one DCI schedules 1 PDSCH, the UE can receive more than 1 PDSCH in a slot/sub-slot, or more than 1 PDSCH that feeds back HARQ-ACK in the same HARQ-ACK codebook or HARQ-ACK sub-codebook. According to one implementation, for a downlink slot/sub-slot, if the downlink slot/sub-slot only includes $SLIV_{i,j}(k)$ in $SLIV_{ri}(k)$ that schedules multiple PDSCHs, then the downlink slot/sub-slot corresponds to 1 PDSCH receiving position unit. If the downlink slot/sub-slot includes $SLIV_{ri}(k)$ that schedules one PDSCH, the PDSCH receiving position unit corresponding to the downlink slot/sub-slot is determined according to the above-described step of determining whether each SLIV overlaps. For example, in FIG. 13, for slots n−5~n−3 and slot n−1, only four or two PDSCHs that schedule $SLIV_{i,j}(k)$ are included, then each of the slots corresponds to 1 PDSCH receiving position unit. For slot n−2 and slot n, $SLIV_3(1)$ and $SLIV_3(2)$ that schedule 1 PDSCH are included, slot n−2 is determined to correspond to 2 PDSCH receiving position units according to non-overlapping SLIV1, 4(1) and $SLIV_3(1)$; slot n is determined to correspond to 2 PDSCH receiving position units according to non-overlapping SLIV1, 4(2) and $SLIV_3(1)$. Therefore, slot n−5~ slot n correspond to 8 receiving position units in total.

Or, the downlink slot/sub-slot only includes $SLIV_{ri}(k)$ that schedules 1 PDSCH, then the PDSCH receiving position unit corresponding to the downlink slot/sub-slot is determined according to the step of determining whether each SLIV overlaps described above.

Preferably, in the set of the slot/sub-slot $n_{pdsch}$ of the candidate PDSCH receiving position, first, the $SLIV_{ri1}(k)$ with the largest number of corresponding HARQ-ACK bits and with the earliest ending position is selected, and one candidate PDSCH receiving position unit or candidate PDSCH receiving position is determined, other $SLIV_{ri2}(k)$ overlapping with the $SLIV_{ri1}(k)$ all correspond to the candidate PDSCH receiving position unit or the candidate PDSCH receiving position, and the $SLIV_{ri2}(k)$ is deleted from the table T. Then, another $SLIV_{ri3}(k)$ that does not overlap with $SLIV_{ri1}$ (k), and with the largest number of corresponding HARQ-ACK bits as well as with the earliest ending position, and one candidate PDSCH receiving position unit or candidate PDSCH receiving position is determined, other $SLIV_{ri4}(k)$ overlapping with the $SLIV_{ri3}$ (k) all correspond to the candidate PDSCH receiving position unit or the candidate PDSCH receiving position, and the $SLIV_{ri4}$ (k) is deleted from the table T. So on and so forth, until all rows in table T are processed.

Preferably, in the set of the slot/sub-slot $n_{pdsch}$ of the candidate PDSCH receiving position, if one slot/sub-slot $n_{pdsch2}$ overlap with slot/sub-slot $n_{pdsch0}$, a reference time determined according to the specific slot/sub-slot $n_{pdsch1}$ and the time resource of the specific SLIV, the slot/sub-slot $n_{pdsch2}$ is deleted from the set of slot/sub-slot $n_{pdsch}$.

Preferably, the specific slot/sub-slot $n_{pdsch1}$ is determined according to the smallest value of K1 in the current K1 set and does not overlap with any reference slot/sub-slot $n_{pdsch0}$. The K1 corresponding to the reference slot/sub-slot $n_{pdsch0}$ needs to be deleted from the K1 set.

Preferably, the specific slot/sub-slot $n_{pdsch1}$ is determined according to the largest value of K1 in the current K1 set and does not overlap with any reference slot/sub-slot $n_{pdsch0}$. The K1 corresponding to the reference slot/sub-slot $n_{pdsch0}$ needs to be deleted from the K1 set.

Preferably, the specific SLIV is the corresponding $SLIV_{ri}$ (k) with the largest number of bits among each valid $SLIV_{ri}(k)$ the ending symbol of which is in the specific slot/sub-slot $n_{pdsch1}$, or the specific SLIV is the corresponding $SLIV_{ri}(k)$ with the smallest number of bits among each valid $SLIV_{ri}(k)$ the ending symbol of which is in the specific slot/sub-slot $n_{pdsch1}$, or the specific SLIV is the corresponding $SLIV_{ri}(k)$ with the most occupied slot/sub-slot among each valid $SLIV_{ri}(k)$ the ending symbol of which is in the specific slot/sub-slot $n_{pdsch1}$, or the specific SLIV is the corresponding $SLIV_{ri}(k)$ with the least occupied slot/sub-slot among each valid $SLIV_{ri}(k)$ the ending symbol of which is in the specific slot/sub-slot $n_{pdsch1}$.

Taking FIG. 16 as an example, the K1 set is {0, 1, 2}. The PDSCH TDRA table T includes 2 rows, the first row schedules 4 PDSCHs, and the second row schedules 2 PDSCHs. The set of the slot/sub-slot $n_{pdsch}$ of the candidate PDSCH receiving position is determined according to the K1 set, which are slot n, n−1 and slot n−2, respectively. The candidate PDSCH receiving position unit corresponding to each row is determined according to the SLIV of the last PDSCH of the row. Then, in the slot n, there are two SLIVs, that is, SLIV1, 4(3) corresponding to the first row and SLIV2, 2(3) corresponding to the second row. In the slot n−1, there are two SLIVs, that is, SLIV1, 4(2) corresponding to the first row and SLIV2, 2(2) corresponding to the second row, respectively. In the slot n−2, there are two SLIVs, which are SLIV1,4(1) corresponding to the first row and SLIV2,2(1) corresponding to the second row, respectively. The first specific slot/sub-slot $n_{pdsch0}$ is the smallest slot of K1, that is, slot n. In slot n, SLIV1,4(3) overlaps with SLIV2,2(3), SLIV1,4(3) is selected, and the candidate PDSCH receiving position unit is determined. The specific SLIV is the SLIV with least time resource occupied among SLIV1,4(3) and SLIV2,2(3), that is SLIV2,2(3). Then, according to the slot n and the time resources of the two PDSCHs corresponding to SLIV2, 2(3), the first reference slot/sub-slot $n_{pdsch}$w is determined to be the slot n−1. The slot n−1 is deleted. In slot n−2, SLIV1,4(1) and SLIV2,2(1) overlap, SLIV1,4(1) is selected, and the candidate PDSCH receiving position unit is determined. Therefore, in the example, there are a total of 2 candidate PDSCH reception location units.

The number of candidate PDSCH receiving positions included in the candidate PDSCH receiving position unit corresponding to the $SLIV_{ri}(k)$ is determined in one of the following ways:

(a) The number of candidate PDSCH receiving positions included in the candidate PDSCH receiving position unit corresponding to the SLIVri(k) is determined by the number of PDSCHs included in the SLIV, that is, Np.

Taking FIG. 13 as an example, if $SLIV_{ri}(k)$ is $SLIV_1(1)$, then the number of candidate PDSCH receiving positions included in the candidate PDSCH receiving position unit corresponding to $SLIV_1(1)$ is the number of PDSCHs included in $SLIV_1(1)$, which is equal to 4. If $SLIV_{ri}(k)$ is $SLIV_2(2)$, then the number of candidate PDSCH receiving positions included in the candidate PDSCH receiving position unit corresponding to $SLIV_2(2)$ is the number of PDSCHs included in $SLIV_2(2)$, which is equal to 2.

(b) The number of candidate PDSCH receiving positions included in the candidate PDSCH receiving position unit corresponding to the SLIVri(k) is determined by the maximum value of the number of PDSCHs included in each SLIV corresponding to the same candidate PDSCH receiving position unit with the SLIV, that is, the maximum value of Np of each SLIV.

Taking FIG. 13 as an example, if $SLIV_{ri}(k)$ is $SLIV_1(1)$, then the number of candidate PDSCH receiving positions included in the candidate PDSCH receiving position unit corresponding to $SLIV_1(1)$ is the maximum number of PDSCHs included in $SLIV_1(1)$, $SLIV_2(1)$, $SLIV_1(2)$, which is equal to 4. If $SLIV_{ri}(k)$ is $SLIV_2(2)$, then the number of candidate PDSCH receiving positions included in the candidate PDSCH receiving position unit corresponding to $SLIV_2(2)$ is the maximum number of PDSCHs included in $SLIV_2(2)$, $SLIV_3(2)$, which is equal to 2.

(c) The number of candidate PDSCH receiving positions included in a candidate PDSCH receiving position unit corresponding to the $SLIV_{ri}(k)$ is determined by the maximum value of the number of PDSCHs included in all $SLIV_{r1}$, 1=1,2 . . . R.

Taking FIG. 13 as an example, if $SLIV_{ri}(k)$ is $SLIV_1(1)$, then the number of candidate PDSCH receiving positions included in the candidate PDSCH receiving position unit corresponding to $SLIV_1(1)$ is the maximum value of the number of PDSCHs included in all $SLIV_r$ in the figure, that is, the maximum valued of the number of PDSCHs included in $SLIV_1(1)$, $SLIV_2(1)$, $SLIV_3(1)$, $SLIV_1(2)$, $SLIV_2(2)$, and $SLIV_3(2)$, which is equal to 4. If $SLIV_{ri}(k)$ is $SLIV_2(2)$, then the number of the candidate PDSCH receiving positions included in the candidate PDSCH receiving position unit corresponding to $SLIV_2(2)$ is 4 as well.

(d) The number of candidate PDSCH receiving positions included in the candidate PDSCH receiving position unit corresponding to the $SLIV_{ri}(k)$ is 1. In a specific implementation, the step of determining a candidate PDSCH receiving position unit can be skipped, and a candidate PDSCH receiving position can be determined directly according to the $SLIV_{ri}(k)$.

The number of HARQ-ACK bits corresponding to the candidate PDSCH receiving position is determined according to at least one of the following methods:

(e) The number of HARQ-ACK bits corresponding to the candidate PDSCH receiving position is determined by the number of HARQ-ACK bits corresponding to the PDSCH.

Preferably, the total number of HARQ-ACK bits for each candidate position is determined in combination of any one of (e) and (a) to (c).

Preferably, the total number of HARQ-ACK bits for each candidate position is determined in combination of any one of (e) and (d).

(f) The number of HARQ-ACK bits corresponding to the candidate PDSCH receiving position is determined by the number of HARQ-ACK bits of Nq PDSCHs corresponding to the PDSCH receiving position.

Nq is determined by the number of PDSCHs included in the SLIV that determines the PDSCH receiving position, that is, determined by Nq=Np.

Taking FIG. 13 as an example, for the PDSCH receiving position corresponding to $SLIV_1(1)$, Nq=4, that is, the value of Np of $SLIV_1(1)$. For the candidate PDSCH receiving position corresponding to $SLIV_2(2)$, Nq=2, that is, the value of Np of $SLIV_2$ (2).

Or, Nq is determined by the maximum value of the number of PDSCHs included in each SLIV of the PDSCH receiving position, that is, determined by the maximum value of Np of each SLIV.

Taking FIG. 13 as an example, for the PDSCH receiving position corresponding to $SLIV_1(1)$, Nq=4, that is, the maximum value of Np of $SLIV_1(1)$, $SLIV_2(1)$, and $SLIV_1$ (2). For the candidate PDSCH receiving position corresponding to $SLIV_2(2)$, Nq=2, that is, the maximum number of PDSCHs included in $SLIV_2(2)$ and $SLIV_3(2)$.

Or, Nq is determined by the maximum value of the number of PDSCHs included all valid $SLIV_{r1}$, 1=1,2 . . . R.

Taking FIG. 13 as an example, for any candidate PDSCH receiving position, Nq=4, that is, the maximum value of the number of PDSCHs included in all $SLIV_r$ in the figure.

Preferably, the total number of HARQ-ACK bits for each candidate position is determined in combination of any one of (d) and (f).

Preferably, if there are multiple $SLIV_{rj}(k)$ corresponding to one PDSCH receiving position or corresponding to one PDSCH receiving position unit, according to predefined rules, the UE maps a HARQ-ACK of the $SLIV_{rj}(k)$ to the PDSCH receiving position or the N HARQ-ACK bit positions corresponding to the receiving position unit. For example, the predefined rules are that the HARQ-ACK of $SLIV_{rj}(k)$ is mapped to the first N' bit positions among the N HARQ-ACK bit positions, and the last N-N' bit positions are filled with the predefined HARQ-ACK bits, such as NACK, wherein N' is the number of HARQ-ACK bits of $SLIV_{rj}(k)$. Taking FIG. 13 as an example, $SLIV_1(1)$, $SLIV_2$ (1), $SLIV_1(2)$ correspond to the same PDSCH receiving position or the same PDSCH receiving position unit, and the number of bits corresponding to the PDSCH receiving position or receiving position unit is the maximum number of PDSCHs of the three SLIV, that is, N=4. The base station actually transmits the PDSCH corresponding to $SLIV_2(1)$, then UE generates a 2-bit HARQ-ACK according to the decoding results of the two PDSCHs of $SLIV_2(1)$, places it in the PDSCH receiving position or the first and second bits of the receiving position unit position, and generate a 2-bit NACK, which is placed in the 3rd and 4th bit positions.

Preferably, if one carrier is configured with CBG based transmission, the number of HARQ-ACK bits corresponding to one PDSCH receiving position is determined by the number of maximum code block group (CBG) corresponding to one PDSCH.

Preferably, if one carrier is configured with CBG based transmission, and if one PDCCH schedules Np PDSCHs (Np>1), the HARQ-ACKs of the multiple PDSCHs are HARQ-ACKs with a granularity of TB and are placed in the different HARQ-ACK bit positions in the same candidate PDSCH reception positions. For example, the number of maximum code block groups CBG=8, Np=3. One candidate PDSCH receiving position includes 8-bit HARQ-ACK. For the case of Np=3, place the 3-bit HARQ-ACK in the first 3 positions of the 8-bit position, and transmit the NACK placeholder in the last 5 positions; or place the 3-bit HARQ-ACK in the last 3 positions of the 8-bit position, and transmit the NACK placeholders in the remaining first 5 positions. For the case of Np=1, that is, the case of scheduling one PDSCH, the HARQ-ACK of each CBG of the PDSCH is placed in the corresponding position.

Preferably, if the carrier is not configured with CBG based transmission, the number of HARQ-ACK bits corresponding to one PDSCH receiving position is determined by the number of maximum transmission blocks TB corresponding to one PDSCH. For example, the number of maximum transport blocks TB corresponding to one PDSCH=2, then the number of HARQ-ACK bits corresponding to one PDSCH receiving position=2.

Preferably, if the carrier is not configured with CBG based transmission, the number of HARQ-ACK bits corresponding to one PDSCH receiving position is determined by the number of maximum transmission blocks TB corresponding to Nq PDSCHs. For example, the maximum number of transport blocks TB corresponding to one PDSCH=2, then the number of HARQ-ACK bits corresponding to one PDSCH receiving position=2*Nq.

Preferably, the manner of determining the number of candidate PDSCH receiving positions included in the candidate PDSCH receiving position unit corresponding to the $SLIV_{ri}(k)$ is related to the configuration of the CBG. For example, if one carrier is configured with CBG based transmission, the number of candidate PDSCH receiving positions included in the candidate PDSCH receiving position unit corresponding to the $SLIV_{ri}(k)$ of the carrier is 1, and the number of HARQ-ACK bits corresponding to the candidate PDSCH receiving position is determined by the number of maximum code block groups CBG corresponding to one PDSCH. If a carrier is not configured with CBG based transmission, the number of candidate PDSCH receiving positions included in the candidate PDSCH receiving position unit corresponding to the SLIV, (k) of the carrier is determined by the maximum value of PDSCH included in the each SLIV corresponding to the same candidate PDSCH receiving position units with the SLIV, the number of HARQ-ACK bits corresponding to the candidate PDSCH receiving position is determined by the number of maximum TBs corresponding to one PDSCH.

FIG. 14 shows a PDSCH TDRA table T according to an exemplary embodiment of the present disclosure. Take FIG. 14 as an example, K1 set={0, 2}. For convenience of description, $SLIV_{i,j}(k)$ is used in the figure to represent the SLIV of each possible PDSCH, and k is used to distinguish the sequence of the starting point of the first PDSCH in the row where the $SLIV_{i,j}$ is located. The PDSCH TDRA table T includes 3 rows, the first row includes 4 PDSCHs, SLIV is SLIV1,1, SLIV1,2, SLIV1,3 SLIV1,4, respectively K0=0; the second row includes 2 PDSCHs, SLIV is SLIV2,1, SLIV2,2, respectively K0=2; the third row includes 1 PDSCH, SLIV is SLIV3, K0=2. Set K'={1, 2, 3, 4, 5}, and according to set K and set K', the set of candidate PDSCH receiving position slot $n_{pdsch}$ is determined to be slot {n, n−1, n−2, n−3, n−4, n−5}. In the set, the valid SLIV is determined as SLIV1,1(4)~SLIV1,4(4), SLIV1,1(6) ~SLIV1,4(6), SLIV2,1(4)~SLIV2,2(4), SLIV2,1(6) ~SLIV2,2(6), SLIV3(4), SLIV3(6). Combine the SLIVs with the same i and k to form a new SLIV, and obtain $SLIV_1(4)$ (composed of SLIV1,1(4)~SLIV1,4(4)), $SLIV_1(6)$ (composed of SLIV1,1(6)~SLIV1,4(6)), $SLIV_2$ (4) (composed of SLIV2,1(4)~SLIV2,4(4)), $SLIV_2(6)$ (composed of SLIV2,1(6)~SLIV2,4(6)) and $SLIV_3(4)$ (SLIV3(4)), $SLIV_3$ (6) (SLIV3(6)). Then, determine whether the 6 SLIVs overlap. According to the method described in (4), find the SLIV which ends first, that is, SLIV1(4) as the first candidate PDSCH receiving position group unit, delete $SLIV_1(6)$ and $SLIV_2(4)$ that partially overlap with the SLIV, the three SLIV corresponds to the same candidate PDSCH receiving position unit; find the SLIV which does not overlap and ends first, that is $SLIV_3$ (4) as the second candidate PDSCH receiving position group, find the SLIV which does not overlap and ends first, that is $SLIV_2(6)$ as the third candidate PDSCH receiving position group, delete $SLIV_3$ (6) that partially overlaps the SLIV, $SLIV_2(6)$ and $SLIV_3(6)$ correspond to the same candidate PDSCH receiving position unit. Among the 3 SLIVs corresponding to the first candidate position unit, $SLIV_3(4)$, $SLIV_3(6)$ and $SLIV_2(4)$ correspond to 4 PDSCHs, 4 PDSCHs, and 2 PDSCHs respectively; the maximum value is 4, then the first candidate position unit corresponds to 4 candidate PDSCH receiving positions. The second candidate position unit corresponds to one $SLIV_3(4)$ and one PDSCH; then, the second candidate position unit corresponds to one candidate PDSCH receiving position. The third candidate position unit corresponds to 2 SLIVs, that is SLIV2(6) and SLIV3(6), respectively, which correspond to 2 PDSCH and 1 PDSCH respectively, the maximum value is 2, then the third candidate position unit corresponds to 2 candidate PDSCHs receiving position. Each candidate PDSCH receiving position corresponds to 1 bit HARQ-ACK. Then, the HARQ-ACK codebook in the uplink slot n is 7 bits in total.

According to another implementation, the number of candidate PDSCH receiving positions corresponding to each candidate position unit is 1. Assume that CBG based transmission is configured, the maximum number of CBGs is 8. Then the above three candidate PDSCH receiving position units correspond to one candidate PDSCH receiving position respectively, and each candidate PDSCH receiving position is 8-bit HARQ-ACK. Then, the HARQ-ACK codebook in the uplink slot n is 24 bits in total.

Preferably, when determine whether each SLIV overlaps, if $SLIV_{r1}(k1)$ and $SLIV_{r2}$ (k2) partially overlap, then SLIVr2j(k2) corresponding to the overlapping part of SLIVr1(k1) in $SLIV_{r2}(k2)$ is deleted.

According to yet another implementation, for the i-th row in the PDSCH TDRA table T, if Np>0, only the SLIVi,Np of the last PDSCH, denoted as $SLIV_{end,i}$, is used to determine the candidate PDSCH receiving position unit. In order to distinguish different starting points $SLIV_{end,i}$, different values of k for $SLIV_{end,i}(k)$ is used for indication. The number of candidate PDSCH receiving positions included in the candidate PDSCH receiving position unit corresponding to the $SLIV_{end,i}(k)$ is determined in one of the following ways:

(a) The number of candidate PDSCH receiving positions included in the candidate PDSCH receiving position unit corresponding to the $SLIV_{end,i}(k)$ is determined by the number of PDSCHs included in the row of the PDSCH TDRA table T where the SLIV is located, that is, by Np.

(b) The number of candidate PDSCH receiving positions included in the candidate PDSCH receiving position unit corresponding to the $SLIV_{end,i}(k)$ is determined by the maximum value of number of PDSCHs in the row of the PDSCH TDRA table T where each SLIV corresponding to the same candidate PDSCH receiving position unit with the SLIV is located, that is, determined by the maximum value of Np of each row.

(c) The number of candidate PDSCH receiving positions included in the candidate PDSCH receiving position unit corresponding to the $SLIV_{end,i}(k)$ is 1.

The number of HARQ-ACK bits corresponding to one candidate PDSCH receiving position is determined according to at least one of the following methods:

(a) If the carrier is configured with CBG based transmission, the number of HARQ-ACK bits corresponding to one PDSCH receiving position is determined by the number of the largest code block group CBGs corresponding to one PDSCH.

(b) If the carrier is not configured with CBG based transmission, the number of HARQ-ACK bits corresponding to one PDSCH receiving position is determined by the number of the largest transport block (TB) corresponding to one PDSCH.

Preferably, the manner of determining the number of candidate PDSCH receiving positions included in the candidate PDSCH receiving position unit corresponding to the $SLIV_{end,i}(k)$ is related to the configuration of the CBG. For example, if one carrier is configured with CBG based transmission, the number of candidate PDSCH receiving positions included in the candidate PDSCH receiving position unit corresponding to the $SLIV_{end,i}(k)$ of the carrier is 1, and the number of HARQ-ACK bits corresponding to one candidate PDSCH receiving position is determined by the number of maximum code block groups CBG corresponding to one PDSCH. If a carrier is not configured with CBG based transmission, the number of candidate PDSCH receiving positions included in the candidate PDSCH receiving position unit corresponding to the $SLIV_{end,i}$ (k) of the carrier is determined by the maximum value of PDSCH included in the each SLIV corresponding to the same candidate PDSCH receiving position units with the SLIV, the number of HARQ-ACK bits corresponding to the candidate PDSCH receiving position is determined by the number of maximum TBs corresponding to one PDSCH.

FIG. 15 shows a PDSCH TDRA table T according to an exemplary embodiment of the present disclosure. For example, as shown in FIG. 15, the set of slot $n_{pdsch}$ of the candidate PDSCH receiving position corresponding to the HARQ-ACK feedback of the uplink slot n is determined according to the uplink slot n and the K1 set. In slot n−5~slot n, the SLIVs corresponding to the PDSCH that may feed back HARQ-ACK in uplink slot n are SLIV1,1(1)~SLIV1,4(1), SLIV1,1(2)~SLIV1,4(2), SLIV2,1(1)~SLIV2,2(1), SLIV2,1(2)~SLIV2,2(2), SLIV3(1), SLIV3(2). Then, the $SLIV_{end,i}(k)$ corresponding to the 6 groups of SLIV are $SLIV_{end,1}(1)$, $SLIV_{end,1}(2)$, $SLIV_{end,2}(1)$, $SLIV_{end,2}(2)$, $SLIV_{end,3}(1)$, $SLIV_{end,3}(2)$, respectively. Then, in slots n and n−2, the determination on whether the 6 SLIVs overlap are conducted, respectively. According to the method described in (4), in slot n−2, the SLIV which ends first, that is, $SLIV_{end,1}$ (1) as the first candidate PDSCH receiving position group unit, and delete $SLIV_{end,2}(1)$ that partially overlaps with the SLIV. Then find the second non-overlapping SLIV, $SLIV_{end,3}(1)$. In slot n, find the SLIV which ends first, that is $SLIV_{end,1}(2)$ as the third candidate PDSCH receiving position group unit, and delete the $SLIV_{end,2}(2)$ that partially overlaps with the SLIV. Then find the non-overlapping $SLIV_{end,3}(2)$, as the fourth candidate PDSCH receiving position group unit. Then, there are 4 candidate PDSCH reception position group units in total. If the number of PDSCHs receiving positions included in each candidate PDSCH receiving position group unit is determined by the maximum value of the number of PDSCHs in the row of the PDSCH TDRA table T where each SLIV corresponding to the same candidate PDSCH receiving position unit with the SLIV is located, then the 4 candidate position group units respectively include 4, 1, 4, 1 PDSCH position units, a total of 10 PDSCH position units; each unit includes 1 bit HARQ-ACK, a total of 10 bits HARQ-ACK. According to another implementation, the number of candidate PDSCH receiving positions corresponding to each candidate position unit is 1, a total of 4 PDSCH position.

Preferably, if set K, and/or set K', and/or PDSCH TDRA table T, and/or PDCCH candidate positions are separately configured for different DCI formats, then in combination of (1)/(2) and (3), the operation can be performed separately for each DCI format. For example, the set K of DCI format 1 is Z1, the SLIV set is S1, the set K of DCI format 2 is Z2, and the SLIV set is S2. Then in combination of Z1 and S1, set of SLIVs is determined, in combination of Z2 and S2 another set of SLIVs is determined, and all the SLIVs are determined according to the union of the two sets of SLIVs.

Preferably, when in combination of (1)/(2) and (3), the operation is performed without distinguishing the DCI format. For example, the set K of DCI format 1 is Z1, the SLIV set is S1, the set K of DCI format 2 is Z2, and the SLIV set is S2. Then Z is obtained by the union of Z1 and Z2, S is obtained by the union of S1 and S2, and all SLIVs is determined based on Z and S.

Preferably, if one or more PDSCHs scheduled by one PDCCH span N slots/sub-slots (N>1), for example, a row in the PDSCH TDRA table T includes the SLIV and/or K0 of multiple PDSCHs, and the ending symbols of the first PDSCH and the last PDSCH are located in different slots/sub-slots, corresponding to different K1s in the K1 set, and corresponding one or more PDSCHs spanning N slots may partially overlap. For example, for $SLIV_1(1)$ and $SLIV_1(2)$ in FIG. 9, the corresponding K1 is K1=2 and K1=0, respectively. It is assumed that the base station cannot schedule the above partially overlapping PDSCHs at the same time, or the UE may not separately feed back HARQ-ACKs on the above partially overlapping PDSCHs, so that the number of HARQ-ACK bits fed back by the UE can be reduced. It is assumed that the K1 set is divided into one or more subsets, and the value of each K1 belongs to only one subset. For one subset of the K1 set, if there are multiple K1s, one or more PDSCHs spanning N slots/sub-slots corresponding to any two K1s are partially overlapped, that is, $|K_{1,a}-K_{1,b}<N$, $K_{1,a}\in K_S$, $K_{1,b}\in K_S$.

The HARQ-ACK position may be determined separately for each subset. For example, for one subset Ks, the HARQ- ACK position is determined according to a K1 in Ks, such as the minimum K1 or the maximum K1. Or, for one subset Ks, all K1 in Ks are collectively considered to determine the HARQ-ACK position.

Preferably, if the HARQ-ACK to be fed back in one uplink time unit includes the HARQ-ACK of the SPS PDSCH, and the SPS PDSCH is not associated with the candidate PDSCH receiving position unit determined according to the above method, it needs to separately reserve HARQ-ACK bit positions for the SPS PDSCH in the HARQ-ACK codebook. For example, the HARQ-ACK of PDSCH 1~5 needs to be fed back in uplink slot n, wherein PDSCH 1~3 are dynamically scheduled PDSCHs, and PDSCH 4~5 are SPS PDSCHs. If among them, PDSCH 1~4 are associated with the determined candidate PDSCH receiving position unit, but PDSCH5 is not associated with the candidate PDSCH receiving position unit, the UE generates a semi-static codebook according to the candidate PDSCH receiving position unit, and after the semi-static codebook, add 1 bit HARQ-ACK, which corresponds to PDSCH 5. If the number of SPS PDSCHs not associated with the candidate PDSCH reception location unit determined according to the above method is >1, then the HARQ-ACKs of the SPS PDSCHs are sorted according to a predefined rule, for example, according to the sequence of the time resource of the SPS PDSCH, according to the index size of the SPS PDSCH HARQ process, or according to the index size of SPS PDSCH configuration.

Preferably, for TDRA with Np>1 PDSCHs, according to at least one of the methods described above, the candidate PDSCH receiving position unit and the number of HARQ-ACK bits of each receiving position unit are determined, and a HARQ-ACK sub-codebook is generated. For TDRA with Np=1 PDSCH, a HARQ-ACK sub-codebook is generated separately. Concatenate the two sub-codebooks to generate a HARQ-ACK codebook. Or, for TDRA with Np=1 PDSCH, in each slot/sub-slot in the set of slots/sub-slots npdsch determined according to set K, process the TDRA of PDSCH with Np=1 to determine the candidate PDSCH receiving position unit, and the number of the HARQ-ACK bit of each receiving unit is determined according to the number of the HARQ-ACK bit of one PDSCH. And in each slot/sub-slot in the set of slots/sub-slots $n_{pdsch}$ determined according to the set K, the candidate PDSCH receiving unit corresponding to the PDSCH with Np=1 and the candidate PDSCH receiving unit corresponding to the PDSCH with Np>1 are cascaded.

When the HARQ-ACKs of multiple PDSCHs are fed back in one uplink time unit, and the number of PDSCHs actually scheduled by the PDCCHs that schedule the PDSCHs may be different, a semi-static HARQ-ACK codebook can be generated in accordance with a reasonable codebook size by using the solution according to the above embodiment. The robustness of HARQ-ACK feedback can be ensured.

Embodiment Two

The embodiment tow is a variation of embodiment one. The method for transmitting one or more PDSCHs in the second embodiment also includes:

In step 401: UE receives PDCCH. The received PDCCH may include DCI for scheduling one or more PDSCHs.

In step 402: the UE receives one or more PDSCHs according to the received DCI.

In step 403: the UE determines and transmits the hybrid automatic repeat request acknowledgement (HARQ-ACK) codebook for the PDSCH according to the received PDSCH and PDCCH.

Preferably, the HARQ-ACK codebook is a dynamic HARQ-ACK codebook, which is also referred to as Type-2 HARQ-ACK codebook.

The DCI in step 401 may schedule 1 PDSCH or Np PDSCHs, wherein Np>1. The DCI may include information about HARQ-ACK timing. The HARQ-ACK timing information is the time delay from PDSCH to HARQ-ACK feedback, denoted as K1.

The HARQ-ACK of Np PDSCHs scheduled by one DCI may correspond to the same uplink time unit. Then, only one HARQ-ACK timing information bit field is needed in DCI. The last PDSCH among the Np PDSCHs scheduled according to the DCI is a time reference, and the uplink time unit where the HARQ-ACK is transmitted is determined according to K1. The HARQ-ACK of Np PDSCHs scheduled by one DCI may correspond to one or more uplink time units. There are one or more HARQ-ACK timing information bit fields in DCI. According to the last PDSCH corresponding to each K1 and K1, one or more uplink time units where the HARQ-ACK is transmitted are determined. Preferably, the uplink time unit is an uplink slot or sub-slot. How to determine the correspondence between Np PDSCHs and multiple K1s is described in the embodiment one, which will not be repeated here.

The DCI also includes Np PDSCH TDRA information. The DCI indicates the time resources of the Np PDSCHs scheduled by the DCI through indication of a row index of the PDSCH TDRA table T. Preferably, if a DCI indicates secondary cell dormancy, or indicates a SPS PDSCH release, or triggers the third type of HARQ-ACK feedback (such as the Type-3 HARQ-ACK codebook described in TS 38.213 9.1.4) and does not schedule DL-SCH, the UE does not expect the row of the PDSCH TDRA table T indicated in the DCI to include time resource information of Np>1 PDSCHs.

Preferably, if one DCI indicates SPS PDSCH activation, the UE does not expect the row of the PDSCH TDRA table T indicated in the DCI to include time resource information of Np>1 PDSCHs. Preferably, if one DCI indicates the retransmission of a SPS PDSCH, the UE does not expect the row of the PDSCH TDRA table T indicated in the DCI to include time resource information of Np>1 PDSCHs. Preferably, if the CRC of a DCI is scrambled by CS-RNTI, the UE does not expect the row of the PDSCH TDRA table T indicated in the DCI to include time resource information of Np>1 PDSCHs.

Preferably, for the same scheduled cell of the same UE, if the DCI carried by PDCCH1 schedules Np1 PDSCHs, the DCI carried by PDCCH2 schedules Np2 PDSCHs, and the ending symbol of PDCCH2 is later than the ending symbol of PDCCH1, then, the UE does not expect that the starting point of any PDSCH of the Np2 PDSCHs is earlier than the ending symbol of any PDSCH of the Np1 PDSCHs. The starting point of the first PDSCH of Np2 PDSCHs cannot be earlier than the ending symbol of the last PDSCH of Np1 PDSCHs. With the restriction, the UE can process all the PDSCHs scheduled by PDCCH1 and then process the PDSCHs scheduled by PDCCH2, thereby reducing the complexity of determining the dynamic HARQ-ACK codebook.

Preferably, for the same scheduled cell of the same UE, if the DCI carried by PDCCH1 schedules Np1 PDSCHs, the DCI carried by PDCCH2 schedules Np2 PDSCHs, and the ending symbol of PDCCH2 is later than the ending symbol of PDCCH1, then, the UE does not expect the starting point of the i-th PDSCH of the Np2 PDSCHs is earlier than the ending symbol of the i-th PDSCH of the Np1 PDSCHs. The starting point of the i-th PDSCH of the Np2 PDSCHs cannot be earlier than the ending symbol of the i-th PDSCH of the Np1 PDSCHs, but the starting point of the i-th PDSCH of the Np2 PDSCHs may be earlier than the ending symbol of the (i+1)-th PDSCH of the Np1 PDSCHs. In the way, the time delay of the PDSCH scheduled by PDCCH2 can be shortened.

Preferably, for the same scheduled cell of the same UE, if the base station configures that one PDCCH can schedule Np>1 PDSCHs, the UE does not expect to receive more than 1 unicast PDSCH in the same downlink slot/sub-slot; or, the UE does not expect to receive more than 1 PDSCH that requires HARQ-ACK feedback in the same downlink slot/sub-slot; or the UE does not expect to receive more than 1 PDSCH that requires HARQ-ACK feedback in the same HARQ-ACK codebook in the same downlink slot/sub-slot; or the UE does not expect to receive more than 1 unicast PDSCH that requires HARQ-ACK feedback in the same HARQ-ACK codebook in the same downlink slot/sub-slot.

The dynamic HARQ-ACK codebook transmitted in an uplink slot/sub-slot is determined according to the DAIs of the DCIs in the PDCCH monitoring occasions. The PDCCH monitoring occasions are determined according to at least one of the following information: (1) the feedback time delay K1 indicated in the DCI for scheduling PDSCHs, (2) the time delay K0 indicated by TDRA in the DCI for scheduling PDSCHs and applicable to the first PDSCH, (3) the time delay K0 indicated by TDRA in the DCI for scheduling PDSCH and applicable to the last PDSCH, (4) the time offset $n_1$-$n_{Np}$ from the first PDSCH to the last PDSCH among the Np PDSCHs indicated by TDRA in the DCI for scheduling PDSCHs (wherein $n_1$ is the slot where the first PDSCH is located, and $n_{Np}$ is the slot where the Np-th PDSCH is located). For example, one DCI schedules 4 PDSCHs, the indicated K0, K1 applicable to the last PDSCH is K0=3, K1=4, HARQ-ACK is transmitted in the uplink slot n, and the PDCCH monitoring occasion is determined according to (1) and (3), that is, PDCCH monitoring occasion in slot n−K0-K1=n−7.

The DCI includes the downlink assignment indicator DAI. The DAI includes a first type of DAI and/or a second type of DAI. The first type of DAI is used to indicate one of the following: in one HARQ-ACK codebook or sub-codebook, information about the total number of PDSCHs scheduled up to the current PDCCH monitoring occasion up to the current serving cell; information about the total number of PDSCHs groups scheduled up to the current PDCCH monitoring occasion up to the current serving cell; information about the total number of PDSCHs up to the current PDCCH monitoring occasion up to the current serving cell; information about the total number of HARQ-ACK bits up to the current PDCCH monitoring occasion up to the current serving cell; information about the total number of the transmission blocks TBs up to the current PDCCH monitoring occasion up to the current serving cell. Preferably, a PDSCH group includes multiple PDSCHs, for example, one PDSCH group includes $N_{max}$ PDSCHs, wherein $N_{max}$ is the maximum number of PDSCHs that can be scheduled; or one PDSCH group includes Np PDSCHs. The second type of DAI is used to indicate one of the following: in one HARQ-ACK codebook or sub-codebook, information about the total number of PDSCHs scheduled up to the current PDCCH monitoring occasion; information about the total number of PDSCHs groups scheduled up to the current PDCCH monitoring occasion; information about the total number of PDSCHs up to the current PDCCH monitoring occasion; information about the total number of HARQ-ACK bits up to the current PDCCH monitoring occasion; information about the total number of the transmission blocks TBs up to the current PDCCH monitoring occasion. In addition, in a DCI scheduling PUSCH, the third type of DAI is included, which is used to indicate one of the following: information about the total number of PDCCHs corresponding to the HARQ-ACK fed back on the PUSCH; information about the total number of PDSCHs corresponding to HARQ-ACK fed back on the PUSCH; information about the total number of PDSCHs groups corresponding to HARQ-ACK fed back on PUSCH; information about the total number of HARQ-ACK bits fed back on PUSCH; information about the total number of TBs corresponding to HARQ-ACK fed back on PUSCH. Generally, the first type of DAI is referred to as C-DAI (counter DAI), the second type of DAI is referred to as T-DAI (Total DAI), and the third type of DAI is referred to as UL DAI. The counts of DAI are all in a same HARQ-ACK codebook or sub-codebook.

Preferably, the DAI counting rules of DCI belonging to the same HARQ-ACK sub-codebook are the same. For example, the DAIs of the DCIs in the first sub-codebook are all counted according to the number of PDCCHs (DCIs). The DAIs of the DCIs in the second sub-codebook are all counted according to the number of PDSCHs or PDSCH groups. Preferably, if CBG based transmission is configured, the DAIs of the DCIs in the second sub-codebook are all counted according to the number of HARQ-ACK bits. For example, if a DCI schedules a PDSCH based on CBG based transmission, the DAI is counted according to the number of actually scheduled CBGs. If a DCI schedules Np PDSCHs based on TB transmission, DAI is counted according to the number of actually scheduled PDSCHs. Preferably, the DAI counting rules of DCI belonging to a same HARQ-ACK codebook are the same. The DAIs of the DCIs in the first sub-codebook and the DAIs of the DCIs in the second sub-codebook have the same DAI counting rules, for example, both are counted according to the DCI, or both are counted according to the number of PDSCHs or PDSCH groups.

Preferably, the DAI counting rules of the DCIs scheduling Np>1 PDSCHs are the same. The DAI counting rules of the DCIs scheduling Np>1 PDSCHs and the DCIs scheduling Np=1 PDSCH are different. For example, the DAI of the DCI scheduling Np>1 PDSCHs is counted according to the PDSCH or PDSCH group, and the DAI of the DCI scheduling Np=1 PDSCH is counted according to the DCI.

Preferably, if one DL BWP, or one DL carrier, or one DCI format does not support that PDCCH schedules Np>1 PDSCHs, then the DCI of the DL BWP or DL carrier is the first type of DCI, for example, fallback DCI, or ordinary DCI and any row in the TDRA table of the DCI can only schedule at most one PDSCH. If one DCI format supports that one PDCCH schedules Np>1 PDSCHs, then the DCI is a second type of DCI, for example, ordinary DCI and at least a row in the TDRA table of the DCI can schedule >1 PDSCH. The DAI in different types of DCI may be counted in different ways, for example, the DAI in the first type of DCI is counted according to the DCI, and the DAI in the second type of DCI is counted according to the number of PDSCHs or PDSCH groups. The bit number of DAI in different types of DCI can be different, for example, each DAI bit field in the first type of DCI is 2 bits to support the scheduling of one PDSCH, and each DAI bit field in the second type of DCI is 5 bits to support the scheduling of up to 8 PDSCHs. Preferably, in DCI belonging to the same HARQ-ACK sub-codebook, the bit number of DAI of the same type is the same. If the bit number of DAI of the same type in the two DCIs is different, the PDSCHs scheduled by the two DCIs belong to different HARQ-ACK sub-codebooks. If the DAI counting rules in the two DCIs are different, the PDSCHs scheduled by the two DCIs belong to different HARQ-ACK sub-codebooks.

When the HARQ-ACKs of Np PDSCHs scheduled by one DCI are carried by multiple PUCCHs, the HARQ-ACKs of the PDSCHs belong to different HARQ-ACK codebooks or sub-codebooks. The DAI of each HARQ-ACK codebook or sub-codebook needs to be determined according to at least one of the following methods.

Method 1: If the HARQ-ACKs of multiple PDSCHs scheduled by one DCI belong to different HARQ-ACK codebooks or sub-codebooks respectively, the bit position of HARQ-ACKs of each PDSCH in HARQ-ACKs codebook of each PUCCH need to be determined through the DAI indicated by the DCI. According to one implementation, the DAI required by the HARQ-ACK codebook of Nk2 PUCCHs are respectively indicated in the DCI. According to another implementation, one C-DAI and/or one T-DAI are indicated in the DCI, which is suitable for a dynamic codebook of Nk2 PUCCHs.

Method 2: If the HARQ-ACKs of multiple PDSCHs scheduled by one DCI belong to different HARQ-ACK codebooks or sub-codebooks, the bit position of HARQ-ACKs of each PDSCH in HARQ-ACKs codebook of each PUCCH need to be determined through the DAI indicated by the DCI and the predefined or configured DAI. For example, the base station indicates the DAI required by the HARQ-ACK dynamic codebook of the first Nk3 PUCCHs in the DCI, and determines the DAI of the HARQ-ACK dynamic codebook of the Nk2-Nk3 PUCCHs according to a predefined manner. The predefined manner is at least one of the following:

- The value of DAI of the HARQ-ACK dynamic codebook of Nk2-Nk3 PUCCHs is predefined and fixed to 1 by the standard, and the actual value of DAI is 1, that is, the HARQ-ACK of the PDSCHs are located in the first to X0 bit positions of the dynamic codebook, wherein X0 is determined by the number of PDSCH.
- The value of DAI of the HARQ-ACK dynamic codebook for Nk2-Nk3 PUCCHs is predefined and fixed to 1 by the standard, and the actual value of DAI is determined according to DAI of the received other DCIs corresponding to the same PUCCH and value of the DAI; and the bit position of the HARQ-ACK of the PDSCH of the second PUCCH in the HARQ-ACK dynamic codebook is determined according to the actual value.

Due to the limited number of bits of DAI, such as 2 bits, it only has 4 values, 0,1,2,3, but the actual value Y that can be represented can be greater than 3, and it satisfies that the result of Y modulo 4 is equal to the value indicated by the DAI bit. For example, Y=1, 5, 9 . . . all correspond to the value 1 indicated by the DAI bit. Therefore, the DAI value of the HARQ-ACK dynamic codebook for Nk2-Nk3 PUCCHs is fixed at 1, which does not mean that the actual value Y is 1, but means that the actual Y needs to be determined based on the DAI of the received other DCIs corresponding to the same PUCCH.

For example, the UE is configured with 2 downlink serving cells. On serving cell 1, the UE receives one DCI1 which schedules 8 PDSCHs, and the HARQ-ACK of PDSCH 1~4 is fed back in PUCCH1, while the HARQ-ACK of PDSCH 5~8 is fed back in PUCCH2. On serving cell 2, the UE receives a DCI2 which schedules 1 PDSCH 0, and the HARQ-ACK of the PDSCH 0 is fed back in PUCCH2. The starting point of the PDCCH carrying DCI2 is earlier than the PDCCH carrying DCI1, and DAI=2 is indicated in DCI2, then, in PUCCH2, the HARQ-ACK of PDSCH 5~8 is determined according to DAI=1 and DAI=2 in DCI2 to be the actual value Y corresponding to the HARQ-ACK of PDSCH 5~8, which is 5. That is, the dynamic codebook transmitted by the UE in PUCCH2 includes 8 bits, wherein the second bit is the HARQ-ACK of PDSCH0, and the 5th-8th bits are the HARQ-ACK of PDSCH 5~8.

The base station configures the value of DAI of the HARQ-ACK dynamic codebook of Nk2-Nk3 PUCCHs. For example, Nk2=1 or 2, the base station configures the value of DAI of the PDSCH corresponding to the second PUCCH to be X1, for example, X1=1, through RRC signaling or MAC signaling. The UE determines the bit position of the HARQ-ACK of the PDSCH of the second PUCCH in the HARQ-ACK dynamic codebook according to the DAI of received other DCIs corresponding to the same PUCCH and the configured DAI value.

Preferably, if the UE is configured with only one downlink serving cell, or only one downlink serving cell is configured in a PUCCH group, the DAI of the HARQ-ACK dynamic codebook of each PUCCH can be determined through the method two. One PUCCH only includes the HARQ-ACK of the PDSCH on one carrier, so it is relatively simple to determine the DAI of the HARQ-ACK dynamic codebook of the last Np-P PUCCHs of one DCI.

Preferably, if the UE is configured with at least 2 downlink serving cells, or at least 2 downlink serving cells are configured in a PUCCH group, the DAI of the HARQ-ACK dynamic codebook of each PUCCH can be determined through the method one. Preferably, the base station configures that which way is used to determine the DAI of the HARQ-ACK dynamic codebook of each PUCCH.

How to perform grouping on HARQ-ACK codebook or sub-codebook grouping is described below. Preferably, if one DCI includes information used for code block group CBG based transmission, such as CBGTI and CBGFI, the bit field is only applicable to the situation that the DCI schedules one PDSCH. If DCI schedules Np>1 PDSCHs, DCI does not include CBG based transmission information, or the bit field of CBG based transmission information is not applicable. During HARQ-ACK feedback, if the DCI schedules one PDSCH and it is not an SPS PDSCH, the UE performs CBG granularity feedback on the PDSCH. If the DCI schedules Np>1 PDSCHs, the UE performs transmission block TB granularity feedback on the PDSCH. Or, if the DCI schedules Np>1 PDSCHs, the UE performs CBG granularity feedback on the PDSCH. Preferably, if the DCI schedules Np>Np_1 PDSCHs, for each PDSCH, the UE performs transmission block TB granularity feedback on the PDSCH; if the DCI schedules Np≤Np_1 PDSCHs, the UE performs a transmission block CBG granularity feedback on the PDSCH. Np_1 is predefined by the standard or configured by the base station. Preferably, the number of HARQ-ACK bits of the CBG feedback on one PDSCH is related to the number Np of PDSCHs scheduled by the PDCCH that schedules the PDSCH. For example, when Np≤Np_1, the number of HARQ-ACK bits of the CBG feedback on each PDSCH is Ncbg_max/Np_1, wherein Ncbg_max is the number of maximum CBGs for a transport block.

Preferably, if a DCI schedules Np>1 PDSCHs, for each PDSCH, the base station can only schedule 1 TB, and if a DCI schedules 1 PDSCH, the base station can schedule 2 TBs. Preferably, if a DCI schedules Np>Np_2 PDSCHs, for each PDSCH, the base station can only schedule 1 TB, and if a DCI schedules Np≤Np_2 PDSCHs, the base station can schedule 2 TBs. Np_2 is predefined by the standard or configured by the base station. Preferably, Np_1=Np_2. Preferably, Np_1 and Np_2 are configured separately.

Preferably, if DAI is counted according to the PDSCH or PDSCH group, and at least one downlink carrier or downlink BWP is configured with 2 transport blocks, then for one PDCCH schedules 2 TBs, the DAI is counted according to the way that 2 PDSCHs are scheduled, that is, DAI increases by 2. In the way, it is possible to avoid HARQ-ACK bit redundancy of other PDSCH that only schedule 1 TB, due to a maximum of 2 TBs that can be scheduled. For example, PDCCH1 schedules 2 TBs, 1 PDSCH, DAI=1, PDCCH2 schedules 1 TB, 4 PDSCHs, DAI=3 (2 TBs of 1 PDSCH of PDCCH1 increase DAI by 2), and PDCCH3 schedules 1 TB, 1 PDSCH, DAI=7 (4 PDSCHs of PDCCH2 increase DAI by 4).

In step 403, a hybrid automatic repeat request acknowledgement HARQ-ACK codebook for the PDSCH is transmitted according to the received PDSCH and PDCCH, including: grouping the PDSCHs that feed back HARQ-ACK in the same uplink time unit n; determining HARQ-ACK sub-codebook of each PDSCH group.

The first sub-codebook includes HARQ-ACK of a PDSCH or a PDCCH of at least one of the following types:

(1) HARQ-ACK of a PDSCH, if the PDSCH is a SPS PDSCH;

(2) HARQ-ACK of a PDCCH, if the PDCCH is the PDCCH that indicates a SPS PDSCH release, or the PDCCH that indicates Scell dormancy;

(3) HARQ-ACK of a PDCCH, if the PDCCH indicates the transmission configuration indicator (TCI) update information or the downlink/uplink beam information, and the PDCCH does not schedule a PDSCH;

(4) HARQ-ACK of a PDSCH, if the reception of the PDSCH is a TB based PDSCH reception, and the PDSCH is scheduled by a PDCCH which schedules Np PDSCHs, or the PDCCH schedules Np*Nu_tb TBs, or the PDCCH schedules Npg PDSCH groups. Np≤X, or Np*Nu_tb≤X, or Npg≤X. X is the threshold of the number of PDSCHs, or the threshold of the PDSCH group, or the threshold of the number of fed back HARQ-ACK bits that are pre-defined or configured by the base station, and Nu_tb is the maximum number of TBs of one PDSCH. Preferably, X=1. Preferably, X=Nmax, wherein Nmax is the maximum number of PDSCHs that can be scheduled. Wherein, the total number of bits of the first sub-codebook is DAIg1*N1, and $DAI_{g1}$ is the DAI in the PDCCH corresponding to the sub-codebook. N1 is the number of bits of HARQ-ACK corresponding to each DAI of the sub-codebook, and the number of bits is configured by a higher layer or determined by the maximum number of TBs that can be scheduled by one PDCCH of the sub-codebook. If the number of HARQ-ACK bits generated according to the result of receiving the PDSCH or PDCCH is less than N1, the NACK bit placeholder is transmitted until the N1 bits are filled, or the HARQ-ACK bit is repeated until it equals to the N1 bits. For example, N1=4. The base station configures one PDSCH to transmit a maximum of 2 TB. When one PDCCH schedules one PDSCH, a maximum of 2 TBs can be scheduled. When one PDCCH schedules multiple PDSCHs, one PDSCH can only schedule 1 TB. Assuming that the first PDCCH schedules 1 PDSCH, DAI=1, and in response to the PDCCH, the UE transmits 4-bit HARQ-ACK, which are corresponding to the HARQ-ACK of the 2 TB and 2-bit NACK placeholder of the PDSCH respectively. The second PDCCH schedules 5 PDSCHs, DAI=2, and each PDSCH can only transmit one TB; in response to the PDCCH, the UE transmits 8-bit HARQ-ACK, which are corresponding to 5 PDSCHs and 3-bit NACK placeholder, respectively. The third PDCCH schedules 2 PDSCHs, each PDSCH can only send one TB, DAI=4; in response to the PDCCH, the UE transmits 4-bit HARQ-ACK, which are corresponding to 2 PDSCH and 2-bit NACK placeholders respectively. Then, $DAI_{g1}$=4, N1=4, and the HARQ-ACK codebook has a total of 16 bits.

The second sub-codebook includes HARQ-ACK of a PDSCH or a PDCCH of at least one of the following types:

(1) HARQ-ACK of a PDSCH, if the PDSCH is scheduled by a PDCCH, the PDCCH schedules Np (Np>X) PDSCHs. X is a positive integer.

(2) HARQ-ACK of a PDSCH, if the reception of the PDSCH is CBG based PDSCH reception.

(3) The HARQ-ACK of a PDSCH and the HARQ-ACK of the PDCCH that schedules the PDSCH, if the PDCCH includes scheduling information of the scheduled PDSCHs, and the PDCCH is the PDCCH that requires HARQ-ACK feedback for the PDCCH, for example, the PDCCH also activates transmission configuration indicator (TCI) information, or indicates downlink/uplink beam information.

(4) HARQ-ACK of a PDSCH, if the DAI in the DCI for scheduling the PDSCH is counted according to the PDSCH or PDSCH group.

(5) HARQ-ACK of a PDSCH, if the number of DAI bits in the DCI for scheduling the PDSCH exceeds a predefined threshold. For example, the threshold of the number of DAI bits=2.

The total number of bits of the second sub-codebook is $DA_{Ig2}$*N2, and $DAI_{g2}$ is the DAI in the PDCCH corresponding to the sub-codebook. N2 is the number of HARQ-ACK bits corresponding to each DAI of the sub-codebook. The number of bits is configured by higher layers, or determined by the number of maximum code block group (CBG) corresponding to one PDSCH (the number of maximum CBGs for one TB*the maximum number of TBs for one PDSCH), or determined by the maximum number ($N_{max}$) of PDSCH that can be scheduled by one PDCCH, or determined by the maximum number of TBs that can be scheduled by one PDCCH (the maximum number of PDSCHs*the maximum number of TBs of one PDSCH), or determined by the maximum number of code block groups CBG corresponding to one PDSCH and the maximum number of TBs that can be scheduled by one PDCCH, or determined by the maximum number of code block group CBGs that can be scheduled by one PDCCH, or determined by the maximum number of code block group CBGs that can be scheduled by one PDCCH and the maximum number of TBs that can be scheduled by one PDCCH. Preferably, the above maximum value is determined according to the maximum value of the corresponding parameter on each BWP of each carrier in the same PUCCH group. If the number of HARQ-ACK bits generated according to the result of receiving the PDSCH or PDCCH is less than N2, the NACK bit placeholder is transmitted until the N2 bits are filled. For example, N2=8, Np_1=2, Ncbg_max=8. When one PDCCH schedules one PDSCH, the PDSCH can be divided into 8 CBGs. When one PDCCH schedules 2 PDSCHs, each PDSCH can be divided into 4 CBGs. When one PDCCH is scheduled >2 PDSCHs, each PDSCH can only be scheduled according to TB. Assuming that the first PDCCH schedules 1 PDSCH, 8 CBGs, and DAI=1; in response to the PDCCH, the UE transmits 8-bit HARQ-ACKs, which are corresponding to HARQ-ACKs of the 8 CBG of the PDSCH, respectively. The second PDCCH schedules 5 PDSCHs, DAI=2, and each PDSCH can only be scheduled according to TB; in response to the PDCCH, the UE transmits 8-bit HARQ-ACK, which are corresponding to 5 PDSCH and 3-bit NACK placeholder respectively. The third PDCCH schedules 2 PDSCHs, one PDSCH is 2 CBGs, one PDSCH is 4 CBGs, DAI=3, in response to the PDCCH, the UE transmits 8-bit HARQ-ACK, which are respectively corresponding to the 2 CBGs of the first PDSCH, 2-bit NACK placeholder, 4 CBGs of the second PDSCH. Then, $DAI_{g2}$=3, N1=8, and the HARQ-ACK codebook has a total of 24 bits.

According to one implementation, the HARQ-ACK codebook includes 1 or 2 sub-codebooks. For example, the base station configures 2 serving cells (carriers) for the UE, that is CC1 and CC2 respectively. Among them, CC1 and CC2 are not configured with CBG based transmission. If a PDCCH schedules PDSCHs of CC1 or CC2, and the PDCCH schedules Np>1 PDSCHs, then the HARQ-ACK of the scheduled PDSCHs belongs to the second sub-codebook, and each PDSCH feeds back the HARQ-ACK with the granularity of TB. If a PDCCH schedules a PDSCH (not SPS PDSCH) of CC1 or CC2, and the PDCCH schedules 1 PDSCH, then the HARQ-ACK of the scheduled PDSCH belongs to the first sub-codebook, and each PDSCH feeds back HARQ-ACK with the granularity of TB. The HARQ-ACK of a SPS PDSCH also belongs to the first sub-codebook. The HARQ-ACK codebook includes the two sub-codebooks. For another example, the base station configures two serving cells (carriers) for the UE, that is CC1 and CC2 respectively. Among them, CC1 is configured with CBG based transmission, and CC2 is not configured with CBG based transmission. If a PDCCH schedules PDSCHs of CC1, and the PDCCH schedules Np>1 PDSCHs, then the HARQ-ACKs of the scheduled PDSCHs belong to the second sub-codebook, and each PDSCH feeds back the HARQ-ACK with a granularity of TB. If a PDCCH schedules the PDSCH (not SPS PDSCH) of CC1, and the PDCCH schedules 1 PDSCH, then the HARQ-ACKs of the scheduled PDSCHs belong to the second sub-codebook, and each PDSCH feeds back the HARQ-ACK with the granularity of CBG. If a PDCCH schedules the PDSCH of CC2, and the PDCCH schedules Np>1 PDSCHs, then the HARQ-ACKs of the scheduled PDSCHs belong to the second sub-codebook, and each PDSCH feeds back the HARQ-ACK with a granularity of TB. If a PDCCH schedules the PDSCH of CC2, and the PDCCH schedules one PDSCH, then the HARQ-ACKs of the scheduled PDSCHs belong to the first sub-codebook, and each PDSCH feeds back the HARQ-ACK with a granularity of TB. The HARQ-ACK codebook includes the two sub-codebooks. If the base station only schedules the PDSCH corresponding to the same sub-codebook, the HARQ-ACK codebook only includes the one sub-codebook.

According to one implementation, the HARQ-ACK codebook includes 1 or 2 sub-codebooks. For example, the base station configures 2 serving cells (carriers) for the UE, that is CC1 and CC2 respectively. Among them, CC1 and CC2 are not configured with CBG based transmission. CC1 does not support a PDCCH schedules Np>1 PDSCHs, and DCI is the first type of DCI. CC2 supports a PDCCH schedules Np>1 PDSCHs, and DCI is the second type of DCI. The HARQ-ACK of the PDSCH of CC1 belongs to the first sub-codebook, and the DAI in the PDCCH is counted according to DCI. If a PDSCH is scheduled by a PDCCH of CC2, and the PDCCH schedules Np>1 PDSCHs, then the HARQ-ACKs of the scheduled PDSCHs belong to the second sub-codebook, and the DAI in the PDCCH is counted according to the actual scheduled PDSCH. If a PDSCH is scheduled by a PDCCH of CC2, and the PDCCH schedules Np=1 PDSCH, then the HARQ-ACKs of the scheduled PDSCHs belong to the first sub-codebook, and the DAI in the PDCCH is counted according to the actual scheduled PDSCHs. For another example, the base station configures two serving cells (carriers) for the UE, that is CC1 and CC2 respectively. Among them, CC1 and CC2 are not configured with CBG based transmission. CC1 does not support a PDCCH schedules Np>1 PDSCHs, and CC2 supports a PDCCH schedules Np>1 PDSCHs. If the PDCCH of CC1 or CC2 schedules a PDSCH, the PDSCH belongs to the first sub-codebook and DAI is counted according to DCI; if the PDCCH of CC2 schedules >1 PDSCH, the PDSCHs belong to the second sub-codebook, and DAI is counted according to actually scheduled PDSCHs. For another example, the base station configures two serving cells (carriers) for the UE, that is CC1 and CC2 respectively. Among them, both CC1 and CC2 are configured with CBG based transmission. CC1 does not support a PDCCH schedules Np>1 PDSCHs, and CC2 supports a PDCCH schedule Np>1 PDSCHs. If the PDCCH of CC1 or CC2 schedules one PDSCH and the PDSCH is TB based, then the PDSCH belongs to the first sub-codebook, and DAI is counted according to DCI. If the PDCCH of CC1 or CC2 schedules one PDSCH and the PDSCH is based on CBG, then the PDSCH belongs to the second sub-codebook, and DAI is counted according to the feedback HARQ-ACK, that is, counted according to the number of actually scheduled CBGs. If the PDCCH of CC2 schedules >1 PDSCH, the PDSCHs belong to the second sub-codebook, and the DAI is counted according to the feedback HARQ-ACK, that is, the DAI is counted according to the actually scheduled PDSCHs.

According to one implementation, the HARQ-ACK codebook includes at most 2 groups of codebooks, and each codebook groups includes at most 2 sub-codebooks.

According to an implementation, the HARQ-ACK codebook includes at most 2 groups of codebooks, wherein one codebook groups includes at most 3 sub-codebooks, and the other codebook groups includes at most 2 sub-codebooks. For example, the first codebook groups includes 3 sub-codebooks, wherein, PDSCH included in one sub-codebooks meets the requirements that the PDSCH is scheduled by DCI in fallback mode; PDSCH included in another sub-codebooks meets the requirements that the PDSCH is scheduled by DCI in non-fallback mode and the PDSCH is TB based transmission; and PDSCH included in yet another sub-codebooks meets the requirements that the PDSCH is scheduled by DCI in non-fallback mode and the PDSCH is CBG based transmission. The second codebook groups includes 2 sub-codebooks, wherein, PDSCH included in one sub-codebooks meets the requirements that the PDSCH is scheduled by DCI in non-fallback mode and the PDSCH is TB based transmission; and PDSCH included in the other sub-codebooks meets the requirements that the PDSCH is scheduled by DCI in non-fallback mode and the PDSCH is CBG based transmission.

If one PDSCH is scheduled by a PDCCH, and the PDCCH schedules Np (Np>X) PDSCHs, then the PDSCH belongs to the second codebook groups. If one PDSCH is scheduled by a PDCCH, and the PDCCH schedules one PDSCH, then the PDSCH belongs to the first codebook groups.

If at least one carrier is configured with CBG based transmission, a codebook groups includes at most 2 sub-codebooks. Among them, the PDSCH based on CBG based transmission belongs to the second sub-codebook, and the PDSCH based on TB transmission belongs to the first sub-codebook.

For example, if one carrier is configured with CBG based transmission, the PDSCH of the carrier is scheduled by a PDCCH, and the PDCCH schedules Np (Np>X) PDSCHs, then the PDSCH belongs to the second sub-codebook of the second codebook groups. If one carrier is based on TB transmission, and the PDSCH of the carrier is scheduled by a PDCCH, and the PDCCH schedules Np (Np>X) PDSCHs, then the PDSCH belongs to the first sub-codebook of the second codebook groups. If one carrier is configured with CBG based transmission, and the PDSCH of the carrier is scheduled by a PDCCH, and the PDCCH schedules the 1 PDSCH, then the PDSCH belongs to the second sub-codebook of the first codebook groups. If one carrier is based on TB transmission, and the PDSCH of the carrier is scheduled by a PDCCH, and the PDCCH schedules the 1 PDSCH, then the PDSCH belongs to the first sub-codebook of the first codebook groups. If the base station only schedules the PDSCH corresponding to the same codebook group, the HARQ-ACK codebook only includes the one codebook groups. If the base station schedules PDSCHs corresponding to different codebook groups, the HARQ-ACK codebook includes the two groups of codebooks. For a codebook group, if the base station only schedules PDSCHs corresponding to the same sub-codebook, then the HARQ-ACK codebook group only includes the one sub-codebook. For a codebook group, if the base station schedules PDSCHs corresponding to different sub-codebooks, the HARQ-ACK codebook group includes 2 sub-codebooks.

Preferably, the base station indicates the index of the codebook group in the DCI. The UE does not expect that the codebook group index indicated in the DCI is different from the codebook group index determined according to the above rules. For example, if the base station transmits a PDCCH that schedules multiple PDSCHs, the base station should indicate the codebook group index 2.

According to one implementation, the HARQ-ACK codebook includes at most 2 groups of codebooks, and each codebook groups includes at most 2 sub-codebooks. The UE determines the codebook group where one or more PDSCHs scheduled by the DCI are located according to the index for indicating codebook group which is indicated by the DCI. In the indicated codebook group, the sub-codebook where one or more sub-codebooks are located is scheduled according to the DCI. If a PDCCH schedules multiple PDSCHs, the HARQ-ACK of the PDSCH belongs to the second sub-codebook of the indicated codebook group.

For example, if one PDSCH is scheduled by a PDCCH, and the PDCCH indicates that the PDSCH is grouped into the first group, and the PDCCH schedules Np (Np>X) PDSCHs, then the PDSCH belongs to the second sub-codebook of the first codebook groups. If one PDSCH is scheduled by a PDCCH, and the PDCCH indicates that the PDSCH is grouped into the second group, and the PDCCH schedules Np (Np>X) PDSCHs, then the PDSCH belongs to the second sub-codebook of the second codebook groups.

Preferably, which sub-codebook or codebook group the HARQ-ACK of a PDSCH belongs is irrelevant with whether the PDCCH scheduling the PDSCH schedules one or more PDSCHs. For example, for a CBG based PDSCH, no matter if the PDCCH scheduling the PDSCH schedules one or more PDSCHs, the HARQ-ACK of the PDSCH belongs to the second sub-codebook. In the case, DAI is a count of the number of PDSCHs, and the count is counted up to the first PDSCH scheduled by the current PDCCH, or counted up to the last PDSCH scheduled by the current PDCCH. Or, DAI is a count of the number of PDCCHs. For example, if PDCCH1 is a PDCCH that schedules N PDSCHs, the value of DAI in PDCCH1 is DAI1, and PDCCH2 is the first PDCCH that belongs to the same PDSCH group after PDCCH1, then the value of DAI in PDCCH2 is DAI1+N', wherein N'=N/NO, NO is the number of PDSCHs or PDCCHs corresponding to a DAI configured by the base station or predefined. Preferably, N0=N1, or N0=N2.

Preferably, the method for determining the HARQ-ACK sub-codebook used when the CBG based transmission is configured by the base station is different from the method for determining the HARQ-ACK sub-codebook used when the CBG based transmission is not configured by the base station. For example, when the base station, in the same PUCCH group, configures CBG based transmission on one BWP on at least one carrier, if a PDCCH schedules Np>Y PDSCHs, then the HARQ-ACKs of the scheduled PDSCHs belong to the second sub-codebook, wherein DAI count of the DCI in the second sub-codebook is counted based on the PDCCH. If the base station does not configure CBG based transmission on any carrier, if a PDCCH schedules Np>Y PDSCHs, then the HARQ-ACKs of the scheduled PDSCHs belong to the first sub-codebook, wherein the DAI count of the DCI in the first sub-codebook is counted based on one or M PDSCH.

Preferably, the base station configures the method for determining HARQ-ACK sub-codebook. For example, the base station configures that if a PDCCH schedules Np>Y PDSCHs, then the HARQ-ACKs of the scheduled PDSCHs belong to the second sub-codebook, or the HARQ-ACKs of the scheduled PDSCHs belong to the first sub-codebook.

The UE determines the method for determining the HARQ-ACK sub-codebook through CBG based configuration or determines the method for determining the HARQ-ACK sub-codebook through the configuration of the base station, which can more flexibly control the compromise of UCI overhead and DAI overhead.

When the HARQ-ACKs of multiple PDSCHs are fed back in one uplink time unit, and the number of PDSCHs which are actually scheduled by the PDCCH that schedule PDSCHs may be different, the solution according to the above-mentioned embodiment can be used to avoid that: when UE miss-detecting of one or more PDSCHs (PDCCHs), the size or sequence of the dynamic HARQ-ACK codebook cannot be determined due to the uncertainty of the number of PDSCHs which are miss-detected.

Preferably, if the base station is configured with 2 transport blocks, and the base station is configured with spatial dimension bundling, the UE generates a 1-bit HARQ-ACK according to the valid decoding result of the 2 transport blocks, for example, by performing logic and on the HARQ-ACK of the 2 transport blocks. In addition, the UE performs HARQ-ACK feedback in accordance with the manner that a single transport block is transmitted, that is, the special processing for two transport blocks described above is not applicable.

Embodiment Three

The third embodiment is a variation of the first embodiment. The method for transmitting one or more PDSCHs in the third embodiment also includes:

In step 401: UE receives PDCCH. The received PDCCH may include DCI for scheduling one or more PDSCHs.

In step 402: the UE receives one or more PDSCHs according to the received DCI.

In step 403: the UE determines and transmits the hybrid automatic repeat request acknowledgement HARQ-ACK codebook for the PDSCH according to the received PDSCH and PDCCH.

Preferably, the HARQ-ACK codebook is a codebook based on the HARQ process, which is also referred as to a Type-3 HARQ-ACK codebook.

The base station can simultaneously trigger the transmission of the Type-3 HARQ-ACK codebook in the DCI for scheduling the PDSCH. The Type-3 HARQ-ACK codebook includes the HARQ-ACK information of part or all of the PDSCH of the HARQ process.

If one DCI schedules Np PDSCHs and triggers the transmission of the Type-3 HARQ-ACK codebook, the time difference from the first symbol of the PUCCH resource determined according to the K1 indicated by the DCI to the ending symbol of the Np1-th PDSCH scheduled by the DCI, cannot be less than a predefined threshold, and/or the time difference from the first symbol of the PUCCH resource determined according to the K1 indicated by the DCI to the ending symbol of the Np2-th PDSCH scheduled by the DCI, can be less than a predefined threshold, where Np1 and Np2 are less than or equal to Np. Preferably, the predefined threshold value is the PDSCH processing time Tproc,1. The UE needs to provide valid HARQ-ACK for the first to Np1-th PDSCHs in the Type-3 HARQ-ACK codebook. Preferably, the UE may feed back a predefined HARQ-ACK value, such as NACK, for Np2-th PDSCH to Np-th PDSCH in the Type-3 HARQ-ACK codebook.

Although the various embodiments of the present disclosure are mainly described from the UE side, those skilled in the art will understand that the various embodiments of the present disclosure also include operations on the base station side, and the base station side will perform operations corresponding to those on the UE side.

Those skilled in the art will understand that the various illustrative logical blocks, modules, circuits, and steps described in the disclosure can be implemented as hardware, software, or a combination of both. In order to clearly illustrate the inter-changeability of hardware and software, various illustrative components, blocks, modules, circuits, and steps are generally described above in the form of their function sets. Whether such a feature set is implemented as hardware or software depends on the specific application and design constraints imposed on the overall system. Those skilled in the art can implement the described function set in different ways for each specific application, but such design decisions should not be construed as causing a departure from the scope of the present disclosure.

The various illustrative logic blocks, modules, and circuits described in the present disclosure can be implemented or executed by general-purpose processors, digital signal processors (DSP), application-specific integrated circuits (ASIC), field programmable gate arrays (FPGA) or other programmable logic devices, discrete gate or transistor logic, discrete hardware components, or any combination designed to perform the functions described herein. A general-purpose processor may be a microprocessor, but in the alternative embodiment, the processor may be any conventional processor, controller, microcontroller, or state machine. The processor may also be implemented as a combination of computing devices, such as a combination of a DSP and a microprocessor, multiple microprocessors, one or more microprocessors in co-operation with a DSP core, or any other such configuration.

The steps of the method or algorithm described in the disclosure can be directly embodied in hardware, in a software module executed by a processor, or in a combination thereof. The software module may reside in RAM memory, flash memory, ROM memory, EPROM memory, EEPROM memory, registers, hard disk, removable disk, or any other form of storage medium known in the art. An exemplary storage medium is coupled to the processor such that the processor can read information from/write information to the storage medium. In the alternative embodiment, the storage medium may be integrated into the processor. The processor and the storage medium may reside in the ASIC. The ASIC may reside in the user terminal. In the alternative embodiment, the processor and the storage medium may reside as discrete components in the user terminal.

In one or more exemplary designs, the functions described may be implemented in hardware, software, firmware, or any combination thereof. If implemented in software, each function can be stored as one or more instructions or codes on a computer-readable medium or transmitted through it. Computer-readable media includes both computer storage media and communication media, the latter including any media that facilitates the transfer of a computer program from one place to another. The storage medium may be any available medium that can be accessed by a general-purpose or special-purpose computer.

The embodiments of the disclosure are only intended for the convenience of description and to help comprehensive understanding of the disclosure, and are not intended to limit the scope of the disclosure. Therefore, it should be understood that, in addition to the embodiments disclosed herein, all modifications and changes or forms of modifications and changes derived from the technical idea of the present disclosure fall within the scope of the present disclosure.

The above are only the preferred embodiments of the present disclosure and are not intended to limit the present disclosure. Any modification, equivalent replacement, improvement, etc. made within the spirit and principle of the present disclosure shall be included within protection scope of the present disclosure.

The invention claimed is:

1. A method performed by a user equipment (UE) in a wireless communication system, the method comprising:

receiving a physical downlink control channel (PDCCH) including downlink control information (DCI) for scheduling one or more physical downlink shared channels (PDSCHs);

receiving the one or more PDSCHs based on the DCI; and transmitting a hybrid automatic repeat request acknowledgement (HARQ-ACK) codebook for the one or more PDSCHs, wherein the DCI includes time resource allocation information associated with a PDSCH time domain resource allocation (TDRA) table T, wherein a candidate PDSCH receiving position for placing each HARQ-ACK bit in the HARQ-ACK codebook is determined based on a set of time offsets and a set of rows associated with the PDSCH TDRA table T, and wherein for a row of the PDSCH TDRA table T including more than one start and length indicator value (SLIV) entries:

the set of time offsets is determined based on (i) a timing value between a PDSCH associated with the more than one SLIV entries and the transmission of the HARQ-ACK codebook and (ii) a difference between a slot where a last PDSCH of PDSCHs corresponding to the more than one SLIV entries is located and a slot where each of the PDSCHs is located, and the set of rows associated with the PDSCH TDRA table T includes a union of rows corresponding to the more than one SLIV entries.

2. The method of claim 1, wherein the timing value is indicated by the DCI.

3. The method of claim 1, wherein the slot where each of the PDSCHs is located is identified based on the PDSCH TDRA table T.

4. The method of claim 1, wherein, in a slot/sub-slot $n_{pdsch}$ where the candidate PDSCH receiving position is located, the candidate PDSCH receiving position is determined based on a valid SLIV in the PDSCH TDRA Table T in the slot/sub-slot.

5. The method of claim 4, wherein, the valid SLIV is determined based on at least one of:

a PDCCH monitoring occasion and a slot parameter K0 in the PDSCH TDRA table T, whether there are multiple PDSCHs or a single PDSCH in a row of the PDSCH TDRA table T, whether a slot or a sub-slot where an ending symbol of a last PDSCH is located is in a set of slots or sub-slots $n_{pdsch}$ of the candidate PDSCH receiving position, or an uplink and downlink configuration.

6. The method of claim 4, wherein, for an i-th row in the PDSCH TDRA table T, SLIVs according to Np PDSCHs, where Np>0, are collectively used as one $SLIV_{ri}$ to determine the candidate PDSCH receiving position.

7. The method of claim 6, wherein, in case that multiple $SLIV_{ri}$s overlap, a candidate PDSCH receiving position unit is determined according to one of the multiple $SLIV_{ri}$s, and wherein the candidate PDSCH receiving position unit includes one or more candidate PDSCH receiving positions.

8. The method of claim 7, wherein a number of the one or more candidate PDSCH receiving positions included in the candidate PDSCH receiving position unit corresponding to a $SLIV_{ri}$ is determined according to at least one of:

a number of PDSCHs included in the $SLIV_{ri}$, a maximum value of a number of PDSCHs included in each $SLIV_{ri}$ corresponding to a same candidate PDSCH receiving position unit of the $SLIV_{ri}$, or a maximum value of a number of PDSCHs included in each $SLIV_{ri}$.

9. The method of claim 1, wherein the DCI includes information on a HARQ process identifier (ID) applied to a first PDSCH among the one or more PDSCHs, and wherein HARQ process IDs for PDSCHs other than the first PDSCH among the one or more PDSCHs are increased by 1 according to an order of the PDSCHs other than the first PDSCH.

10. The method of claim 9, wherein in case that a symbol of a PDSCH among the one or more PDSCHs overlaps with an uplink symbol configured semi-statically, a HARQ process ID of the PDSCH is not incremented.

11. The method of claim 1, wherein the timing value indicates an offset between the last PDSCH and the transmission of the HARQ-ACK codebook.

12. The method of claim 1, wherein the DCI includes a first field indicating a new data indicator (NDI) and a second field indicating a redundancy version (RV) for the one or more PDSCHs, and wherein a number of bits of each of the first field and the second field is determined based on a maximum number of SLIVs which is indicatable in a row of the PDSCH TDRA table T.

13. A user equipment (UE) in a wireless communication system, the UE comprising:

a transceiver configured to transmit and receive signals; and a controller coupled with the transceiver and configured to:

receive a physical downlink control channel (PDCCH) including downlink control information (DCI) for scheduling one or more physical downlink shared channels (PDSCHs), receive the one or more PDSCHs based on the DCI, and transmit a hybrid automatic repeat request acknowledgement (HARQ-ACK) codebook for the one or more PDSCHs, wherein the DCI includes time resource allocation information associated with a PDSCH time domain resource allocation (TDRA) table T, wherein a candidate PDSCH receiving position for placing each HARQ-ACK bit in the HARQ-ACK codebook is determined based on a set of time offsets and a set of rows associated with the PDSCH TDRA table T, and wherein for a row of the PDSCH TDRA table T including more than one start and length indicator value (SLIV) entries:

the set of time offsets is determined based on (i) a timing value between a PDSCH associated with the more than one SLIV entries and the transmission of the HARQ-ACK codebook and (ii) a difference between a slot where a last PDSCH of PDSCHs corresponding to the more than one SLIV entries is located and a slot where each of the PDSCHs is located, and the set of rows associated with the PDSCH TDRA table T includes a union of rows corresponding to the more than one SLIV entries.

* * * * *